(12) United States Patent
Venkataraman et al.

(10) Patent No.: US 11,797,863 B2
(45) Date of Patent: Oct. 24, 2023

(54) SYSTEMS AND METHODS FOR SYNTHESIZING DATA FOR TRAINING STATISTICAL MODELS ON DIFFERENT IMAGING MODALITIES INCLUDING POLARIZED IMAGES

(71) Applicant: INTRINSIC INNOVATION LLC, Mountain View, CA (US)

(72) Inventors: Kartik Venkataraman, San Jose, CA (US); Agastya Kalra, Ontario (CA); Achuta Kadambi, Los Altos Hills, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 0 days.

(21) Appl. No.: 17/294,976

(22) PCT Filed: Jan. 4, 2021

(86) PCT No.: PCT/US2021/012073
§ 371 (c)(1),
(2) Date: May 18, 2021

(87) PCT Pub. No.: WO2021/154459
PCT Pub. Date: Aug. 5, 2021

(65) Prior Publication Data
US 2022/0215266 A1    Jul. 7, 2022

Related U.S. Application Data

(60) Provisional application No. 62/968,038, filed on Jan. 30, 2020.

(51) Int. Cl.
*G06N 3/088* (2023.01)
*G06F 18/214* (2023.01)
*G06N 3/045* (2023.01)

(52) U.S. Cl.
CPC ........... *G06N 3/088* (2013.01); *G06F 18/214* (2023.01); *G06N 3/045* (2023.01)

(58) Field of Classification Search
CPC .... G06F 18/214; G06N 33/045; G06N 3/088; G06T 15/00; G06T 17/00; G06T 17/20
See application file for complete search history.

(56) References Cited

U.S. PATENT DOCUMENTS 4,124,798 A    11/1978    Thompson
4,198,646 A    4/1980    Alexander et al.
(Continued)

FOREIGN PATENT DOCUMENTS

CN    2488005 Y    4/2002
CN    1619358 A    5/2005
(Continued)

OTHER PUBLICATIONS

US 8,957,977 B2, 02/2015, Venkataraman et al. (withdrawn)
(Continued)

*Primary Examiner* — Zhiyu Lu
(74) *Attorney, Agent, or Firm* — Fish & Richardson P.C.

(57) ABSTRACT

A method of generating synthetic images of virtual scenes includes: placing, by a synthetic data generator implemented by a processor and memory, three-dimensional (3-D) models of objects in a 3-D virtual scene; adding, by the synthetic data generator, lighting to the 3-D virtual scene, the lighting including one or more illumination sources; applying, by the synthetic data generator, imaging modality-specific materials to the 3-D models of objects in the 3-D virtual scene in accordance with a selected multimodal imaging modality, each of the imaging modality-specific materials including an empirical model; setting a scene background in accordance with the selected multimodal imaging modality; and rendering, by the synthetic data generator, a two-dimensional
(Continued)

image of the 3-D virtual scene based on the selected multimodal imaging modality to generate a synthetic image in accordance with the selected multimodal imaging modality.

27 Claims, 12 Drawing Sheets

(56) References Cited

U.S. PATENT DOCUMENTS

| | | | |
|---|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,888,645 A | 12/1989 | Mitchell et al. |
| 4,899,060 A | 2/1990 | Lischke |
| 4,962,425 A | 10/1990 | Rea |
| 5,005,083 A | 4/1991 | Grage et al. |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt et al. |
| 5,327,125 A | 7/1994 | Iwase et al. |
| 5,463,464 A | 10/1995 | Ladewski |
| 5,475,422 A | 12/1995 | Suzuki et al. |
| 5,488,674 A | 1/1996 | Burt et al. |
| 5,517,236 A | 5/1996 | Sergeant et al. |
| 5,629,524 A | 5/1997 | Stettner et al. |
| 5,638,461 A | 6/1997 | Fridge |
| 5,675,377 A | 10/1997 | Gibas et al. |
| 5,703,961 A | 12/1997 | Rogina et al. |
| 5,710,875 A | 1/1998 | Hsu et al. |
| 5,757,425 A | 5/1998 | Barton et al. |
| 5,793,900 A | 8/1998 | Nourbakhsh et al. |
| 5,801,919 A | 9/1998 | Griencewic |
| 5,808,350 A | 9/1998 | Jack et al. |
| 5,832,312 A | 11/1998 | Rieger et al. |
| 5,833,507 A | 11/1998 | Woodgate et al. |
| 5,880,691 A | 3/1999 | Fossum et al. |
| 5,911,008 A | 6/1999 | Niikura et al. |
| 5,933,190 A | 8/1999 | Dierickx et al. |
| 5,963,664 A | 10/1999 | Kumar et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,084,979 A | 7/2000 | Kanade et al. |
| 6,095,989 A | 8/2000 | Hay et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu |
| 6,175,379 B1 | 1/2001 | Uomori et al. |
| 6,185,529 B1 | 2/2001 | Chen et al. |
| 6,198,852 B1 | 3/2001 | Anandan et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,373,518 B1 | 4/2002 | Sogawa |
| 6,419,638 B1 | 7/2002 | Hay et al. |
| 6,443,579 B1 | 9/2002 | Myers |
| 6,445,815 B1 | 9/2002 | Sato |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,546,153 B1 | 4/2003 | Hoydal |
| 6,552,742 B1 | 4/2003 | Seta |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu et al. |
| 6,627,896 B1 | 9/2003 | Hashimoto et al. |
| 6,628,330 B1 | 9/2003 | Lin |
| 6,628,845 B1 | 9/2003 | Stone et al. |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen |
| 6,750,488 B1 | 6/2004 | Driescher et al. |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev et al. |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,833,863 B1 | 12/2004 | Clemens |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George et al. |
| 6,958,862 B1 | 10/2005 | Joseph |
| 6,985,175 B2 | 1/2006 | Iwai et al. |
| 7,013,318 B2 | 3/2006 | Rosengard et al. |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Swaminathan et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen et al. |
| 7,430,312 B2 | 9/2008 | Gu |
| 7,471,765 B2 | 12/2008 | Jaffray et al. |
| 7,496,293 B2 | 2/2009 | Shamir et al. |
| 7,564,019 B2 | 7/2009 | Olsen et al. |
| 7,599,547 B2 | 10/2009 | Sun et al. |
| 7,606,484 B1 | 10/2009 | Richards et al. |
| 7,620,265 B1 | 11/2009 | Wolff et al. |
| 7,633,511 B2 | 12/2009 | Shum et al. |
| 7,639,435 B2 | 12/2009 | Chiang |
| 7,639,838 B2 | 12/2009 | Nims |
| 7,646,549 B2 | 1/2010 | Zalevsky et al. |
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,924,321 B2 | 4/2011 | Nayar et al. |
| 7,956,871 B2 | 6/2011 | Fainstain et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |

(56) References Cited

U.S. PATENT DOCUMENTS

| | | |
|---|---|---|
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,055,466 B2 | 11/2011 | Bryll |
| 8,077,245 B2 | 12/2011 | Adamo et al. |
| 8,089,515 B2 | 1/2012 | Chebil et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,111,910 B2 | 2/2012 | Tanaka |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev et al. |
| 8,194,296 B2 | 6/2012 | Compton et al. |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Saint-Pierre et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Yang et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev et al. |
| 8,406,562 B2 | 3/2013 | Bassi et al. |
| 8,411,146 B2 | 4/2013 | Twede |
| 8,416,282 B2 | 4/2013 | Lablans |
| 8,446,492 B2 | 5/2013 | Nakano et al. |
| 8,456,517 B2 | 6/2013 | Spektor et al. |
| 8,493,496 B2 | 7/2013 | Freedman et al. |
| 8,514,291 B2 | 8/2013 | Chang |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,558,929 B2 | 10/2013 | Tredwell |
| 8,559,705 B2 | 10/2013 | Ng |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,648,919 B2 | 2/2014 | Mantzel et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,787,691 B2 | 7/2014 | Takahashi et al. |
| 8,792,710 B2 | 7/2014 | Keselman |
| 8,804,255 B2 | 8/2014 | Duparre |
| 8,823,813 B2 | 9/2014 | Mantzel et al. |
| 8,830,375 B2 | 9/2014 | Ludwig |
| 8,831,367 B2 | 9/2014 | Venkataraman et al. |
| 8,831,377 B2 | 9/2014 | Pitts et al. |
| 8,836,793 B1 | 9/2014 | Kriesel et al. |
| 8,842,201 B2 | 9/2014 | Tajiri |
| 8,854,433 B1 | 10/2014 | Rafii |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Ito et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,047,684 B2 | 6/2015 | Lelescu et al. |
| 9,049,367 B2 | 6/2015 | Venkataraman et al. |
| 9,055,233 B2 | 6/2015 | Venkataraman et al. |
| 9,060,120 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,100,586 B2 | 8/2015 | McMahon et al. |
| 9,100,635 B2 | 8/2015 | Duparre et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Florian et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,247,117 B2 | 1/2016 | Jacques |
| 9,253,380 B2 | 2/2016 | Venkataraman et al. |
| 9,253,397 B2 | 2/2016 | Lee et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,374,512 B2 | 6/2016 | Venkataraman et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |

(56) References Cited

U.S. PATENT DOCUMENTS

| | | |
|---|---|---|
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |
| 9,712,759 B2 | 7/2017 | Venkataraman et al. |
| 9,729,865 B1 | 8/2017 | Kuo et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,826,212 B2 | 11/2017 | Newton et al. |
| 9,858,673 B2 | 1/2018 | Ciurea et al. |
| 9,864,921 B2 | 1/2018 | Venkataraman et al. |
| 9,866,739 B2 | 1/2018 | McMahon |
| 9,888,194 B2 | 2/2018 | Duparre |
| 9,892,522 B2 | 2/2018 | Smirnov et al. |
| 9,898,856 B2 | 2/2018 | Yang et al. |
| 9,917,998 B2 | 3/2018 | Venkataraman et al. |
| 9,924,092 B2 | 3/2018 | Rodda et al. |
| 9,936,148 B2 | 4/2018 | McMahon |
| 9,942,474 B2 | 4/2018 | Venkataraman et al. |
| 9,955,070 B2 | 4/2018 | Lelescu et al. |
| 9,986,224 B2 | 5/2018 | Mullis |
| 10,009,538 B2 | 6/2018 | Venkataraman et al. |
| 10,019,816 B2 | 7/2018 | Venkataraman et al. |
| 10,027,901 B2 | 7/2018 | Venkataraman et al. |
| 10,089,740 B2 | 10/2018 | Srikanth et al. |
| 10,091,405 B2 | 10/2018 | Molina |
| 10,119,808 B2 | 11/2018 | Venkataraman et al. |
| 10,122,993 B2 | 11/2018 | Venkataraman et al. |
| 10,127,682 B2 | 11/2018 | Mullis |
| 10,142,560 B2 | 11/2018 | Venkataraman et al. |
| 10,182,216 B2 | 1/2019 | Mullis et al. |
| 10,218,889 B2 | 2/2019 | McMahan |
| 10,225,543 B2 | 3/2019 | Mullis |
| 10,250,871 B2 | 4/2019 | Ciurea et al. |
| 10,261,219 B2 | 4/2019 | Duparre et al. |
| 10,275,676 B2 | 4/2019 | Venkataraman et al. |
| 10,306,120 B2 | 5/2019 | Duparre |
| 10,311,649 B2 | 6/2019 | McMohan et al. |
| 10,334,241 B2 | 6/2019 | Duparre et al. |
| 10,366,472 B2 | 7/2019 | Lelescu et al. |
| 10,375,302 B2 | 8/2019 | Nayar et al. |
| 10,375,319 B2 | 8/2019 | Venkataraman et al. |
| 10,380,752 B2 | 8/2019 | Ciurea et al. |
| 10,390,005 B2 | 8/2019 | Nisenzon et al. |
| 10,412,314 B2 | 9/2019 | McMahon et al. |
| 10,430,682 B2 | 10/2019 | Venkataraman et al. |
| 10,455,168 B2 | 10/2019 | McMahon |
| 10,455,218 B2 | 10/2019 | Venkataraman et al. |
| 10,462,362 B2 | 10/2019 | Lelescu et al. |
| 10,482,618 B2 | 11/2019 | Jain et al. |
| 10,540,806 B2 | 1/2020 | Yang et al. |
| 10,542,208 B2 | 1/2020 | Lelescu et al. |
| 10,547,772 B2 | 1/2020 | Molina |
| 10,560,684 B2 | 2/2020 | Mullis |
| 10,574,905 B2 | 2/2020 | Srikanth et al. |
| 10,638,099 B2 | 4/2020 | Mullis et al. |
| 10,643,383 B2 | 5/2020 | Venkataraman |
| 10,674,138 B2 | 6/2020 | Venkataraman et al. |
| 10,694,114 B2 | 6/2020 | Venkataraman et al. |
| 10,708,492 B2 | 7/2020 | Venkataraman et al. |
| 10,735,635 B2 | 8/2020 | Duparre |
| 10,742,861 B2 | 8/2020 | McMahon |
| 10,767,981 B2 | 9/2020 | Venkataraman et al. |
| 10,805,589 B2 | 10/2020 | Venkataraman et al. |
| 10,818,026 B2 | 10/2020 | Jain et al. |
| 10,839,485 B2 | 11/2020 | Lelescu et al. |
| 10,909,707 B2 | 2/2021 | Ciurea et al. |
| 10,944,961 B2 | 3/2021 | Ciurea et al. |
| 10,958,892 B2 | 3/2021 | Mullis |
| 10,984,276 B2 | 4/2021 | Venkataraman et al. |
| 11,022,725 B2 | 6/2021 | Duparre et al. |
| 11,024,046 B2 | 6/2021 | Venkataraman |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0003669 A1 | 1/2002 | Kedar et al. |
| 2002/0012056 A1 | 1/2002 | Trevino et al. |
| 2002/0015536 A1 | 2/2002 | Warren et al. |
| 2002/0027608 A1 | 3/2002 | Johnson et al. |
| 2002/0028014 A1 | 3/2002 | Ono |
| 2002/0039438 A1 | 4/2002 | Mori et al. |
| 2002/0057845 A1 | 5/2002 | Fossum et al. |
| 2002/0061131 A1 | 5/2002 | Sawhney et al. |
| 2002/0063807 A1 | 5/2002 | Margulis |
| 2002/0075450 A1 | 6/2002 | Aratani et al. |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee et al. |
| 2002/0113867 A1 | 8/2002 | Takigawa et al. |
| 2002/0113888 A1 | 8/2002 | Sonoda et al. |
| 2002/0118113 A1 | 8/2002 | Oku et al. |
| 2002/0120634 A1 | 8/2002 | Min et al. |
| 2002/0122113 A1 | 9/2002 | Foote |
| 2002/0128060 A1 | 9/2002 | Belhumeur et al. |
| 2002/0163054 A1 | 11/2002 | Suda |
| 2002/0167537 A1 | 11/2002 | Trajkovic |
| 2002/0171666 A1 | 11/2002 | Endo et al. |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0026474 A1 | 2/2003 | Yano |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0156189 A1 | 8/2003 | Utsumi et al. |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng |
| 2003/0211405 A1 | 11/2003 | Venkataraman |
| 2003/0231179 A1 | 12/2003 | Suzuki |
| 2004/0003409 A1 | 1/2004 | Berstis |
| 2004/0008271 A1 | 1/2004 | Hagimori et al. |
| 2004/0012689 A1 | 1/2004 | Tinnerino et al. |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams et al. |
| 2004/0100570 A1 | 5/2004 | Shizukuishi |

(56) References Cited

U.S. PATENT DOCUMENTS

| | | |
|---|---|---|
| 2004/0105021 A1 | 6/2004 | Hu |
| 2004/0114794 A1* | 6/2004 | Vlasic ............... G06T 15/205 382/154 |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski et al. |
| 2004/0196379 A1 | 10/2004 | Chen et al. |
| 2004/0207600 A1 | 10/2004 | Zhang et al. |
| 2004/0207836 A1 | 10/2004 | Chhibber et al. |
| 2004/0212734 A1 | 10/2004 | Macinnis et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0111705 A1 | 5/2005 | Waupotitsch et al. |
| 2005/0117015 A1 | 6/2005 | Cutler |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder et al. |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0203380 A1 | 9/2005 | Sauer et al. |
| 2005/0205785 A1 | 9/2005 | Hornback et al. |
| 2005/0219264 A1 | 10/2005 | Shum et al. |
| 2005/0219363 A1 | 10/2005 | Kohler et al. |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0013318 A1 | 1/2006 | Webb et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother et al. |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0119597 A1 | 6/2006 | Oshino |
| 2006/0125936 A1 | 6/2006 | Gruhike et al. |
| 2006/0138322 A1 | 6/2006 | Costello et al. |
| 2006/0139475 A1 | 6/2006 | Esch et al. |
| 2006/0152803 A1 | 7/2006 | Provitola |
| 2006/0153290 A1 | 7/2006 | Watabe et al. |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187322 A1 | 8/2006 | Janson et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen et al. |
| 2006/0215924 A1 | 9/2006 | Steinberg et al. |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam et al. |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0116447 A1 | 5/2007 | Ye |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0140685 A1 | 6/2007 | Wu |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0166447 A1 | 7/2007 | Ur-Rehman et al. |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1 | 9/2007 | Weibrecht et al. |
| 2007/0228256 A1 | 10/2007 | Mentzer et al. |
| 2007/0236595 A1 | 10/2007 | Pan et al. |
| 2007/0242141 A1 | 10/2007 | Ciurea |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |

(56) References Cited

U.S. PATENT DOCUMENTS

| | | |
|---|---|---|
| 2007/0263114 A1 | 11/2007 | Gurevich et al. |
| 2007/0268374 A1 | 11/2007 | Robinson |
| 2007/0291995 A1 | 12/2007 | Rivera |
| 2007/0296721 A1 | 12/2007 | Chang et al. |
| 2007/0296832 A1 | 12/2007 | Ota et al. |
| 2007/0296835 A1 | 12/2007 | Olsen et al. |
| 2007/0296846 A1 | 12/2007 | Barman et al. |
| 2007/0296847 A1 | 12/2007 | Chang et al. |
| 2007/0297696 A1 | 12/2007 | Hamza et al. |
| 2008/0006859 A1 | 1/2008 | Mionetto |
| 2008/0019611 A1 | 1/2008 | Larkin et al. |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0044170 A1 | 2/2008 | Yap et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152213 A1 | 6/2008 | Medioni et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0208506 A1 | 8/2008 | Kuwata |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0246866 A1 | 10/2008 | Kinoshita et al. |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0066693 A1 | 3/2009 | Carson |
| 2009/0079862 A1 | 3/2009 | Subbotin |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0092363 A1 | 4/2009 | Daum et al. |
| 2009/0096050 A1 | 4/2009 | Park |
| 2009/0102956 A1 | 4/2009 | Georgiev |
| 2009/0103792 A1 | 4/2009 | Rahn et al. |
| 2009/0109306 A1 | 4/2009 | Shan et al. |
| 2009/0127430 A1 | 5/2009 | Hirasawa et al. |
| 2009/0128644 A1 | 5/2009 | Camp, Jr. et al. |
| 2009/0128833 A1 | 5/2009 | Yahav |
| 2009/0129667 A1 | 5/2009 | Ho et al. |
| 2009/0140131 A1 | 6/2009 | Utagawa |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167923 A1 | 7/2009 | Safaee-Rad et al. |
| 2009/0167934 A1 | 7/2009 | Gupta |
| 2009/0175349 A1 | 7/2009 | Ye et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0245637 A1 | 10/2009 | Barman et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0273663 A1 | 11/2009 | Yoshida |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang |
| 2010/0045809 A1 | 2/2010 | Packard |
| 2010/0053342 A1 | 3/2010 | Hwang et al. |
| 2010/0053347 A1 | 3/2010 | Agarwala et al. |
| 2010/0053415 A1 | 3/2010 | Yun |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085351 A1 | 4/2010 | Deb et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097444 A1 | 4/2010 | Lablans |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |
| 2010/0129048 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |

(56) References Cited

U.S. PATENT DOCUMENTS

| | | |
|---|---|---|
| 2010/0171866 A1 | 7/2010 | Brady et al. |
| 2010/0177411 A1 | 7/2010 | Hegde et al. |
| 2010/0182406 A1 | 7/2010 | Benitez |
| 2010/0194860 A1 | 8/2010 | Mentz et al. |
| 2010/0194901 A1 | 8/2010 | van Hoorebeke et al. |
| 2010/0195716 A1 | 8/2010 | Klein Gunnewiek et al. |
| 2010/0201809 A1 | 8/2010 | Oyama et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0214423 A1 | 8/2010 | Ogawa |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Tehran et al. |
| 2010/0259610 A1 | 10/2010 | Petersen |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0277629 A1 | 11/2010 | Tanaka |
| 2010/0281070 A1 | 11/2010 | Chan et al. |
| 2010/0289941 A1 | 11/2010 | Ito et al. |
| 2010/0290483 A1 | 11/2010 | Park et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu |
| 2010/0321640 A1 | 12/2010 | Yeh et al. |
| 2010/0329556 A1 | 12/2010 | Mitarai et al. |
| 2010/0329582 A1 | 12/2010 | Albu et al. |
| 2011/0001037 A1 | 1/2011 | Tewinkle |
| 2011/0013006 A1 | 1/2011 | Uzenbajakava et al. |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032341 A1 | 2/2011 | Ignatov et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043604 A1 | 2/2011 | Peleg et al. |
| 2011/0043613 A1 | 2/2011 | Rohaly et al. |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0084893 A1 | 4/2011 | Lee et al. |
| 2011/0085028 A1 | 4/2011 | Samadani et al. |
| 2011/0090217 A1 | 4/2011 | Mashitani et al. |
| 2011/0102553 A1 | 5/2011 | Corcoran et al. |
| 2011/0108708 A1 | 5/2011 | Olsen et al. |
| 2011/0115886 A1 | 5/2011 | Nguyen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0150321 A1 | 6/2011 | Cheong et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0199458 A1 | 8/2011 | Hayasaka et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0211068 A1 | 9/2011 | Yokota |
| 2011/0211077 A1 | 9/2011 | Nayar et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra et al. |
| 2011/0222757 A1 | 9/2011 | Yeatman, Jr. et al. |
| 2011/0227922 A1 | 9/2011 | Shim |
| 2011/0228142 A1 | 9/2011 | Brueckner et al. |
| 2011/0228144 A1 | 9/2011 | Tian et al. |
| 2011/0234825 A1 | 9/2011 | Liu et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung et al. |
| 2011/0255745 A1 | 10/2011 | Hodder et al. |
| 2011/0255786 A1 | 10/2011 | Hunter et al. |
| 2011/0261993 A1 | 10/2011 | Weiming et al. |
| 2011/0267264 A1 | 11/2011 | Mccarthy et al. |
| 2011/0267348 A1 | 11/2011 | Lin et al. |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1 | 1/2012 | Pain |
| 2012/0013748 A1 | 1/2012 | Stanwood et al. |
| 2012/0014456 A1 | 1/2012 | Martinez Bauza et al. |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0026478 A1 | 2/2012 | Chen et al. |
| 2012/0038745 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando |
| 2012/0056982 A1 | 3/2012 | Katz et al. |
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian et al. |
| 2012/0069235 A1 | 3/2012 | Imai |
| 2012/0081519 A1 | 4/2012 | Goma et al. |
| 2012/0086803 A1 | 4/2012 | Malzbender et al. |
| 2012/0105590 A1 | 5/2012 | Fukumoto et al. |
| 2012/0105654 A1 | 5/2012 | Kwatra et al. |
| 2012/0105691 A1 | 5/2012 | Waqas et al. |
| 2012/0113232 A1 | 5/2012 | Joblove |
| 2012/0113318 A1 | 5/2012 | Galstian et al. |
| 2012/0113413 A1 | 5/2012 | Miahczylowicz-Wolski et al. |
| 2012/0114224 A1 | 5/2012 | Xu et al. |
| 2012/0114260 A1 | 5/2012 | Takahashi et al. |

(56) References Cited

U.S. PATENT DOCUMENTS

| | | |
|---|---|---|
| 2012/0120264 A1 | 5/2012 | Lee et al. |
| 2012/0127275 A1 | 5/2012 | Von Zitzewitz et al. |
| 2012/0127284 A1 | 5/2012 | Bar-Zeev et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0162374 A1 | 6/2012 | Markas et al. |
| 2012/0163672 A1 | 6/2012 | McKinnon |
| 2012/0163725 A1 | 6/2012 | Fukuhara |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai et al. |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0218455 A1 | 8/2012 | Imai et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0250990 A1 | 10/2012 | Bocirnea |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0274626 A1 | 11/2012 | Hsieh |
| 2012/0287291 A1 | 11/2012 | McMahon |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307084 A1 | 12/2012 | Mantzel |
| 2012/0307093 A1 | 12/2012 | Miyoshi |
| 2012/0307099 A1 | 12/2012 | Yahata |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0002953 A1 | 1/2013 | Noguchi et al. |
| 2013/0003184 A1 | 1/2013 | Duparre |
| 2013/0010073 A1 | 1/2013 | Do et al. |
| 2013/0016245 A1 | 1/2013 | Yuba |
| 2013/0016885 A1 | 1/2013 | Tsujimoto |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee et al. |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0100254 A1 | 4/2013 | Morioka et al. |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120536 A1 | 5/2013 | Song et al. |
| 2013/0120605 A1 | 5/2013 | Georgiev et al. |
| 2013/0121559 A1 | 5/2013 | Hu et al. |
| 2013/0127988 A1 | 5/2013 | Wang et al. |
| 2013/0128049 A1 | 5/2013 | Schofield et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares et al. |
| 2013/0135448 A1 | 5/2013 | Nagumo et al. |
| 2013/0147979 A1 | 6/2013 | McMahon et al. |
| 2013/0155050 A1 | 6/2013 | Rastogi et al. |
| 2013/0162641 A1 | 6/2013 | Zhang et al. |
| 2013/0169754 A1 | 7/2013 | Aronsson et al. |
| 2013/0176394 A1 | 7/2013 | Tian et al. |
| 2013/0208138 A1 | 8/2013 | Li et al. |
| 2013/0215108 A1 | 8/2013 | McMahon et al. |
| 2013/0215231 A1 | 8/2013 | Hiramoto et al. |
| 2013/0216144 A1 | 8/2013 | Robinson et al. |
| 2013/0222556 A1 | 8/2013 | Shimada |
| 2013/0222656 A1 | 8/2013 | Kaneko |
| 2013/0223759 A1 | 8/2013 | Nishiyama |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone et al. |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By |
| 2013/0278631 A1 | 10/2013 | Border et al. |
| 2013/0286236 A1 | 10/2013 | Mankowski |
| 2013/0293760 A1 | 11/2013 | Nisenzon et al. |
| 2013/0308197 A1 | 11/2013 | Duparre |
| 2013/0321581 A1 | 12/2013 | El-Ghoroury et al. |
| 2013/0321589 A1 | 12/2013 | Kirk et al. |
| 2013/0335598 A1 | 12/2013 | Gustavsson et al. |
| 2013/0342641 A1 | 12/2013 | Morioka et al. |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0050355 A1* | 2/2014 | Cobb ............... G06T 7/10 382/103 |
| 2014/0059462 A1 | 2/2014 | Wernersson |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0081454 A1 | 3/2014 | Nuyujukian et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0125760 A1 | 5/2014 | Au et al. |
| 2014/0125771 A1 | 5/2014 | Grossmann et al. |
| 2014/0132810 A1 | 5/2014 | McMahon |
| 2014/0139642 A1 | 5/2014 | Ni et al. |
| 2014/0139643 A1 | 5/2014 | Hogasten et al. |
| 2014/0140626 A1 | 5/2014 | Cho et al. |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183258 A1 | 7/2014 | DiMuro |
| 2014/0183334 A1 | 7/2014 | Wang et al. |
| 2014/0186045 A1 | 7/2014 | Poddar et al. |
| 2014/0192154 A1 | 7/2014 | Jeong et al. |

(56) References Cited

U.S. PATENT DOCUMENTS

| | | |
|---|---|---|
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0307058 A1 | 10/2014 | Kirk et al. |
| 2014/0307063 A1 | 10/2014 | Lee |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042814 A1 | 2/2015 | Vaziri |
| 2015/0042833 A1 | 2/2015 | Lelescu et al. |
| 2015/0043806 A1 | 2/2015 | Karsch et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0095235 A1 | 4/2015 | Dua |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0161798 A1 | 6/2015 | Venkataraman et al. |
| 2015/0199793 A1 | 7/2015 | Venkataraman et al. |
| 2015/0199841 A1 | 7/2015 | Venkataraman et al. |
| 2015/0207990 A1 | 7/2015 | Ford et al. |
| 2015/0228081 A1 | 8/2015 | Kim et al. |
| 2015/0235476 A1 | 8/2015 | McMahon et al. |
| 2015/0237329 A1 | 8/2015 | Venkataraman et al. |
| 2015/0243480 A1 | 8/2015 | Yamada |
| 2015/0244927 A1 | 8/2015 | Laroia et al. |
| 2015/0245013 A1 | 8/2015 | Venkataraman et al. |
| 2015/0248744 A1 | 9/2015 | Hayasaka et al. |
| 2015/0254868 A1 | 9/2015 | Srikanth et al. |
| 2015/0264337 A1 | 9/2015 | Venkataraman et al. |
| 2015/0288861 A1 | 10/2015 | Duparre |
| 2015/0296137 A1 | 10/2015 | Duparre et al. |
| 2015/0312455 A1 | 10/2015 | Venkatarajan et al. |
| 2015/0317638 A1 | 11/2015 | Donaldson |
| 2015/0325048 A1 | 11/2015 | Engle et al. |
| 2015/0326852 A1 | 11/2015 | Duparre et al. |
| 2015/0332468 A1 | 11/2015 | Hayasaka et al. |
| 2015/0373261 A1 | 12/2015 | Rodda et al. |
| 2016/0037097 A1 | 2/2016 | Duparre |
| 2016/0042548 A1 | 2/2016 | Du et al. |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0182786 A1 | 6/2016 | Anderson et al. |
| 2016/0191768 A1 | 6/2016 | Shin et al. |
| 2016/0195733 A1 | 7/2016 | Lelescu et al. |
| 2016/0198096 A1 | 7/2016 | McMahon et al. |
| 2016/0209654 A1 | 7/2016 | Riccomini et al. |
| 2016/0210785 A1 | 7/2016 | Balachandreswaran et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267486 A1 | 9/2016 | Mitra et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0309084 A1 | 10/2016 | Venkataraman et al. |
| 2016/0309134 A1 | 10/2016 | Venkataraman et al. |
| 2016/0316140 A1 | 10/2016 | Nayar et al. |
| 2016/0323578 A1 | 11/2016 | Kaneko et al. |
| 2017/0004791 A1 | 1/2017 | Aubineau et al. |
| 2017/0006233 A1 | 1/2017 | Venkataraman et al. |
| 2017/0011405 A1 | 1/2017 | Pandey |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |
| 2017/0070753 A1 | 3/2017 | Kaneko |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0109742 A1 | 4/2017 | Varadarajan |
| 2017/0142405 A1 | 5/2017 | Shors et al. |
| 2017/0163862 A1 | 6/2017 | Molina |
| 2017/0178363 A1 | 6/2017 | Venkataraman et al. |
| 2017/0187933 A1 | 6/2017 | Duparre |
| 2017/0188011 A1 | 6/2017 | Panescu et al. |
| 2017/0244960 A1 | 8/2017 | Ciurea et al. |
| 2017/0257562 A1 | 9/2017 | Venkataraman et al. |
| 2017/0365104 A1 | 12/2017 | McMahon et al. |
| 2018/0005244 A1 | 1/2018 | Govindarajan et al. |
| 2018/0007284 A1 | 1/2018 | Venkataraman et al. |
| 2018/0013945 A1 | 1/2018 | Ciurea et al. |

(56) References Cited

U.S. PATENT DOCUMENTS

| | | | |
|---|---|---|---|
| 2018/0024330 A1 | 1/2018 | Laroia | |
| 2018/0035057 A1 | 2/2018 | McMahon et al. | |
| 2018/0040135 A1 | 2/2018 | Mullis | |
| 2018/0048830 A1 | 2/2018 | Venkataraman et al. | |
| 2018/0048879 A1 | 2/2018 | Venkataraman et al. | |
| 2018/0081090 A1 | 3/2018 | Duparre et al. | |
| 2018/0097993 A1 | 4/2018 | Nayar et al. | |
| 2018/0109782 A1 | 4/2018 | Duparre et al. | |
| 2018/0124311 A1 | 5/2018 | Lelescu et al. | |
| 2018/0131852 A1 | 5/2018 | McMahon | |
| 2018/0139382 A1 | 5/2018 | Venkataraman et al. | |
| 2018/0189767 A1 | 7/2018 | Bigioi | |
| 2018/0197035 A1 | 7/2018 | Venkataraman et al. | |
| 2018/0211402 A1 | 7/2018 | Ciurea et al. | |
| 2018/0227511 A1 | 8/2018 | McMahon | |
| 2018/0240265 A1 | 8/2018 | Yang et al. | |
| 2018/0270473 A1 | 9/2018 | Mullis | |
| 2018/0286120 A1 | 10/2018 | Fleishman et al. | |
| 2018/0302554 A1 | 10/2018 | Lelescu et al. | |
| 2018/0308281 A1* | 10/2018 | Okoyama | G06T 7/187 |
| 2018/0330182 A1 | 11/2018 | Venkataraman et al. | |
| 2018/0376122 A1 | 12/2018 | Park et al. | |
| 2019/0012768 A1 | 1/2019 | Tafazoli Bilandi et al. | |
| 2019/0037116 A1 | 1/2019 | Molina | |
| 2019/0037150 A1 | 1/2019 | Srikanth et al. | |
| 2019/0043253 A1 | 2/2019 | Lucas et al. | |
| 2019/0057513 A1 | 2/2019 | Jain et al. | |
| 2019/0063905 A1 | 2/2019 | Venkataraman et al. | |
| 2019/0089947 A1 | 3/2019 | Venkataraman et al. | |
| 2019/0098209 A1 | 3/2019 | Venkataraman et al. | |
| 2019/0109998 A1 | 4/2019 | Venkataraman et al. | |
| 2019/0164341 A1 | 5/2019 | Venkataraman | |
| 2019/0174040 A1 | 6/2019 | Mcmahon | |
| 2019/0197735 A1 | 6/2019 | Xiong et al. | |
| 2019/0215496 A1 | 7/2019 | Mullis et al. | |
| 2019/0230348 A1 | 7/2019 | Ciurea et al. | |
| 2019/0235138 A1 | 8/2019 | Duparre et al. | |
| 2019/0243086 A1 | 8/2019 | Rodda et al. | |
| 2019/0244379 A1 | 8/2019 | Venkataraman | |
| 2019/0268586 A1 | 8/2019 | Mullis | |
| 2019/0289176 A1 | 9/2019 | Duparre | |
| 2019/0347768 A1 | 11/2019 | Lelescu et al. | |
| 2019/0356863 A1 | 11/2019 | Venkataraman et al. | |
| 2019/0362515 A1 | 11/2019 | Ciurea et al. | |
| 2019/0364263 A1 | 11/2019 | Jannard et al. | |
| 2020/0026948 A1 | 1/2020 | Venkataraman et al. | |
| 2020/0151894 A1 | 5/2020 | Jain et al. | |
| 2020/0252597 A1 | 8/2020 | Mullis | |
| 2020/0334905 A1 | 10/2020 | Venkataraman | |
| 2020/0389604 A1 | 12/2020 | Venkataraman et al. | |
| 2021/0042952 A1 | 2/2021 | Jain et al. | |
| 2021/0044790 A1 | 2/2021 | Venkataraman et al. | |
| 2021/0063141 A1 | 3/2021 | Venkataraman et al. | |
| 2021/0084206 A1* | 3/2021 | McEldowney | G06K 9/6278 |
| 2021/0133927 A1 | 5/2021 | Lelescu et al. | |
| 2021/0150748 A1 | 5/2021 | Ciurea et al. | |
| 2021/0264147 A1* | 8/2021 | Kadambi | G06V 20/80 |
| 2021/0264607 A1* | 8/2021 | Kalra | G06T 7/11 |
| 2021/0356572 A1* | 11/2021 | Kadambi | H04N 13/243 |
| 2023/0048725 A1* | 2/2023 | Barbour | G06T 7/0012 |

FOREIGN PATENT DOCUMENTS

| | | |
|---|---|---|
| CN | 1669332 A | 9/2005 |
| CN | 1727991 A | 2/2006 |
| CN | 1839394 A | 9/2006 |
| CN | 1985524 A | 6/2007 |
| CN | 1992499 A | 7/2007 |
| CN | 101010619 A | 8/2007 |
| CN | 101046882 A | 10/2007 |
| CN | 101064780 A | 10/2007 |
| CN | 101102388 A | 1/2008 |
| CN | 101147392 A | 3/2008 |
| CN | 201043890 Y | 4/2008 |
| CN | 101212566 A | 7/2008 |
| CN | 101312540 A | 11/2008 |
| CN | 101427372 A | 5/2009 |
| CN | 101551586 A | 10/2009 |
| CN | 101593350 A | 12/2009 |
| CN | 101606086 A | 12/2009 |
| CN | 101785025 A | 7/2010 |
| CN | 101883291 A | 11/2010 |
| CN | 102037717 A | 4/2011 |
| CN | 102164298 A | 8/2011 |
| CN | 102184720 A | 9/2011 |
| CN | 102375199 A | 3/2012 |
| CN | 103004180 A | 3/2013 |
| CN | 103765864 A | 4/2014 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 105409212 A | 3/2016 |
| CN | 103765864 B | 7/2017 |
| CN | 104081414 B | 8/2017 |
| CN | 104662589 B | 8/2017 |
| CN | 107077743 A | 8/2017 |
| CN | 107230236 A | 10/2017 |
| CN | 107346061 A | 11/2017 |
| CN | 107404609 A | 11/2017 |
| CN | 104685513 B | 4/2018 |
| CN | 107924572 A | 4/2018 |
| CN | 108307675 A | 7/2018 |
| CN | 104335246 B | 9/2018 |
| CN | 107404609 B | 2/2020 |
| CN | 107346061 B | 4/2020 |
| CN | 107230236 B | 12/2020 |
| CN | 108307675 B | 12/2020 |
| CN | 107077743 B | 3/2021 |
| DE | 602011041799.1 | 9/2017 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1734766 A2 | 12/2006 |
| EP | 1991145 A1 | 11/2008 |
| EP | 1243945 B1 | 1/2009 |
| EP | 2026563 A1 | 2/2009 |
| EP | 2031592 A1 | 3/2009 |
| EP | 2041454 A2 | 4/2009 |
| EP | 2072785 A1 | 6/2009 |
| EP | 2104334 A1 | 9/2009 |
| EP | 2136345 A1 | 12/2009 |
| EP | 2156244 A1 | 2/2010 |
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2386554 A1 | 11/2011 |
| EP | 2462477 A1 | 6/2012 |
| EP | 2502115 A2 | 9/2012 |
| EP | 2569935 A1 | 3/2013 |
| EP | 2652678 A1 | 10/2013 |
| EP | 2677066 A1 | 12/2013 |
| EP | 2708019 A1 | 3/2014 |
| EP | 2761534 A1 | 8/2014 |
| EP | 2777245 A1 | 9/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 2973476 A1 | 1/2016 |
| EP | 3066690 A1 | 9/2016 |
| EP | 2569935 B1 | 12/2016 |
| EP | 3201877 A1 | 8/2017 |
| EP | 2652678 B1 | 9/2017 |
| EP | 3284061 A1 | 2/2018 |
| EP | 3286914 A1 | 2/2018 |
| EP | 3201877 A4 | 3/2018 |
| EP | 2817955 B1 | 4/2018 |
| EP | 3328048 A1 | 5/2018 |

(56) References Cited

FOREIGN PATENT DOCUMENTS

| | | |
|---|---|---|
| EP | 3075140 B1 | 6/2018 |
| EP | 3201877 B1 | 12/2018 |
| EP | 3467776 A1 | 4/2019 |
| EP | 2708019 B1 | 10/2019 |
| EP | 3286914 B1 | 12/2019 |
| EP | 2761534 B1 | 11/2020 |
| EP | 2888720 B1 | 3/2021 |
| EP | 3328048 B1 | 4/2021 |
| GB | 2482022 A | 1/2012 |
| IN | 2708/CHENP/2014 | 8/2015 |
| IN | 361194 | 3/2021 |
| JP | 59-025483 | 2/1984 |
| JP | 64-037177 | 2/1989 |
| JP | 02-285772 A | 11/1990 |
| JP | 06129851 A | 5/1994 |
| JP | 07-015457 A | 1/1995 |
| JP | H0756112 A | 3/1995 |
| JP | 09171075 A | 6/1997 |
| JP | 09181913 A | 7/1997 |
| JP | 10253351 A | 9/1998 |
| JP | 11142609 A | 5/1999 |
| JP | 11223708 A | 8/1999 |
| JP | 11325889 A | 11/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002209226 A | 7/2002 |
| JP | 2002250607 A | 9/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005341569 A | 12/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008172735 A | 7/2008 |
| JP | 2008258885 A | 10/2008 |
| JP | 2009064421 A | 3/2009 |
| JP | 2009132010 A | 6/2009 |
| JP | 2009300268 A | 12/2009 |
| JP | 2010139288 A | 6/2010 |
| JP | 2011017764 A | 1/2011 |
| JP | 2011030184 A | 2/2011 |
| JP | 2011109484 A | 6/2011 |
| JP | 2011523538 A | 8/2011 |
| JP | 2011203238 A | 10/2011 |
| JP | 2012504805 A | 2/2012 |
| JP | 2011052064 A1 | 3/2013 |
| JP | 2013509022 A | 3/2013 |
| JP | 2013526801 A | 6/2013 |
| JP | 2014519741 A | 8/2014 |
| JP | 2014521117 A | 8/2014 |
| JP | 2014535191 A | 12/2014 |
| JP | 2015022510 A | 2/2015 |
| JP | 2015522178 A | 8/2015 |
| JP | 2015534734 A | 12/2015 |
| JP | 5848754 B2 | 1/2016 |
| JP | 2016524125 A | 8/2016 |
| JP | 6140709 | 5/2017 |
| JP | 2017163550 A | 9/2017 |
| JP | 2017163587 A | 9/2017 |
| JP | 2017531976 A | 10/2017 |
| JP | 6546613 B2 | 7/2019 |
| JP | 2019-220957 A | 12/2019 |
| JP | 6630891 B2 | 12/2019 |
| JP | 2020017999 A | 1/2020 |
| JP | 6767543 B2 | 9/2020 |
| JP | 6767558 B2 | 9/2020 |
| KR | 1020050004239 A | 1/2005 |
| KR | 100496875 B1 | 6/2005 |
| KR | 1020110097647 A | 8/2011 |
| KR | 20140045373 A | 4/2014 |
| KR | 20170063827 A | 6/2017 |
| KR | 101824672 B1 | 2/2018 |
| KR | 101843994 B1 | 3/2018 |
| KR | 101973822 B1 | 4/2019 |
| KR | 10-2002165 B1 | 7/2019 |
| KR | 10-2111181 B1 | 5/2020 |
| SG | 191151 A1 | 7/2013 |
| SG | 11201500910 R | 10/2015 |
| TW | 200828994 A | 7/2008 |
| TW | 200939739 A | 9/2009 |
| TW | 201228382 A | 7/2012 |
| TW | I535292 B | 5/2016 |
| WO | 1994020875 A3 | 9/1994 |
| WO | 2005057922 A1 | 6/2005 |
| WO | 2006039906 A2 | 4/2006 |
| WO | 2006039906 A3 | 4/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2010037512 A1 | 4/2010 |
| WO | 2011008443 A2 | 1/2011 |
| WO | 2011026527 A1 | 3/2011 |
| WO | 2011046607 A2 | 4/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011121117 A1 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2013166215 A1 | 11/2013 |
| WO | 2014004134 A1 | 1/2014 |
| WO | 2014005123 A1 | 1/2014 |
| WO | 2014031795 A1 | 2/2014 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |

(56) References Cited

FOREIGN PATENT DOCUMENTS

| | | |
|---|---|---|
| WO | 2014131038 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014153098 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015048906 A1 | 4/2015 |
| WO | 2015070105 A1 | 5/2015 |
| WO | 2015074078 A1 | 5/2015 |
| WO | 2015081279 A1 | 6/2015 |
| WO | 2015134996 A1 | 9/2015 |
| WO | 2015183824 A1 | 12/2015 |
| WO | 2016054089 A1 | 4/2016 |
| WO | 2016/172125 | 10/2016 |
| WO | 2016167814 A1 | 10/2016 |
| WO | 2016172125 A9 | 4/2017 |
| WO | 2018053181 A1 | 3/2018 |
| WO | 2019038193 A1 | 2/2019 |
| WO | WO 2021/055585 | 3/2021 |
| WO | WO 2021/108002 | 6/2021 |

OTHER PUBLICATIONS

Zhang et al., "Deep Multimodal Fusion for Semantic Image Segmentation: A Survey", Oct. 2020, pp. 1-58 (Year: 2020).*
Gan et al., "ThreeDWorld: A Platform for Interactive Multi-Modal Physical Simulation", Jul. 9, 2020, arXiV.org (Year: 2020).*
Kondo, Yuhi, et al. "Accurate Polarimetric BRDF for Real Polarization Scene Rendering." *European Conference on Computer Vision*. Springer, Cham, 2020, 17 pages.
Baek, Seung-Hwan, et al. "Image-based acquisition and modeling of polarimetric reflectance." *ACM Transactions on Graphics(Proc. SIGGRAPH 2020)* 39.4 (2020), 14 pages.
Written Opinion and International Search Report for International Application No. PCT/US21/12073, dated Apr. 29, 2021, 10 pages.
Ansari et al., "3-D Face Modeling Using Two Views and a Generic Face Model with Application to 3-D Face Recognition", Proceedings of the IEEE Conference on Advanced Video and Signal Based Surveillance, Jul. 22, 2003, 9 pgs.
Aufderheide et al., "A MEMS-based Smart Sensor System for Estimation of Camera Pose for Computer Vision Applications", Research and Innovation Conference 2011, Jul. 29, 2011, pp. 1-10.
Baker et al., "Limits on Super-Resolution and How to Break Them", IEEE Transactions on Pattern Analysis and Machine Intelligence, Sep. 2002, vol. 24, No. 9, pp. 1167-1183.
Banz et al., "Real-Time Semi-Global Matching Disparity Estimation on the GPU", IEEE Transactions on Pattern Analysis and Machine Intelligence, Sep. 2002, vol. 24, No. 9, pp. 1167-1183.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bennett et al., "Multispectral Bilateral Video Fusion", Computer Graphics (ACM SIGGRAPH Proceedings), Jul. 25, 2006, published Jul. 30, 2006, 1 pg.
Bennett et al., "Multispectral Video Fusion", Computer Graphics (ACM SIGGRAPH Proceedings), Jul. 25, 2006, published Jul. 30, 2006, 1 pg.
Berretti et al., "Face Recognition by Super-Resolved 3D Models from Consumer Depth Cameras", IEEE Transactions on Information Forensics and Security, vol. 9, No. 9, Sep. 2014, pp. 1436-1448.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bertero et al., "Super-resolution in computational imaging", Micron, Jan. 1, 2003, vol. 34, Issues 6-7, 17 pgs.
Bishop et al., "Full-Resolution Depth Map Estimation from an Aliased Plenoptic Light Field", ACCV Nov. 8, 2010, Part II, LNCS 6493, pp. 186-200.
Bishop et al., "Light Field Superresolution", Computational Photography (ICCP), 2009 IEEE International Conference, Conference Date April 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Blanz et al., "A Morphable Model for The Synthesis of 3D Faces", In Proceedings of ACM SIGGRAPH 1999, Jul. 1, 1999, pp. 187-194.
Borman, "Topics in Multiframe Superresolution Restoration", Thesis of Sean Borman, Apr. 2004, 282 pgs.
Borman et al., "Image Sequence Processing", Dekker Encyclopedia of Optical Engineering, Oct. 14, 2002, 81 pgs.
Borman et al., "Linear models for multi-frame super-resolution restoration under non-affine registration and spatially varying PSF", Proc. SPIE, May 21, 2004, vol. 5299, 12 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Borman et al., "Nonlinear Prediction Methods for Estimation of Clique Weighting Parameters in NonGaussian Image Models", Proc. SPIE, Sep. 22, 1998, vol. 3459, 9 pgs.
Borman et al., "Block-Matching Sub-Pixel Motion Estimation from Noisy, Under-Sampled Frames—An Empirical Performance Evaluation", Proc SPIE, Dec. 28, 1998, vol. 3653, 10 pgs.
Borman et al., "Image Resampling and Constraint Formulation for Multi-Frame Super-Resolution Restoration", Proc SPIE, Dec. 28, 1998, vol. 3653, 10 pgs.
Bose et al., "Superresolution and Noise Filtering Using Moving Least Squares", IEEE Transactions on Image Processing, Aug. 2006, vol. 15, Issue 8, published Jul. 17, 2006, pp. 2239-2248.
Boye et al., "Comparison of Subpixel Image Registration Algorithms", Proc, of SPIE—IS&T Electronic Imaging, Feb. 3, 2009, vol. 7246, pp. 72460X-1-72460X-9; doi: 10.1117/12.810369.
Bruckner et al., "Thin wafer-level camera lenses inspired by insect compound eyes", Optics Express, Nov. 22, 2010, vol. 18, No. 24, pp. 24379-24394.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, May 13, 2010, 11 pgs.
Bryan et al., "Perspective Distortion from Interpersonal Distance Is an Implicit Visual Cue for Social Judgments of Faces", PLOS One, vol. 7, Issue 9, Sep. 26, 2012, e45301, doi:10.1371/journal.pone.0045301, 9 pgs.
Bulat et al., "How far are we from solving the 2D & 3D Face Alignment problem? (and a dataset of 230,000 3D facial landmarks)", ARXIV.ORG, Cornell University Library, 201 Olin Library Cornell University Ithaca, NY 14853, Mar. 21, 2017.
Cai et al., "3D Deformable Face Tracking with a Commodity Depth Camera", Proceedings of the European Conference on Computer Vision: Part III, Sep. 5-11, 2010, 14pgs.
Capel, "Image Mosaicing and Super-resolution", Retrieved on Nov. 10, 2012, Retrieved from the Internet at URL:<http://citeseerx.ist.psu.edu/viewdoc/download?doi=10.1.1.226.2643&rep=rep1&type=pdf>, 2001, 269 pgs.
Caron et al., "Multiple camera types simultaneous stereo calibration, Robotics and Automation (ICRA)", 2011 IEEE International Conference on, May 1, 2011 (May 1, 2011), pp. 2933-2938.

(56) References Cited

OTHER PUBLICATIONS

Carroll et al., "Image Warps for Artistic Perspective Manipulation", ACM Transactions on Graphics (TOG), vol. 29, No. 4, Jul. 26, 2010, Article No. 127, 9 pgs.
Chan et al., "Investigation of Computational Compound-Eye Imaging System with Super-Resolution Reconstruction", IEEE, ISASSP, Jun. 19, 2006, pp. 1177-1180.
Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.
Chan et al., "Super-resolution reconstruction in a computational compound-eye imaging system", Multidim. Syst. Sign. Process, published online Feb. 23, 2007, vol. 18, pp. 83-101.
Chen et al., "Interactive deformation of light fields", Symposium on Interactive 3D Graphics, 2005, pp. 139-146.
Chen et al., "KNN Matting", IEEE Transactions on Pattern Analysis and Machine Intelligence, Sep. 2013, vol. 35, No. 9, pp. 2175-2188.
Chen et al., "KNN matting", 2012 IEEE Conference on Computer Vision and Pattern Recognition, Jun. 16-21, 2012, Providence, RI, USA, pp. 869-876.
Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.
Chen et al., "Human Face Modeling and Recognition Through Multi-View High Resolution Stereopsis", IEEE Conference on Computer Vision and Pattern Recognition Workshop, Jun. 17-22, 2006, 6 pgs.
Collins et al., "An Active Camera System for Acquiring Multi-View Video", IEEE 2002 International Conference on Image Processing, Date of Conference: Sep. 22-25, 2002, Rochester, NY, 4 pgs.
Cooper et al., "The perceptual basis of common photographic practice", Journal of Vision, vol. 12, No. 5, Article 8, May 25, 2012, pp. 1-14.
Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pp. 1-5.
Dainese et al., "Accurate Depth-Map Estimation for 3D Face Modeling", IEEE European Signal Processing Conference, Sep. 4-8, 2005, 4 pgs.
Debevec et al., "Recovering High Dynamic Range Radiance Maps from Photographs", Computer Graphics (ACM SIGGRAPH Proceedings), Aug. 16, 1997, 10 pgs.
Do, Minh N. "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., Immersive Visual Communication, IEEE Signal Processing Magazine, vol. 28, Issue 1, Jan. 2011, DOI: 10.1109/MSP.2010.939075, Retrieved from: http://minhdo.ece.illinois.edu/publications/ImmerComm_SPM.pdf, pp. 58-66.
Dou et al., "End-to-end 3D face reconstruction with deep neural networks", arXiv:1704.05020v1, Apr. 17, 2017, 10 pgs.
Drouin et al., "Improving Border Localization of Multi-Baseline Stereo Using Border-Cut", International Journal of Computer Vision, Jul. 5, 2006, vol. 83, Issue 3, 8 pgs.
Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.
Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.
Drulea et al., "Motion Estimation Using the Correlation Transform", IEEE Transactions on Image Processing, August 2013, vol. 22, No. 8, pp. 3260-3270, first published May 14, 2013.
Duparre et al., "Microoptical artificial compound eyes—from design to experimental verification of two different concepts", Proc. of SPIE, Optical Design and Engineering II, vol. 5962, Oct. 17, 2005, pp. 59622A-1-59622A-12.
Duparre et al., Novel Optics/Micro-Optics for Miniature Imaging Systems, Proc. of SPIE, Apr. 21, 2006, vol. 6196, pp. 619607-1-619607-15.
Duparre et al., "Micro-optical artificial compound eyes", Bioinspiration & Biomimetics, Apr. 6, 2006, vol. 1, pp. R1-R16.
Duparre et al., "Artificial compound eye zoom camera", Bioinspiration & Biomimetics, Nov. 21, 2008, vol. 3, pp. 1-6.
Duparre et al., "Artificial apposition compound eye fabricated by micro-optics technology", Applied Optics, Aug. 1, 2004, vol. 43, No. 22, pp. 4303-4310.
Duparre et al., "Micro-optically fabricated artificial apposition compound eye", Electronic Imaging—Science and Technology, Prod. SPIE 5301, Jan. 2004, pp. 25-33.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Artificial compound eyes—different concepts and their application to ultra flat image acquisition sensors", MOEMS and Miniaturized Systems IV, Proc. SPIE 5346, Jan. 24, 2004, pp. 89-100.
Duparre et al., "Ultra-Thin Camera Based on Artificial Apposition Compound Eyes", 10th Microoptics Conference, Sep. 1-3, 2004, 2 pgs.
Duparre et al., "Microoptical telescope compound eye", Optics Express, Feb. 7, 2005, vol. 13, No. 3, pp. 889-903.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Microoptical Artificial Compound Eyes—Two Different Concepts for Compact Imaging Systems", 11th Microoptics Conference, Oct. 30-Nov. 2, 2005, 2 pgs.
Eng et al., "Gaze correction for 3D tele-immersive communication system", IVMSP Workshop, 2013 IEEE 11th. IEEE, Jun. 10, 2013.
Fanaswala, "Regularized Super-Resolution of Multi-View Images", Retrieved on Nov. 10, 2012 (Nov. 11, 2012). Retrieved from the Internet at URL:<http://www.site.uottawa.ca/-edubois/theses/Fanaswala_thesis.pdf>, 2009, 163 pgs.
Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.
Fangmin et al., "3D Face Reconstruction Based on Convolutional Neural Network", 2017 10th International Conference on Intelligent Computation Technology and Automation, Oct. 9-10, 2017, Changsha, China.
Farrell et al., "Resolution and Light Sensitivity Tradeoff with Pixel Size", Proceedings of the SPIE Electronic Imaging 2006 Conference, Feb. 2, 2006, vol. 6069, 8 pgs.
Farsiu et al., "Advances and Challenges in Super-Resolution", International Journal of Imaging Systems and Technology, Aug. 12, 2004, vol. 14, pp. 47-57.
Farsiu et al., "Fast and Robust Multiframe Super Resolution", IEEE Transactions on Image Processing, Oct. 2004, published Sep. 3, 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.
Fechteler et al., Fast and High Resolution 3D Face Scanning, IEEE International Conference on Image Processing, Sep. 16-Oct. 19, 2007, 4 pgs.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.

(56) References Cited

OTHER PUBLICATIONS

Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 49-58.
Fischer et al., "Optical System Design", 2nd Edition, SPIE Press, Feb. 14, 2008, pp. 191-198.
Garg et al., "Unsupervised CNN for Single View Depth Estimation: Geometry to the Rescue", In European Conference on Computer Vision, Springer, Cham, Jul. 2016, 16 pgs.
Gastal et al., "Shared Sampling for Real-Time Alpha Matting", Computer Graphics Forum, EUROGRAPHICS 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Godard et al., "Unsupervised Monocular Depth Estimation with Left-Right Consistency", In Proceedings of the IEEE Conference on Computer Vision and Pattern Recognition, 2017, 14 pgs.
Goldman et al., "Video Object Annotation, Navigation, and Composition", In Proceedings of UIST 2008, Oct. 19-22, 2008, Monterey CA, USA, pp. 3-12.
Goodfellow et al., "Generative Adversarial Nets, 2014. Generative adversarial nets", In Advances in Neural Information Processing Systems (pp. 2672-2680).
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Hacohen et al., "Non-Rigid Dense Correspondence with Applications for Image Enhancement", ACM Transactions on Graphics, vol. 30, No. 4, Aug. 7, 2011, 9 pgs.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Search-and-Replace Editing for Personal Photo Collections", 2010 International Conference: Computational Photography (ICCP) Mar. 2010, pp. 1-8.
Hernandez et al., "Laser Scan Quality 3-D Face Modeling Using a Low-Cost Depth Camera", 20th European Signal Processing Conference, Aug. 27-31, 2012, Bucharest, Romania, pp. 1995-1999.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Higo et al., "A Hand-held Photometric Stereo Camera for 3-D Modeling", IEEE International Conference on Computer Vision, 2009, pp. 1234-1241.
Hirschmuller, "Accurate and Efficient Stereo Processing by Semi-Global Matching and Mutual Information", IEEE Conference on Computer Vision and Pattern Recognition (CVPR), San Diego, CA, USA, Jun. 20-26, 2005, 8 pgs.
Hirschmuller et al., "Memory Efficient Semi-Global Matching, ISPRS Annals of the Photogrammetry", Remote Sensing and Spatial Information Sciences, vol. I-3, 2012, XXII ISPRS Congress, Aug. 25-Sep. 1, 2012, Melbourne, Australia, 6 pgs.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pgs.
Holoeye Photonics AG, "LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pgs.
Horisaki et al., "Superposition Imaging for Three-Dimensionally Space-Invariant Point Spread Functions", Applied Physics Express, Oct. 13, 2011, vol. 4, pp. 112501-1-112501-3.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horn et al., "LightShop: Interactive Light Field Manipulation and Rendering", In Proceedings of I3D, Jan. 1, 2007, pp. 121-128.
Hossain et al., "Inexpensive Construction of a 3D Face Model from Stereo Images", IEEE International Conference on Computerand Information Technology, Dec. 27-29, 2007, 6 pgs.
Hu et al., "A Quantitative Evaluation of Confidence Measures for Stereo Vision", IEEE Transactions on Pattern Analysis and Machine Intelligence, vol. 34, Issue 11, Nov. 2012, pp. 2121-2133.
Humenberger er al., "A Census-Based Stereo Vision Algorithm Using Modified Semi-Global Matching and Plane Fitting to Improve Matching Quality", IEEE Computer Society Conference on Computer Vision and Pattern Recognition Workshops (CVPRW), IEEE, Jun. 13-18, 2010, San Francisco, CA, 8 pgs.
Isaksen et al., "Dynamically Reparameterized Light Fields", In Proceedings of SIGGRAPH 2000, 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Jackson et al., "Large Post 3D Face Reconstruction from a Single Image via Direct Volumetric CNN Regression", arXiv: 1703.07834v2, Sep. 8, 2017, 9 pgs.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), vol. 1, Jun. 17-22, 2006, New York, NY, USA, pp. 371-378.
Joshi, Color Calibration for Arrays of Inexpensive Image Sensors, Mitsubishi Electric Research Laboratories, Inc., TR2004-137, Dec. 2004, 6 pgs.
Joshi et al., "Synthetic Aperture Tracking: Tracking Through Occlusions", I CCV IEEE 11th International Conference on Computer Vision; Publication [online], Oct. 2007 [retrieved Jul. 28, 2014], Retrieved from the Internet <URL: http:l/ieeexplore.ieee.org/stamp/stamp.jsp?tp=&arnumber=4409032&isnumber=4408819>, pp. 1-8.
Jourabloo, "Large-Pose Face Alignment via CNN-Based Dense 3D Model Fitting", I CCV IEEE 11th International Conference on Computer Vision; Publication [online], Oct. 2007 [retrieved Jul. 28, 2014], Retrieved from the Internet: <URL http:l/ieeexplore.ieee.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. 1-103-1-110.
Keeton, "Memory-Driven Computing", Hewlett Packard Enterprise Company, Oct. 20, 2016, 45 pgs.
Kim, "Scene Reconstruction from a Light Field", Master Thesis, Sep. 1, 2010 (Sep. 1, 2010), pp. 1-72.

(56) References Cited

OTHER PUBLICATIONS

Kim et al., "Scene reconstruction from high spatio-angular resolution light fields", ACM Transactions on Graphics (TOG)—SIGGRAPH 2013 Conference Proceedings, vol. 32 Issue 4, Article 73, Jul. 21, 2013, 11 pages.
Kitamura et al., "Reconstruction of a high-resolution image on a compound-eye image-capturing system", Applied Optics, Mar. 10, 2004, vol. 43, No. 8, pp. 1719-1727.
Kittler et al., "3D Assisted Face Recognition: A Survey of 3D Imaging, Modelling, and Recognition Approaches", Proceedings of the IEEE Computer Society Conference on Computer Vision and Pattern Recognition, Jul. 2005, 7 pgs.
Konolige, Kurt "Projected Texture Stereo", 2010 IEEE International Conference on Robotics and Automation, May 3-7, 2010, pp. 148-155.
Kotsia et al., "Facial Expression Recognition in Image Sequences Using Geometric Deformation Features and Support Vector Machines", IEEE Transactions on Image Processing, Jan. 2007, vol. 16, No. 1, pp. 172-187.
Krishnamurthy et al., "Compression and Transmission of Depth Maps for Image-Based Rendering", Image Processing, 2001, pp. 828-831.
Kubota et al., "Reconstructing Dense Light Field From Array of Multifocus Images for Novel View Synthesis", IEEE Transactions on Image Processing, vol. 16, No. 1, Jan. 2007, pp. 269-279.
Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.
Lai et al., "A Large-Scale Hierarchical Multi-View RGB-D Object Dataset", Proceedings—IEEE International Conference on Robotics and Automation, Conference Date May 9-13, 2011, 8 pgs., DOI:10.1109/ICRA.201135980382.
Lane et al., "A Survey of Mobile Phone Sensing", IEEE Communications Magazine, vol. 48, Issue 9, Sep. 2010, pp. 140-150.
Lao et al., "3D template matching for pose invariant face recognition using 3D facial model built with isoluminance line based stereo vision", Proceedings 15th International Conference on Pattern Recognition, Sep. 3-7, 2000, Barcelona, Spain, pp. 911-916.
Lee, "NFC Hacking: The Easy Way", Defcon Hacking Conference, 2012, 24 pgs.
Lee et al., "Electroactive Polymer Actuator for Lens-Drive Unit in Auto-Focus Compact Camera Module", ETRI Journal, vol. 31, No. 6, Dec. 2009, pp. 695-702.
Lee et al., "Nonlocal matting", CVPR 2011, Jun. 20-25, 2011, pp. 2193-2200.
Lee et al., "Automatic Upright Adjustment of Photographs", IEEE Conference on Computer Vision and Pattern Recognition (CVPR), 2012, pp. 877-884.
Lensvector, "How LensVector Autofocus Works", 2010, printed Nov. 2, 2012 from http://www.lensvector.com/overview.html, 1 pg.
Levin et al., "A Closed Form Solution to Natural Image Matting", IEEE Conference on Computer Vision and Pattern Recognition (CVPR), 2006, vol. 1, pp. 61-68.
Levin et al., "Spectral Matting", 2007 IEEE Conference on Computer Vision and Pattern Recognition, Jun. 17-22, 2007, Minneapolis, MN, USA, pp. 1-8.
Levoy, "Light Fields and Computational Imaging", IEEE Computer Society, Sep. 1, 2006, vol. 39, Issue No. 8, pp. 46-55.
Levoy et al., "Light Field Rendering", Proc. ADM SIGGRAPH '96, 1996, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Li et al., "Fusing Images with Different Focuses Using Support Vector Machines", IEEE Transactions on Neural Networks, vol. 15, No. 6, Nov. 8, 2004, pp. 1555-1561.

Lim, "Optimized Projection Pattern Supplementing Stereo Systems", 2009 IEEE International Conference on Robotics and Automation, May 12-17, 2009, pp. 2823-2829.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Ma et al., "Constant Time Weighted Median Filtering for Stereo Matching and Beyond", ICCV'13 Proceedings of the 2013 IEEE International Conference on Computer Vision, IEEE Computer Society, Washington DC, USA, Dec. 1-8, 2013, 8 pgs.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
McGuire et al., "Defocus video matting", ACM Transactions on Graphics (TOG)—Proceedings of ACM SIGGRAPH 2005, vol. 24, Issue 3, Jul. 2005, pp. 567-576.
Medioni et al., "Face Modeling and Recognition in 3-D", Proceedings of the IEEE International Workshop on Analysis and Modeling of Faces and Gestures, 2013, 2 pgs.
Merkle et al., "Adaptation and optimization of coding algorithms for mobile 3DTV", Mobile3DTV Project No. 216503, Nov. 2008, 55 pgs.
Michael et al., "Real-time Stereo Vision: Optimizing Semi-Global Matching", 2013 IEEE Intelligent Vehicles Symposium (IV), IEEE, Jun. 23-26, 2013, Australia, 6 pgs.
Milella et al., "3D reconstruction and classification of natural environments by an autonomous vehicle using multi-baseline stereo", Intelligent Service Robotics, vol. 7, No. 2, Mar. 2, 2014, pp. 79-92.
Min et al., "Real-Time 3D Face Identification from a Depth Camera", Proceedings of the IEEE International Conference on Pattern Recognition, Nov. 11-15, 2012, 4 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pgs.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 14, 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Ng et al., "Light Field Photography with a Hand-held Plenoptic Camera", Stanford Tech Report CTSR 2005-02, Apr. 20, 2005, pp. 1-11.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.
Nguyen et al., "Error Analysis for Image-Based Rendering with Depth Information", IEEE Transactions on Image Processing, vol. 18, Issue 4, Apr. 2009, pp. 703-716.
Nishihara, H.K. "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Super-Resolution Image Reconstruction", IEEE Signal Processing Magazine, May 2003, pp. 21-36.

(56) References Cited

OTHER PUBLICATIONS

Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "3D Face Reconstruction from Stereo Video", First International Workshop on Video Processing for Security, Jun. 7-9, 2006, Quebec City, Canada, 2006, 8 pgs.
Parkkinen et al., "Characteristic Spectra of Munsell Colors", Journal of the Optical Society of America A, vol. 6, Issue 2, Feb. 1989, pp. 318-322.
Perwass et al., "Single Lens 3D-Camera with Extended Depth-of-Field", printed from www.raytrix.de, Jan. 22, 2012, 15 pgs.
Pham et al., "Robust Super-Resolution without Regularization", Journal of Physics: Conference Series 124, Jul. 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds from Real World Events", Proc. of IEEE Visualization '97, Phoenix, Arizona, Oct. 19-24, 1997, pp. 277-283, 552.
Ranjan et al., "HyperFace: A Deep Multi-Task Learning Framework for Face Detection, Landmark Localization, Pose Estimation, and Gender Recognition", May 11, 2016 (May 11, 2016), pp. 1-16.
Rhemann et al., "Fast Cost-Volume Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robert et al., "Dense Depth Map Reconstruction: A Minimization and Regularization Approach which Preserves Discontinuities", European Conference on Computer Vision (ECCV), pp. 439-451, (1996).
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Rusinkiewicz et al., "Real-Time 3D Model Acquisition", ACM Transactions on Graphics (TOG), vol. 21, No. 3, Jul. 2002, pp. 438-446.
Saatci et al., "Cascaded Classification of Gender and Facial Expression using Active Appearance Models", IEEE, FGR'06, 2006, 6 pgs.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Seitz et al., "Plenoptic Image Editing", International Journal of Computer Vision 48, Conference Date Jan. 7, 1998, 29 pgs., DOI: 10.1109/ICCV.1998.710696 • Source: DBLP Conference: Computer Vision, Sixth International Conference.
Shechtman et al., "Increasing Space-Time Resolution in Video", European Conference on Computer Vision, LNCS 2350, May 28-31, 2002, pp. 753-768.
Shotton et al., "Real-time human pose recognition in parts from single depth images", CVPR 2011, Jun. 20-25, 2011, Colorado Springs, CO, USA, pp. 1297-1304.
Shum et al., "Pop-Up Light Field: An Interactive Image-Based Modeling and Rendering System", Apr. 2004, ACM Transactions on Graphics, vol. 23, No. 2, pp. 143-162, Retrieved from http://131.107.65.14/en-us/um/people/jiansun/papers/PopupLightField_TOG.pdf on Feb. 5, 2014.
Shum et al., "A Review of Image-based Rendering Techniques", Visual Communications and Image Processing 2000, May 2000, 12 pgs.
Sibbing et al., "Markerless reconstruction of dynamic facial expressions", 2009 IEEE 12th International Conference on Computer Vision Workshops, ICCV Workshop: Kyoto, Japan, Sep. 27-Oct. 4, 2009, Institute of Electrical and Electronics Engineers, Piscataway, NJ, Sep. 27, 2009 (Sep. 27, 2009), pp. 1778-1785.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Taguchi et al., "Rendering-Oriented Decoding fora Distributed Multiview Coding System Using a Coset Code", Hindawi Publishing Corporation, EURASIP Journal on Image and Video Processing, vol. 2009, Article ID 251081, Online: Apr. 22, 2009, 12 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Thin observation module by bound optics (TOMBO): concept and experimental verification", Applied Optics, Apr. 10, 2001, vol. 40, No. 11, pp. 1806-1813.
Tanida et al., "Color imaging with an integrated compound imaging system", Optics Express, Sep. 8, 2003, vol. 11, No. 18, pp. 2109-2117.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Taylor, "Virtual camera movement: The way of the future?", American Cinematographer, vol. 77, No. 9, Sep. 1996, pp. 93-100.
Tseng et al., "Automatic 3-D depth recovery from a single urban-scene image", 2012 Visual Communications and Image Processing, Nov. 27-30, 2012, San Diego, CA, USA, pp. 1-6.
Uchida et al., 3D Face Recognition Using Passive Stereo Vision, IEEE International Conference on Image Processing 2005, Sep. 14, 2005, 4 pgs.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.

(56) References Cited

OTHER PUBLICATIONS

Vaish et al., "Using Plane + Parallax for Calibrating Dense Camera Arrays", IEEE Conference on Computer Vision and Pattern Recognition (CVPR), 2004, 8 pgs.

Vaish et al., "Synthetic Aperture Focusing Using a Shear-Warp Factorization of the Viewing Transform", IEEE Workshop on A3DISS, CVPR, 2005, 8 pgs.

Van Der Wal et al., "The Acadia Vision Processor", Proceedings Fifth IEEE International Workshop on Computer Architectures for Machine Perception, Sep. 13, 2000, Padova, Italy, pp. 31-40.

Veilleux, "CCD Gain Lab: The Theory", University of Maryland, College Park-Observational Astronomy (ASTR 310), Oct. 19, 2006, pp. 1-5 (online), [retrieved on May 13, 2014], Retrieved from the Internet <URL: http://www.astro.umd.edu/~veilleux/ASTR310/fall06/ccd_theory.pdf, 5 pgs.

Venkataraman et al., "PiCam: An Ultra-Thin High Performance Monolithic Camera Array", ACM Transactions on Graphics (TOG), ACM, US, vol. 32, No. 6, 1 Nov. 1, 2013, pp. 1-13.

Vetro et al., "Coding Approaches for End-To-End 3D TV Systems", Mitsubishi Electric Research Laboratories, Inc., TR2004-137, Dec. 2004, 6 pgs.

Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.

Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008, 5 pgs.

Wang, "Calculation of Image Position, Size and Orientation Using First Order Properties", Dec. 29, 2010, OPTI521 Tutorial, 10 pgs.

Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pg., published Aug. 5, 2007.

Wang et al., "Automatic Natural Video Matting with Depth", 15th Pacific Conference on Computer Graphics and Applications, PG '07, Oct. 29-Nov. 2, 2007, Maui, HI, USA, pp. 469-472.

Wang et al., "Image and Video Matting: A Survey", Foundations and Trends, Computer Graphics and Vision, vol. 3, No. 2, 2007, pp. 91-175.

Wang et al., "Facial Feature Point Detection: A Comprehensive Survey", arXiv: 1410.1037v1, Oct. 4, 2014, 32 pgs.

Wetzstein et al., "Computational Plenoptic Imaging", Computer Graphics Forum, 2011, vol. 30, No. 8, pp. 2397-2426.

Wheeler et al., "Super-Resolution Image Synthesis Using Projections Onto Convex Sets in the Frequency Domain", Proc. SPIE, Mar. 11, 2005, vol. 5674, 12 pgs.

Widanagamaachchi et al., "3D Face Recognition from 2D Images: A Survey", Proceedings of the International Conference on Digital Image Computing: Techniques and Applications, Dec. 1-3, 2008, 7 pgs.

Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.

Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.

Wilburn, "High Performance Imaging Using Arrays of Inexpensive Cameras", Thesis of Bennett Wilburn, Dec. 2004, 128 pgs.

Wilburn et al., "High Performance Imaging Using Large Camera Arrays", ACM Transactions on Graphics, Jul. 2005, vol. 24, No. 3, pp. 1-12.

Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.

Wilburn et al., "The Light Field Video Camera", Proceedings of Media Processors 2002, SPIE Electronic Imaging, 2002, 8 pgs.

Wippermann et al., "Design and fabrication of a chirped array of refractive ellipsoidal micro-lenses for an apposition eye camera objective", Proceedings of SPIE, Optical Design and Engineering II, Oct. 15, 2005, pp. 59622C-1-59622C-11.

Wu et al., "A virtual view synthesis algorithm based on image inpainting", 2012 Third International Conference on Networking and Distributed Computing, Hangzhou, China, Oct. 21-24, 2012, pp. 153-156.

Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.

Yang et al., "Superresolution Using Preconditioned Conjugate Gradient Method", Proceedings of SPIE—The International Society for Optical Engineering, Jul. 2002, 8 pgs.

Yang et al., "A Real-Time Distributed Light Field Camera", Eurographics Workshop on Rendering (2002), published Jul. 26, 2002, pp. 1-10.

Yang et al., Model-based Head Pose Tracking with Stereovision, Microsoft Research, Technical Report, MSR-TR-2001-102, Oct. 2001, 12 pgs.

Yokochi et al., "Extrinsic Camera Parameter Estimation Based-on Feature Tracking and GPS Data", 2006, Nara Institute of Science and Technology, Graduate School of Information Science, LNCS 3851, pp. 369-378.

Zbontar et al., Computing the Stereo Matching Cost with a Convolutional Neural Network, CVPR, 2015, pp. 1592-1599.

Zhang et al., "A Self-Reconfigurable Camera Array", Eurographics Symposium on Rendering, published Aug. 8, 2004, 12 pgs.

Zhang et al., "Depth estimation, spatially variant image registration, and super-resolution using a multi-lenslet camera", proceedings of SPIE, vol. 7705, Apr. 23, 2010, pp. 770505-770505-8, XP055113797 ISSN: 0277-786X, DOI: 10.1117/12.852171.

Zhang et al., "Spacetime Faces: High Resolution Capture for Modeling and Animation", ACM Transactions on Graphics, 2004, 11pgs.

Zheng et al., "Balloon Motion Estimation Using Two Frames", Proceedings of the Asilomar Conference on Signals, Systems and Computers, IEEE, Comp. Soc. Press, US, vol. 2 of 2, Nov. 4, 1991, pp. 1057-1061.

Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.

Zomet et al., "Robust Super-Resolution", IEEE, 2001, pp. 1-6.

"File Formats Version 6", Alias Systems, 2004, 40 pgs.

"Light fields and computational photography", Stanford Computer Graphics Laboratory, Retrieved from: http://graphics.stanford.edu/projects/lightfield/, Earliest publication online: Feb. 10, 1997, 3 pgs.

"Exchangeable image file format for digital still cameras: Exif Version 2.2"_, Japan Electronics and Information Technology Industries Association, Prepared by Technical Standardization Committee on AV & IT Storage Systems and Equipment, JEITA CP-3451, Apr. 2002, Retrieved from: http://www.exif.org/Exif2-2.PDF, 154 pgs.

International Preliminary Report on Patentability International Application No. PCT/US21/12073, dated Aug. 11, 2022, 7 pages.

Chen et al., "Fast patch-based style transfer of arbitrary style," CoRR, Dec. 13, 2016, arXiv:1612.04337, 10 pages.

Deng et al., "ImageNet: A Large-Scale Hierarchical Image Database," IEEE Computer Vision and Pattern Recognition (CVPR), Jun. 20-25, 2009, 8 pages.

Dundar et al., "Domain stylization: A strong, simple baseline for synthetic to real image domain adaptation," CoRR, Jul. 24, 2018, arXiv:1807.09384, 10 pages.

Karras et al., "Analyzing and improving the image quality of stylegan," Proceedings of the IEEE/CVF Conference on Computer Vision and Pattern Recognition (CVPR), 2020, pp. 8110-8119.

(56) References Cited

OTHER PUBLICATIONS

Liu et al., "Somewhere over the rainbow: An empirical assessment of quantitative colormaps," Proceedings of the 2018 CHI Conference on Human Factors in Computing Systems, Apr. 2018, 598:1-12.

Ramamoorthi et al., "A Signal-Processing Framework for Inverse Rendering," Proceedings of the 28th Annual Conference on Computer Graphics and Interactive Techniques, Aug. 2001, pp. 117-128.

Ramamoorthi, "A Signal-Processing Framework for Forward and Inverse Rendering," Dissertation for the degree of Doctor of Philosophy, Stanford University, Department of Computer Science, Aug. 2002, 207 pages.

Smirnov et al., "Hard example mining with auxiliary embeddings," Proceedings of the IEEE Conference on Computer Vision and Pattern Recognition Workshops (CVPR), 2018, pp. 37-46.

\* cited by examiner

SYSTEMS AND METHODS FOR SYNTHESIZING DATA FOR TRAINING STATISTICAL MODELS ON DIFFERENT IMAGING MODALITIES INCLUDING POLARIZED IMAGES

CROSS-REFERENCE TO RELATED APPLICATION(S)

This application is a U.S. National Phase Patent Application of International Application Number PCT/US2021/012073 filed on Jan. 4, 2021, which claims priority to and the benefit of U.S. Provisional Patent Application No. 62/968,038, filed in the United States Patent and Trademark Office on Jan. 30, 2020, the entire disclosure of each of which is incorporated by reference herein.

FIELD

Aspects of embodiments of the present disclosure relate to machine learning techniques, in particular the synthesis or generation of data for training machine learning models.

BACKGROUND

Statistical models such as machine learning models are generally trained using large amounts of data. In the field of computer vision, the training data generally includes labeled images, which are used to train deep learning models, such as convolutional neural networks, to perform computer vision tasks such as image classification and instance segmentation. However, manually collecting photographs of various scenes and labeling the photographs is time consuming and expensive. Some techniques for augmenting these training data sets include generating synthetic training data. For example, three-dimensional (3-D) computer graphics rendering engines (e.g., scanline rendering engines and ray tracing rendering engines) are capable of generating photorealistic two-dimensional (2-D) images of virtual environments of arrangements of 3-D models of objects that can be used for training deep learning models.

SUMMARY

Aspects of embodiments of the present disclosure relate to machine learning techniques, in particular the synthesis or generation of data for training machine learning models. In particular, aspects of embodiments of the present disclosure relate to synthesizing images for training machine learning models to perform computer vision tasks on input images that are captured based on imaging modalities other than images of the intensity of visible light in a scene.

According to one embodiment of the present disclosure, a method of generating synthetic images of virtual scenes includes: placing, by a synthetic data generator implemented by a processor and memory, three-dimensional (3-D) models of objects in a 3-D virtual scene; adding, by the synthetic data generator, lighting to the 3-D virtual scene, the lighting including one or more illumination sources; applying, by the synthetic data generator, imaging modality-specific materials to the 3-D models of objects in the 3-D virtual scene in accordance with a selected imaging modality, each of the imaging modality-specific materials including an empirical model; setting a scene background in accordance with the selected imaging modality; and rendering, by the synthetic data generator, a two-dimensional image of the 3-D virtual scene based on the selected imaging modality to generate a synthetic image in accordance with the selected imaging modality.

The empirical model may be generated based on sampled images captured of a surface of a material using an imaging system configured to capture images using the selected imaging modality, the sampled images may include images captured of the surface of the material from a plurality of different poses with respect to a normal direction of the surface of the material.

The selected imaging modality may be polarization and the imaging system includes a polarization camera.

The selected imaging modality may be thermal and the imaging system may include a thermal camera. The thermal camera may include a polarizing filter.

Each of the sampled images may be stored in association with the corresponding angle of its pose with respect to the normal direction of the surface of the material.

The sampled images may include: a first plurality of sampled images captured of the surface of the material illuminated by light having a first spectral profile; and a second plurality of sampled images captured of the surface of the material illuminated by light having a second spectral profile different from the first spectral profile.

The empirical model may include a surface light field function computed by interpolating between two or more of the sampled images.

The empirical model may include a surface light field function computed by a deep neural network trained on the sampled images.

The empirical model may include a surface light field function computed by a generative adversarial network trained on the sampled images.

The empirical model may include a surface light field function computed by a mathematical model generated based on the sampled images.

The method may further include applying style transfer to the synthetic image.

According to one embodiment of the present disclosure, a method for generating tensors in polarization feature space for a 3-D virtual scene, includes: rendering, by a synthetic data generator implemented by a processor and memory, an image of surface normals of a 3-D virtual scene including a plurality of 3-D models of objects, the surface normals including an azimuth angle component and a zenith angle component; determining, by the synthetic data generator, for a surface of a 3-D model of an object of the 3-D virtual scene, a material of the object; and computing, by the synthetic data generator, the tensors in polarization feature space in accordance with the azimuth angle component and the zenith angle component of the surface normal, the tensors in polarization feature space including: a degree of linear polarization; and an angle of linear polarization at the surface of the object.

The method may further include: determining whether the surface of the 3-D model of the object is specular dominant; computing the tensors in polarization feature space based on specular polarization equations in response to determining that the surface of the 3-D model of the object is specular dominant; and computing the tensors in polarization feature space based on diffuse polarization equations in response to determining that the surface of the 3-D model of the object is specular dominant.

The method may further include: computing the tensors in polarization feature space based on diffuse polarization equations.

The method may further include applying style transfer to the tensors in polarization feature space.

According to one embodiment of the present disclosure, a method for synthesizing a training data set based on generating a plurality of synthetic images generated in accordance with any of the above methods.

According to one embodiment of the present disclosure, a method for training a machine learning model includes: generating a training data set in accordance with any of the above methods; and computing parameters of the machine learning model based on the training data set.

According to one embodiment of the present disclosure, a system for generating synthetic images of virtual scenes includes: a processor; and memory storing instructions that, when executed by the processor, cause the processor to implement a synthetic data generator to: place three-dimensional (3-D) models of objects in a 3-D virtual scene; add lighting to the 3-D virtual scene, the lighting including one or more illumination sources; apply imaging modality-specific materials to the 3-D models of objects in the 3-D virtual scene in accordance with a selected imaging modality, each of the imaging modality-specific materials including an empirical model; set a scene background in accordance with the selected imaging modality; and render a two-dimensional image of the 3-D virtual scene based on the selected imaging modality to generate a synthetic image in accordance with the selected imaging modality.

The empirical model may be generated based on sampled images captured of a surface of a material using an imaging system configured to capture images using the selected imaging modality, and the sampled images may include images captured of the surface of the material from a plurality of different poses with respect to a normal direction of the surface of the material.

The selected imaging modality may be polarization and the imaging system may include a polarization camera.

The selected imaging modality may be thermal and the imaging system may include a thermal camera. The thermal camera may include a polarizing filter.

Each of the sampled images may be stored in association with the corresponding angle of its pose with respect to the normal direction of the surface of the material.

The sampled images may include: a first plurality of sampled images captured of the surface of the material illuminated by light having a first spectral profile; and a second plurality of sampled images captured of the surface of the material illuminated by light having a second spectral profile different from the first spectral profile.

The empirical model may include a surface light field function computed by interpolating between two or more of the sampled images.

The empirical model may include a surface light field function computed by a deep neural network trained on the sampled images.

The empirical model may include a surface light field function computed by a generative adversarial network trained on the sampled images.

The empirical model may include a surface light field function computed by a mathematical model generated based on the sampled images.

The memory may further store instructions that, when executed by the processor, cause the synthetic data generator to apply style transfer to the synthetic image.

According to one embodiment of the present disclosure, a system for generating tensors in polarization feature space for a 3-D virtual scene includes: a processor; and memory storing instructions that, when executed by the processor, cause the processor to implement a synthetic data generator to: render an image of surface normals of a 3-D virtual scene including a plurality of 3-D models of objects, the surface normals including an azimuth angle component and a zenith angle component; determine for a surface of a 3-D model of an object of the 3-D virtual scene, a material of the object; and compute the tensors in polarization feature space in accordance with the azimuth angle component and the zenith angle component of the surface normal, the tensors in polarization feature space including: a degree of linear polarization; and an angle of linear polarization at the surface of the object.

The memory may further store instructions that, when executed by the processor, cause the synthetic data generator to: determine whether the surface of the 3-D model of the object is specular dominant; compute the tensors in polarization feature space based on specular polarization equations in response to determining that the surface of the 3-D model of the object is specular dominant; and compute the tensors in polarization feature space based on diffuse polarization equations in response to determining that the surface of the 3-D model of the object is specular dominant.

The memory may further store instructions that, when executed by the processor, cause the synthetic data generator to: compute the tensors in polarization feature space based on diffuse polarization equations.

The memory may further store instructions that, when executed by the processor, cause the synthetic data generator to: apply style transfer to the tensors in polarization feature space.

According to one embodiment of the present disclosure, a system for synthesizing a training data set is configured to synthesize the training data set using the system of any of the above systems.

According to one embodiment of the present disclosure, a system for training a machine learning model includes: a processor; and memory storing instructions that, when executed by the processor, cause the processor to: receive a training data set generated by any of the above systems; and compute parameters of the machine learning model based on the training data set.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
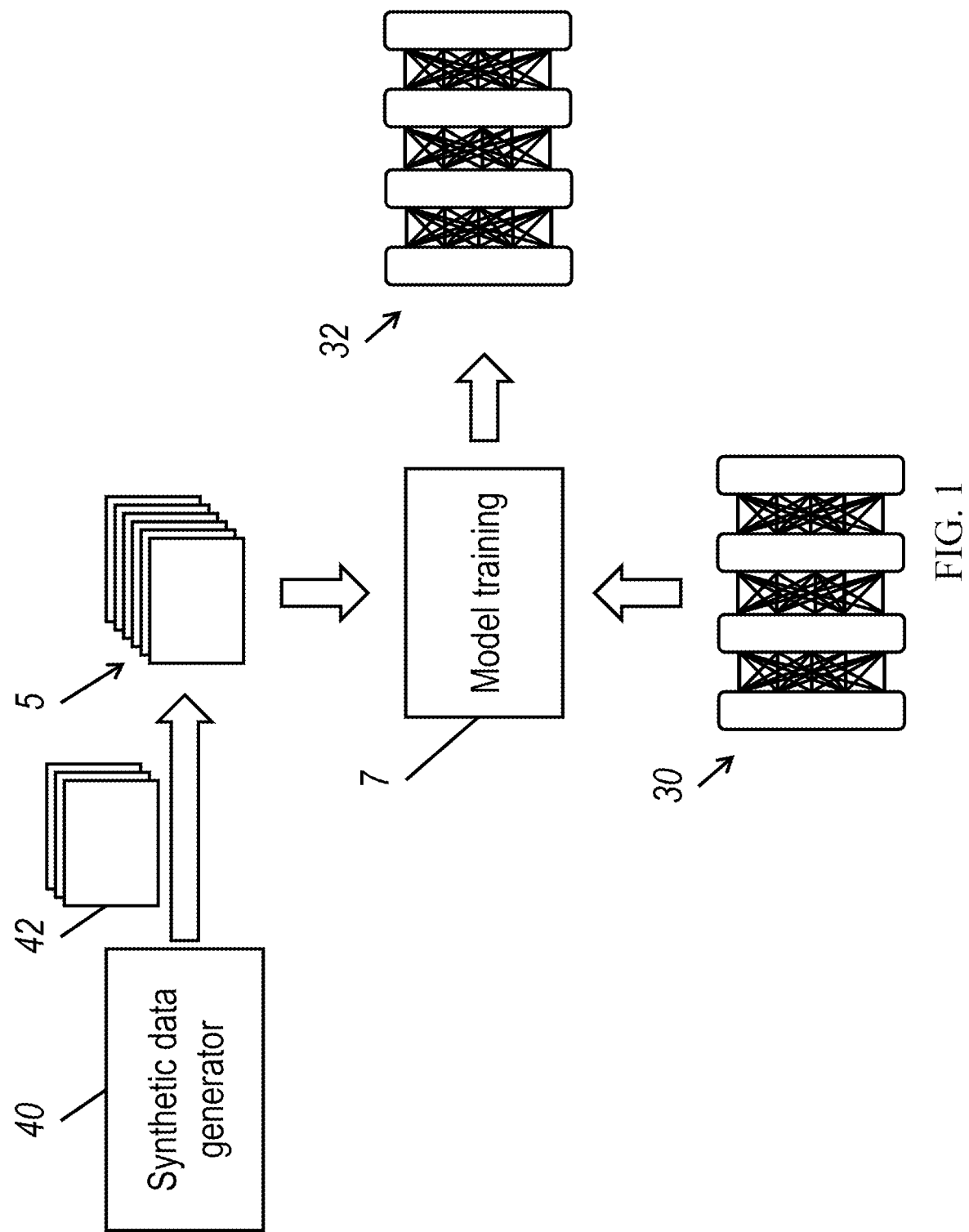
FIG. 1 is a block diagram depicting a system for training a statistical model to perform computer vision tasks based on images in various modalities, where the training is performed using data generated in accordance with embodiments of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present disclosure relate to systems and methods for synthesizing or generating data for training machine learning models for performing computer vision tasks on images captured based on modalities other than standard modalities such as color or monochrome cameras configured to capture images based on the intensity of visible light. Examples of other modalities include images captured based on polarized light (e.g., images captured with a polarizing filter or polarization filter in an optical path of the camera for capturing circularly and/or linearly polarized light), non-visible or invisible light (e.g., light in the infrared or ultraviolet ranges), and combinations thereof (e.g., polarized infrared light), however, embodiments of the present disclosure are not limited thereto and may be applied to other multi-spectral imaging techniques.

In more detail, aspects of embodiments of the present disclosure relate to generating synthetic images of objects in different imaging modalities for training a machine learning model to perform a computer vision task.

Generally, a computer vision system for computing segmentation maps that classify objects depicted in a scene may include a trained convolutional neural network that takes two-dimensional images (e.g., as captured by a color camera) as input and outputs segmentation maps based on those images. Such a convolutional neural network may be a pre-trained on an existing data set such as ImageNet (see, e.g., see, e.g., J. Deng, W. Dong, R. Socher, L.-J. Li, K. Li and L. Fei-Fei, ImageNet: A Large-Scale Hierarchical Image Database. *IEEE Computer Vision and Pattern Recognition (CVPR)*, 2009). However, these existing data sets may contain images that are not representative of the images that are expected to be encountered in the particular application of the computer vision system, and therefore these pre-trained models may have poor performance on the particular computer vision task that the computer vision system is intended to perform. For example, a computer vision system for a manufacturing environment is more likely to encounter images of tools, partially assembled products, manufacturing components, and the like, rather than images of people, animals, household objects, and outdoors environments that may be found in more "general purpose" data sets.

As such, "retraining" relates to updating the parameters (e.g., connection weights) of a pre-trained model based on additional training data from a particular target domain associated with the task to be performed by the re-trained model. Continuing the above example, labeled images of tools, partially assembled products, components, and the like from a particular manufacturing environment may be used as training data for retraining a pre-trained model (e.g., a pre-trained convolutional neural network) to improve its performance in detecting and classifying objects encountered in that manufacturing environment. However, manually collecting different images of typical scenes in that manufacturing environment and labeling these images based on their ground truth values (e.g., identifying pixels that correspond to different classes of objects) is generally a time consuming and expensive task.

As noted above, three-dimensional (3-D) rendering computer graphics software may be used to generate training data for training machine learning models for performing computer vision tasks. For example, existing 3-D models of those tools, partially assembled products, and manufacturing components may be arranged in a virtual scene in accordance with the variety of ways in which such objects may be encountered in the real-world (e.g., including lighting conditions and 3-D models of support surfaces and equipment in the environment). For example, partially assembled products may be placed on a 3-D model of a conveyor belt, components may be located in a parts bin, and tools may be placed on a tool bench and/or within a scene in the process of positioning a component within a partially assembled product. Accordingly, a 3-D computer graphics rendering system is used to generate photorealistic images of the range of typical arrangements of objects in a particular environment. These generated images can also be automatically labeled. In particular, when the particular 3-D models used to depict each of the different types of objects are already associated with class labels (e.g., screws of various sizes, pre-assembled components, products at various stages of assembly, particular types of tools, etc.), segmentation maps can be automatically generated (e.g., by mapping surfaces of objects to their particular class labels).

However, 3-D rendering computer graphics software systems are generally tailored for generating images that represent typical imaging modalities based on the intensity of visible light (e.g., the intensities of red, green, and blue light). Such 3-D rendering software, such as Blender® by the Blender Foundation, generally does not account for behaviors of electromagnetic radiation that may be invisible or otherwise negligible when rendering photorealistic scenes. Examples of these additional behaviors include the polarization of light (e.g., as polarized light interacts with transparent objects and reflective objects in a scene, as detected by a camera with a polarizing filter in its optical path), thermal or infrared radiation (e.g., as emitted by warm objects in a scene and as detected by a camera system sensitive to detect infrared light), ultraviolet radiation (e.g., as detected by a camera system sensitive to ultraviolet light), combinations thereof (e.g., polarization with thermal radiation, polarization with visible light, polarization with ultraviolet light, etc.), and the like.

Therefore, aspects of embodiments of the present disclosure relate to systems and methods for modeling the behavior of various materials when imaged based on polarization or other imaging modalities. The data (e.g., images) generated in accordance with embodiments of the present disclosure may then be used as training data for training deep learning models such as deep convolutional neural networks to compute predictions based on imaging modalities other than standard imaging modalities (e.g., the intensity of visible light or light in a visible portion of the electromagnetic spectrum).

As a motivating example, embodiments of the present disclosure will be described in the context of generating synthetic images of objects captured through a polarizing filter (referred to herein as "polarization raw frames"), where these images may be used in training a deep neural network such as a convolutional neural network to perform a task based on polarization raw frames. However, embodiments of the present disclosure are not limited to generating synthetic polarization raw frames for training a convolutional neural network that takes polarization raw frames (or features extracted therefrom) as input data.

FIG. 1 is a block diagram depicting a system for training a statistical model to perform computer vision tasks based on images in various modalities, where the training is performed using data generated in accordance with embodiments of the present disclosure. as shown in FIG. 1, training data 5 is supplied to a model training system 7, which takes a model 30 (e.g., a pre-trained model or a model architecture with initialized weights) and uses the training data 5 to generate a trained model (or re-trained model) 32. The model 30 and the trained model 32 may be a statistical model such as a deep neural network (deep neural networks include convolutional neural networks). A synthetic data generator 40 according to embodiments of the present disclosure generates synthesized data 42, which may be included with the training data 5 for generating the trained model 32. The model training system 7 may apply an iterative process for updating the parameters of the model 30 to generate the trained model 32 in accordance with the supplied training data 5 (e.g., including the synthesized data 42). The updating of the parameters of the model 30 may include, for example, applying gradient descent (and, in the case of a neural network, backpropagation) in accordance with a loss function measuring a difference between the labels and the output of the model in response to the training data. The model training system 7 and the synthetic data generator 40 may be implemented using one or more electronic circuits.

According to various embodiments of the present disclosure, the model training system 7 and/or the synthetic data generator 40 are implemented using one or more electronic circuits configured to perform various operations as described in more detail below. Types of electronic circuits may include a central processing unit (CPU), a graphics processing unit (GPU), an artificial intelligence (AI) accelerator (e.g., a vector processor, which may include vector arithmetic logic units configured efficiently perform operations common to neural networks, such dot products and softmax), a field programmable gate array (FPGA), an application specific integrated circuit (ASIC), a digital signal processor (DSP), or the like. For example, in some circumstances, aspects of embodiments of the present disclosure are implemented in program instructions that are stored in a non-volatile computer readable memory where, when executed by the electronic circuit (e.g., a CPU, a GPU, an AI accelerator, or combinations thereof), perform the operations described herein to compute a segmentation map 20 from input polarization raw frames 18. The operations performed by the model training system 7 and the synthetic data generator 40 may be performed by a single electronic circuit (e.g., a single CPU, a single GPU, or the like) or may be allocated between multiple electronic circuits (e.g., multiple GPUs or a CPU in conjunction with a GPU). The multiple electronic circuits may be local to one another (e.g., located on a same die, located within a same package, or located within a same embedded device or computer system) and/or may be remote from one other (e.g., in communication over a network such as a local personal area network such as Bluetooth®, over a local area network such as a local wired and/or wireless network, and/or over wide area network such as the internet, such a case where some operations are performed locally and other operations are performed on a server hosted by a cloud computing service). One or more electronic circuits operating to implement the model training system 7 and the synthetic data generator 40 may be referred to herein as a computer or a computer system, which may include memory storing instructions that, when executed by the one or more electronic circuits, implement the systems and methods described herein.

Figure 2:
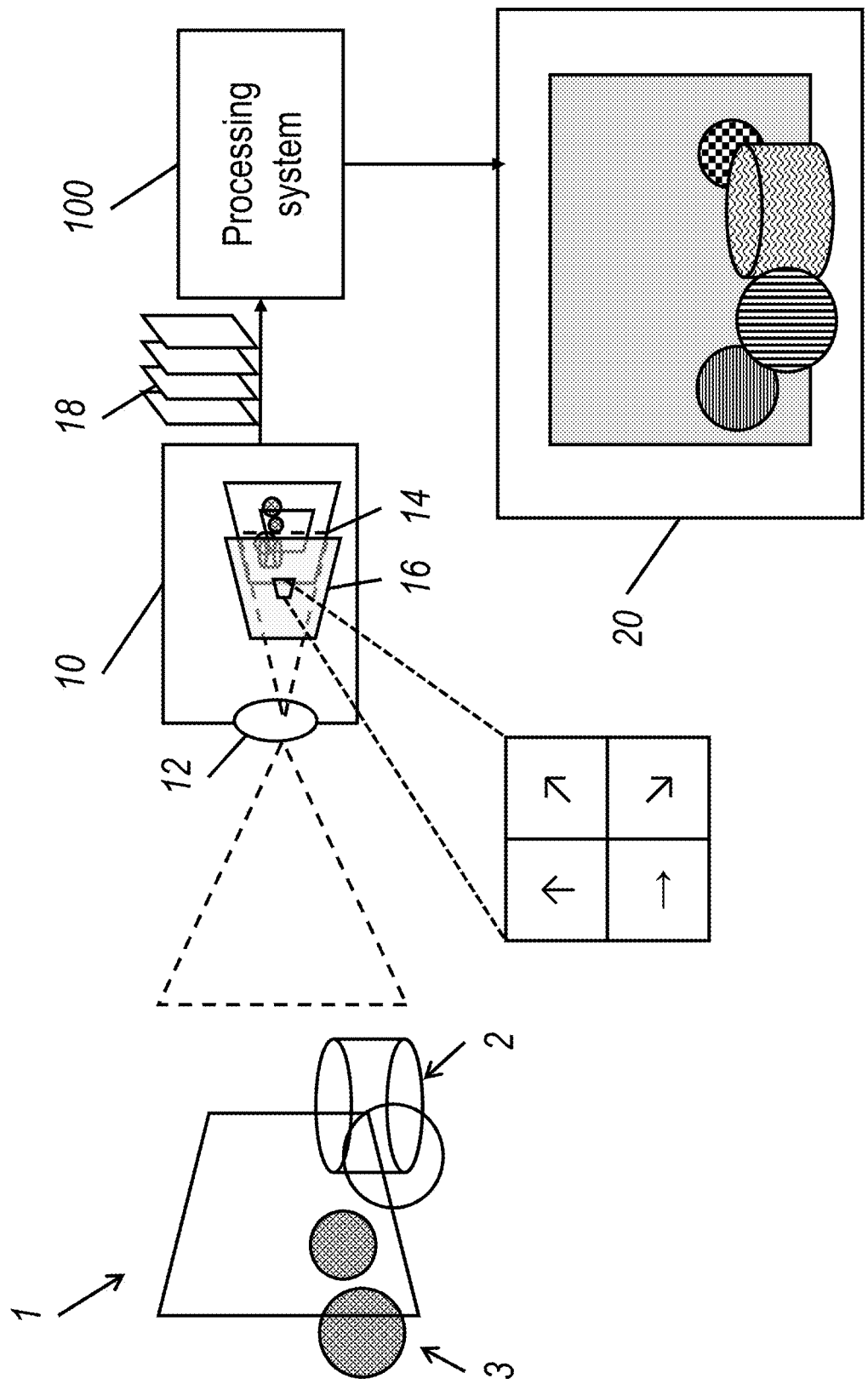
FIG. 2 is a schematic block diagram of a computer vision system configured to use polarization imaging and that can be trained based on synthetic polarization imaging data generated according to one embodiment of the present invention.

FIG. 2 is a schematic block diagram of a computer vision system configured to use polarization imaging and that can be trained based on synthetic polarization imaging data generated according to one embodiment of the present invention.

For context, FIG. 2 is a schematic depiction of a system in which a polarization camera images a scene and supplies polarization raw frames to a computer vision system that includes a model that is trained to perform computer vision tasks based on polarization raw frames or polarization features computed based on polarization raw frames A polarization camera 10 has a lens 12 with a field of view, where the lens 12 and the camera 10 are oriented such that the field of view encompasses the scene 1. The lens 12 is configured to direct light (e.g., focus light) from the scene 1 onto a light sensitive medium such as an image sensor 14 (e.g., a complementary metal oxide semiconductor (CMOS) image sensor or charge-coupled device (CCD) image sensor).

The polarization camera 10 further includes a polarizer or polarizing filter or polarization mask 16 placed in the optical path between the scene 1 and the image sensor 14. According to various embodiments of the present disclosure, the polarizer or polarization mask 16 is configured to enable the polarization camera 10 to capture images of the scene 1 with the polarizer set at various specified angles (e.g., at 45° rotations or at 60° rotations or at non-uniformly spaced rotations).

As one example, FIG. 2 depicts an embodiment where the polarization mask 16 is a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, the polarization camera 10 using a polarization mask 16 such as that shown in FIG. 2 is capable of concurrently or simultaneously capturing light at four different linear polarizations. One example of a polarization camera is the Blackfly® S Polarization Camera produced by FLIR® Systems, Inc. of Wilsonville, Oreg.

While the above description relates to some possible implementations of a polarization camera using a polarization mosaic, embodiments of the present disclosure are not limited thereto and encompass other types of polarization cameras that are capable of capturing images at multiple different polarizations. For example, the polarization mask 16 may have fewer than or more than four different polarizations, or may have polarizations at different angles (e.g., at angles of polarization of: 0°, 60° degrees, and 120° or at angles of polarization of 0°, 30°, 60°, 90°, 120°, and 150°). As another example, the polarization mask 16 may be implemented using an electronically controlled polarization mask, such as an electro-optic modulator (e.g., may include a liquid crystal layer), where the polarization angles of the individual pixels of the mask may be independently controlled, such that different portions of the image sensor 14 receive light having different polarizations. As another example, the electro-optic modulator may be configured to transmit light of different linear polarizations when capturing different frames, e.g., so that the camera captures images with the entirety of the polarization mask set to, sequentially, to different linear polarizer angles (e.g., sequentially set to: 0 degrees; 45 degrees; 90 degrees; or 135 degrees). As another example, the polarization mask 16 may include a polarizing filter that rotates mechanically, such that different polarization raw frames are captured by the polarization camera 10 with the polarizing filter mechanically rotated with respect to the lens 12 to transmit light at different angles of polarization to image sensor 14.

A polarization camera may also refer to an array of multiple cameras having substantially parallel optical axes, such that each of the cameras captures images of a scene from substantially the same pose. The optical path of each camera of the array includes a polarizing filter, where the polarizing filters have different angles of polarization. For example, a two-by-two (2×2) array of four cameras may include one camera having a polarizing filter set at an angle of 0°, a second camera having a polarizing filter set at an angle of 45°, a third camera having a polarizing filter set at an angle of 90°, and a fourth camera having a polarizing filter set at an angle of 135°.

As a result, the polarization camera captures multiple input images 18 (or polarization raw frames) of the scene 1, where each of the polarization raw frames 18 corresponds to an image taken behind a polarization filter or polarizer at a different angle of polarization $\phi_{pol}$ (e.g., 0 degrees, 45 degrees, 90 degrees, or 135 degrees). Each of the polarization raw frames is captured from substantially the same pose with respect to the scene 1 (e.g., the images captured with the polarization filter at 0 degrees, 45 degrees, 90 degrees, or 135 degrees are all captured by a same polarization camera located at a same location and orientation), as opposed to capturing the polarization raw frames from disparate locations and orientations with respect to the scene. The polarization camera 10 may be configured to detect light in a variety of different portions of the electromagnetic spectrum, such as the human-visible portion of the electromagnetic spectrum, red, green, and blue portions of the human-visible spectrum, as well as invisible portions of the electromagnetic spectrum such as infrared and ultraviolet.

Figure 3B:
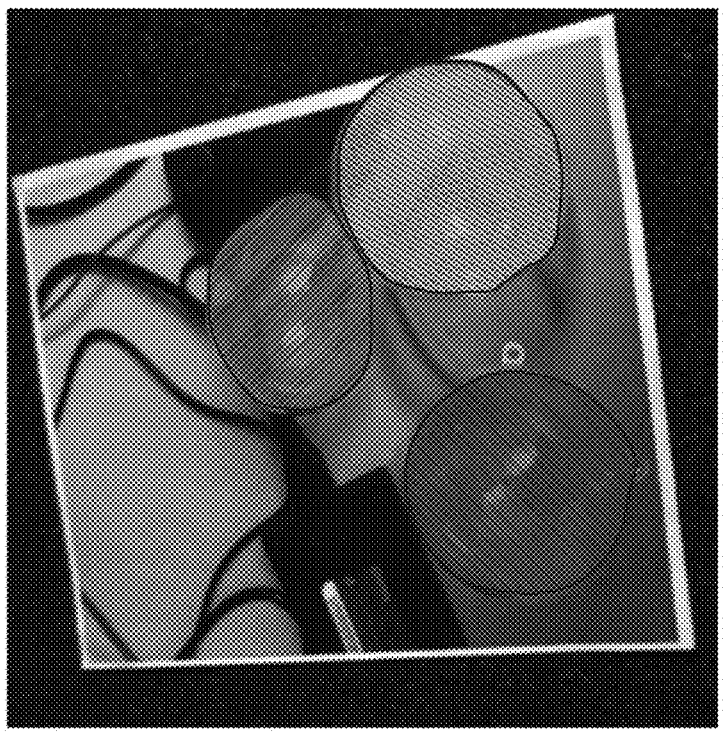
FIG. 3B depicts the intensity image of FIG. 3A with an overlaid segmentation mask as computed by a comparative Mask Region-based Convolutional Neural Network (Mask R-CNN) identifying instances of transparent balls, where the real transparent ball is correctly identified as an instance, and the two spoofs are incorrectly identified as instances.
Figure 3A:
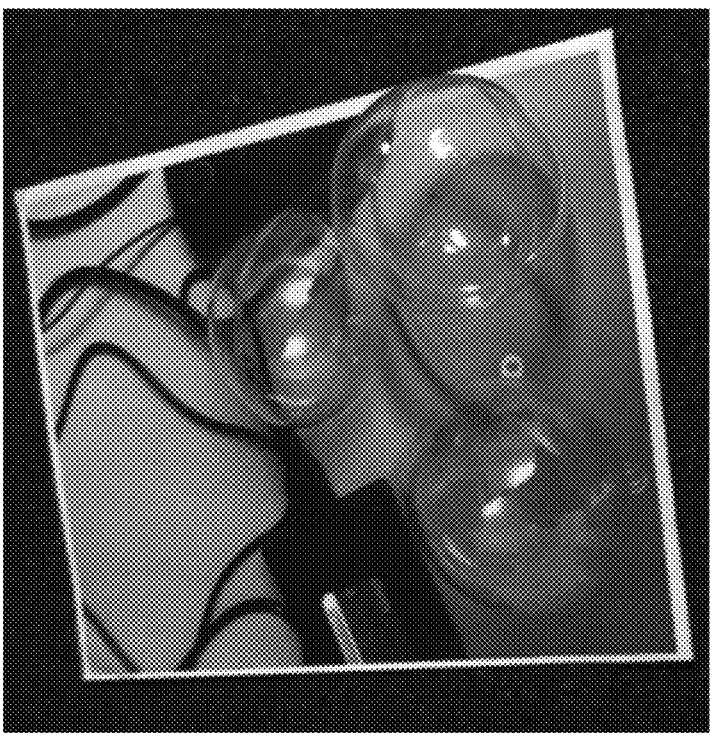
FIG. 3A is an image or intensity image of a scene with one real transparent ball placed on top of a printout of photograph depicting another scene containing two transparent balls ("spoofs") and some background clutter.

FIGS. 3A, 3B, 3C, and 3D provide background for illustrating the segmentation maps computed by a comparative approach and semantic segmentation or instance segmentation according to embodiments of the present disclosure. In more detail, FIG. 3A is an image or intensity image of a scene with one real transparent ball placed on top of a printout of photograph depicting another scene containing two transparent balls ("spoofs") and some background clutter. FIG. 3B depicts an segmentation mask as computed by a comparative Mask Region-based Convolutional Neural Network (Mask R-CNN) identifying instances of transparent balls overlaid on the intensity image of FIG. 3A using different patterns of lines, where the real transparent ball is correctly identified as an instance, and the two spoofs are incorrectly identified as instances. In other words, the Mask R-CNN algorithm has been fooled into labeling the two spoof transparent balls as instances of actual transparent balls in the scene.

Figure 3D:
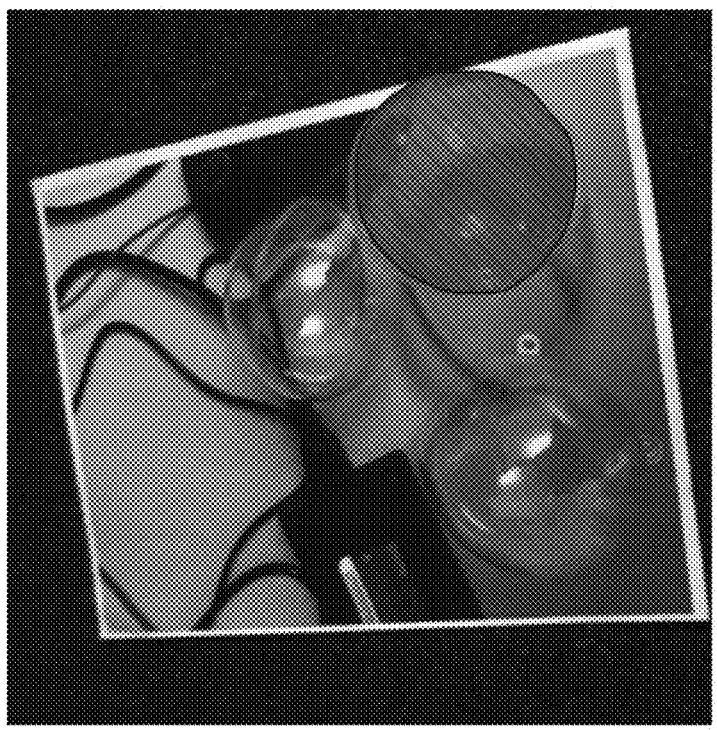
FIG. 3D depicts the intensity image of FIG. 3A with an overlaid segmentation mask as computed using polarization data in accordance with an embodiment of the present invention, where the real transparent ball is correctly identified as an instance and the two spoofs are correctly excluded as instances.
Figure 3C:
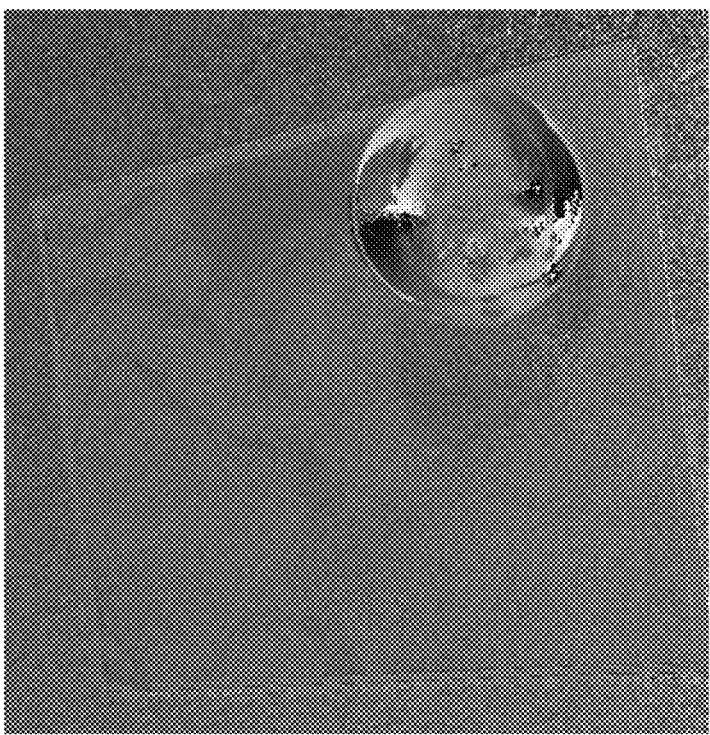
FIG. 3C is an angle of polarization image computed from polarization raw frames captured of the scene according to one embodiment of the present invention.

FIG. 3C is an angle of linear polarization (AOLP) image computed from polarization raw frames captured of the scene according to one embodiment of the present invention. As shown in FIG. 3C, transparent objects have a very unique texture in polarization space such as the AOLP domain, where there is a geometry-dependent signature on edges and a distinct or unique or particular pattern that arises on the surfaces of transparent objects in the angle of linear polarization. In other words, the intrinsic texture of the transparent object (e.g., as opposed to extrinsic texture adopted from the background surfaces visible through the transparent object) is more visible in the angle of polarization image of FIG. 3C than it is in the intensity image of FIG. 3A.

FIG. 3D depicts the intensity image of FIG. 3A with an overlaid segmentation mask as computed using polarization data in accordance with an embodiment of the present invention, where the real transparent ball is correctly identified as an instance using an overlaid pattern of lines and the two spoofs are correctly excluded as instances (e.g., in contrast to FIG. 3B, FIG. 3D does not include overlaid patterns of lines over the two spoofs). While FIGS. 3A, 3B, 3C, and 3D illustrate an example relating to detecting a real transparent object in the presence of spoof transparent objects, embodiments of the present disclosure are not limited thereto and may also be applied to other optically challenging objects, such as transparent, translucent, and non-matte or non-Lambertian objects, as well as non-reflective (e.g., matte black objects) and multipath inducing objects.

Polarization Feature Representation Spaces

Some aspects of embodiments of the present disclosure relate to systems and methods for extracting features from polarization raw frames, where these extracted features are used by the processing system 100 for the robust detection of optically challenging characteristics in the surfaces of objects. In contrast, comparative techniques relying on intensity images alone may fail to detect these optically challenging features or surfaces (e.g., comparing the intensity image of FIG. 3A with the AOLP image of FIG. 3C, discussed above). The term "first tensors" in "first representation spaces" will be used herein to refer to features computed from (e.g., extracted from) polarization raw frames 18 captured by a polarization camera, where these first representation spaces include at least polarization feature spaces (e.g., feature spaces such as AOLP and DOLP that contain information about the polarization of the light detected by the image sensor) and may also include non-polarization feature spaces (e.g., feature spaces that do not require information regarding the polarization of light reaching the image sensor, such as images computed based solely on intensity images captured without any polarizing filters).

Figure 4:
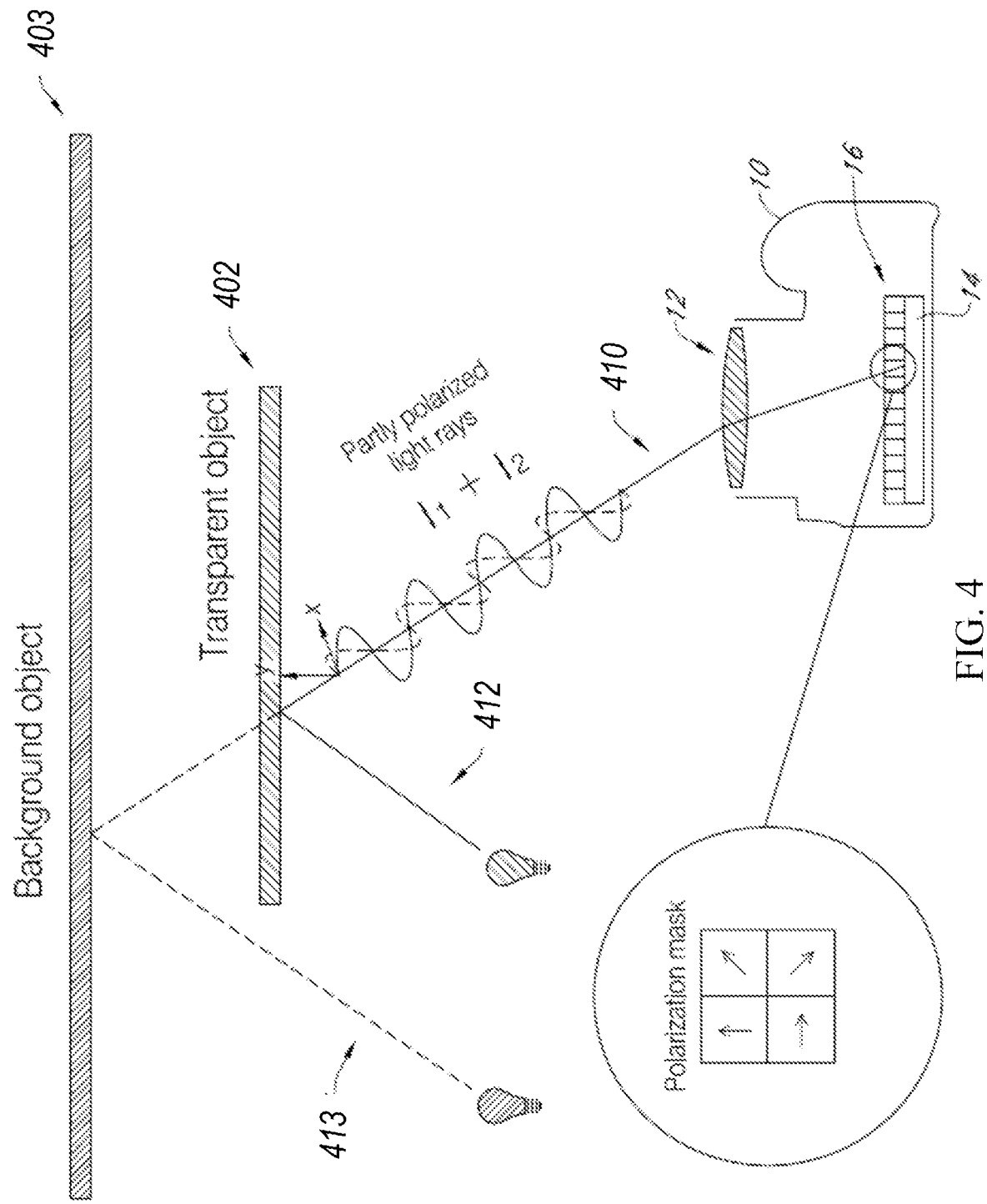
FIG. 4 is a high-level depiction of the interaction of light with transparent objects and non-transparent (e.g., diffuse and/or reflective) objects.

The interaction between light and transparent objects is rich and complex, but the material of an object determines its transparency under visible light. For many transparent household objects, the majority of visible light passes straight through and a small portion (~4% to ~8%, depending on the refractive index) is reflected. This is because light in the visible portion of the spectrum has insufficient energy to excite atoms in the transparent object. As a result, the texture (e.g., appearance) of objects behind the transparent object (or visible through the transparent object) dominate the appearance of the transparent object. For example, when looking at a transparent glass cup or tumbler on a table, the appearance of the objects on the other side of the tumbler (e.g., the surface of the table) generally dominate what is seen through the cup. This property leads to some difficulties when attempting to detect surface characteristics of transparent objects such as glass windows and glossy, transparent layers of paint, based on intensity images alone:

FIG. 4 is a high-level depiction of the interaction of light with transparent objects and non-transparent (e.g., diffuse and/or reflective) objects. As shown in FIG. 4, a polarization camera 10 captures polarization raw frames of a scene that includes a transparent object 402 in front of an opaque background object 403. A light ray 410 hitting the image sensor 14 of the polarization camera 10 contains polarization information from both the transparent object 402 and the background object 403. The small fraction of reflected light 412 from the transparent object 402 is heavily polarized, and thus has a large impact on the polarization measurement, in contrast to the light 413 reflected off the background object 403 and passing through the transparent object 402.

Similarly, a light ray hitting the surface of an object may interact with the shape of the surface in various ways. For example, a surface with a glossy paint may behave substantially similarly to a transparent object in front of an opaque object as shown in FIG. 4, where interactions between the light ray and a transparent or translucent layer (or clear coat layer) of the glossy paint causes the light reflecting off of the surface to be polarized based on the characteristics of the transparent or translucent layer (e.g., based on the thickness and surface normals of the layer), which are encoded in the light ray hitting the image sensor. Similarly, as discussed in more detail below with respect to shape from polarization (SfP) theory, variations in the shape of the surface (e.g., direction of the surface normals) may cause significant changes in the polarization of light reflected by the surface of the object. For example, smooth surfaces may generally exhibit the same polarization characteristics throughout, but a scratch or a dent in the surface changes the direction of the surface normals in those areas, and light hitting scratches or dents may be polarized, attenuated, or reflected in ways different than in other portions of the surface of the object. Models of the interactions between light and matter generally consider three fundamentals: geometry, lighting, and material. Geometry is based on the shape of the material. Lighting includes the direction and color of the lighting. Material can be parameterized by the refractive index or angular reflection/transmission of light. This angular reflection is known as a bi-directional reflectance distribution function (BRDF), although other functional forms may more accurately represent certain scenarios. For example, the bidirectional subsurface scattering distribution function (BSSRDF) would be more accurate in the context of materials that exhibit subsurface scattering (e.g. marble or wax).

A light ray 410 hitting the image sensor 16 of a polarization camera 10 has three measurable components: the intensity of light (intensity image/I), the percentage or proportion of light that is linearly polarized (degree of linear polarization/DOLP/$\rho$), and the direction of that linear polarization (angle of linear polarization/AOLP/$\phi$). These properties encode information about the surface curvature and material of the object being imaged, which can be used by the predictor 800 to detect transparent objects, as described in more detail below. In some embodiments, the predictor 800 can detect other optically challenging objects based on similar polarization properties of light passing through translucent objects and/or light interacting with multipath inducing objects or by non-reflective objects (e.g., matte black objects).

Therefore, some aspects of embodiments of the present invention relate synthesizing polarization raw frames that can be used to compute first tensors in one or more first representation spaces, which may include derived feature maps based on the intensity I, the DOLP $\rho$, and the AOLP $\phi$. Some aspects of embodiments of the present disclosure also relate to directly synthesizing tensors in one or more representation spaces such as DOLP p and AOLP for use in training deep learning systems to perform computer vision tasks based on information regarding the polarization of light in a scene (and, in some embodiments, based on other imaging modalities such as thermal imaging and combinations of thermal and polarized imaging).

Measuring intensity I, DOLP $\rho$, and AOLP at each pixel requires 3 or more polarization raw frames of a scene taken behind polarizing filters (or polarizers) at different angles, $\phi_{pol}$ (e.g., because there are three unknown values to be determined: intensity I, DOLP $\rho$, and AOLP $\phi$. For example, the FLIR® Blackfly® S Polarization Camera described above captures polarization raw frames with polarization angles $\phi_{pol}$ at 0 degrees, 45 degrees, 90 degrees, or 135 degrees, thereby producing four polarization raw frames $I_{\phi pol}$, denoted herein as $I_0$, $I_{45}$, $I_{90}$, and $I_{135}$.

The relationship between $I_{\phi pol}$ and intensity I, DOLP $\rho$, and AOLP $\phi$ at each pixel can be expressed as:

$$I_{\phi pol} = I(1 + \rho \cos(2(\phi - \phi_{pol}))) \quad (1)$$

Accordingly, with four different polarization raw frames $I_{\phi pol}$ ($I_0$, $I_{45}$, $I_{90}$, and $I_{135}$), a system of four equations can be used to solve for the intensity I, DOLP $\rho$, and AOLP $\phi$.

Shape from Polarization (SfP) theory (see, e.g., Gary A Atkinson and Edwin R Hancock. Recovery of surface orientation from diffuse polarization. IEEE transactions on image processing, 15(6):1653-1664, 2006.) states that the relationship between the refractive index (n), azimuth angle ($\theta_a$) and zenith angle ($\theta_z$) of the surface normal of an object and the and p components of the light ray coming from that object follow the following characteristics when diffuse reflection is dominant:

$$\rho = \frac{\left(n - \frac{1}{n}\right)^2 \sin^2(\theta_z)}{2 + 2n^2 - \left(n + \frac{1}{n}\right)^2 \sin^2\theta_z + 4\cos\theta_z\sqrt{n^2 - \sin^2\theta_z}} \quad (2)$$

$$\phi = \theta_a \quad (3)$$

and when the specular reflection is dominant:

$$\rho = \frac{2\sin^2\theta_z \cos\theta_z \sqrt{n^2 - \sin^2\theta_z}}{n^2 - \sin^2\theta_z - n^2\sin^2\theta_z + 2\sin^4\theta_z} \quad (4)$$

$$\phi = \theta_a - \frac{\pi}{2} \quad (5)$$

Note that in both cases ρ increases exponentially as $\theta_z$ increases and if the refractive index is the same, specular reflection is much more polarized than diffuse reflection.

Accordingly, some aspects of embodiments of the present disclosure relate to applying SfP theory to generate synthetic raw polarization frames 18 and/or AOLP and DOLP images based on the shapes of surfaces (e.g., the orientation of surfaces) in a virtual environment.

Light rays coming from a transparent objects have two components: a reflected portion including reflected intensity $I_r$, reflected DOLP $\rho_r$, and reflected AOLP $\phi_r$ and the refracted portion including refracted intensity $I_t$, refracted DOLP $\rho_t$, and refracted AOLP $\phi_t$. The intensity of a single pixel in the resulting image can be written as:

$$I = I_r + I_t \quad (6)$$

When a polarizing filter having a linear polarization angle of $\phi_{pol}$ is placed in front of the camera, the value at a given pixel is:

$$I_{\phi pol} = I_r(1 + \rho_r \cos(2(\phi_r - \phi_{pol}))) + I_t(1 + \rho_t \cos(2(\phi_t - \phi_{pol}))) \quad (7)$$

Solving the above expression for the values of a pixel in a DOLP ρ image and a pixel in an AOLP φ image in terms of $I_r$, $\rho_r$, $\phi_r$, $I_t$, $P_t$, and $\phi_t$:

$$\rho = \frac{\sqrt{(I_r\rho_r)^2 + (I_t\rho_t)^2 + 2I_t\rho_tI_r\rho_r\cos(2(\phi_r - \phi_t))}}{I_r + I_t} \quad (8)$$

$$\phi = \arctan\left(\frac{I_r\rho_r\sin(2(\phi_r - \phi_t))}{I_t\rho_t + I_r\rho_r\cos(2(\phi_r - \phi_t))}\right) + \phi_r \quad (9)$$

Accordingly, equations (7), (8), and (9), above provide a model for forming first tensors 50 in first representation spaces that include an intensity image I, a DOLP image ρ, and an AOLP image φ according to one embodiment of the present disclosure, where the use of polarization images or tensor in polarization representation spaces (including DOLP image ρ and an AOLP image φ based on equations (8) and (9)) enables trained computer vision systems to reliably detect of optically challenging surface characteristics of objects that are generally not detectable by comparative systems that use only intensity I images as input.

In more detail, first tensors in polarization representation spaces (among the derived feature maps) such as the polarization images DOLP ρ and AOLP φ can reveal surface characteristics of objects that might otherwise appear textureless in an intensity I domain. A transparent object may have a texture that is invisible in the intensity domain I because this intensity is strictly dependent on the ratio of $I_r/I_t$ (see equation (6)). Unlike opaque objects where $I_t=0$, transparent objects transmit most of the incident light and only reflect a small portion of this incident light. As another example, thin or small deviations in the shape of an otherwise smooth surface (or smooth portions in an otherwise rough surface) may be substantially invisible or have low contrast in the intensity I domain (e.g., a domain in which polarization of light is not taken into account), but may be very visible or may have high contrast in a polarization representation space such as DOLP ρ or AOLP φ.

As such, one exemplary method to acquire surface topography is to use polarization cues in conjunction with geometric regularization. The Fresnel equations relate the AOLP and the DOLP ρ with surface normals. These equations can be useful for anomaly detection by exploiting what is known as polarization patterns of the surface. A polarization pattern is a tensor of size [M, N, K] where M and N are horizontal and vertical pixel dimensions, respectively, and where K is the polarization data channel, which can vary in size. For example, if circular polarization is ignored and only linear polarization is considered, then K would be equal to two, because linear polarization has both an angle and a degree of polarization (AOLP φ and DOLP ρ). Analogous to a Moire pattern, in some embodiments of the present disclosure, the feature extraction module 700 extracts a polarization pattern in polarization representation spaces (e.g., AOLP space and DOLP space). In the example characterization output 20 shown in FIG. 1A and FIG. 1B shown above, the horizontal and vertical dimensions correspond to the lateral field of view of a narrow strip or patch of a surface of an object captured by the polarization camera 10. However, this is one exemplary case: in various embodiments, the strip or patch of the surface may be vertical (e.g., much taller than wide), horizontal (e.g., much wider than tall), or have a more conventional field of view (FoV) that tends closer toward a square (e.g., a 4:3 ratio or 16:9 ratio of width to height).

While the preceding discussion provides specific examples of polarization representation spaces based on linear polarization in the case of using a polarization camera having one or more linear polarizing filters to capture polarization raw frames corresponding to different angles of linear polarization and to compute tensors in linear polarization representation spaces such as DOLP and AOLP, embodiments of the present disclosure are not limited thereto. For example, in some embodiments of the present disclosure, a polarization camera includes one or more circular polarizing filters configured to pass only circularly polarized light, and where polarization patterns or first tensors in circular polarization representation space are further extracted from the polarization raw frames. In some embodiments, these additional tensors in circular polarization representation space are used alone, and in other embodiments they are used together with the tensors in linear polarization representation spaces such as AOLP and DOLP. For example, a polarization pattern including tensors in polarization representation spaces may include tensors in circular polarization space, AOLP, and DOLP, where the polarization pattern may have dimensions [M, N, K], where K is three to further include the tensor in circular polarization representation space.

Figure 5:
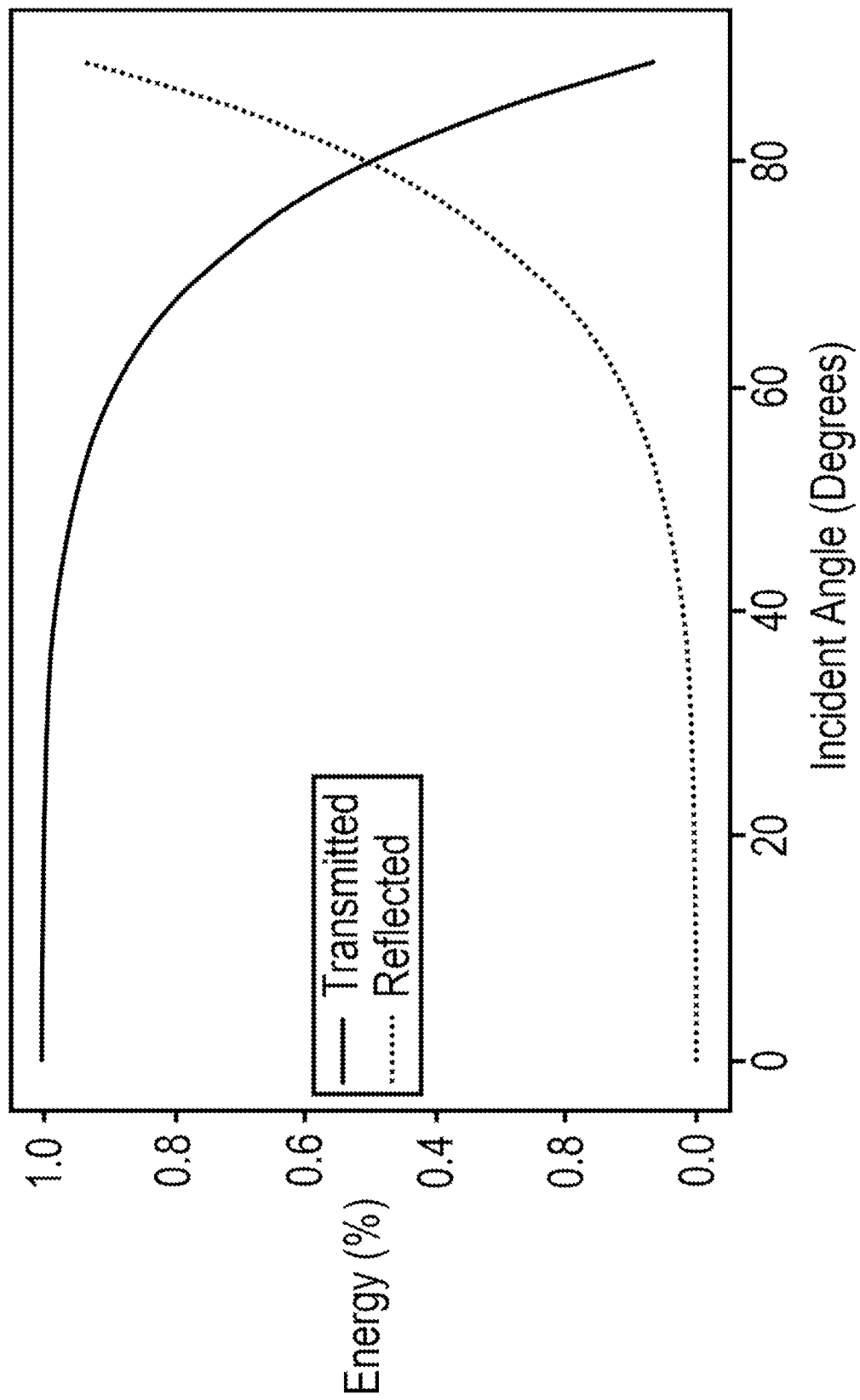
FIG. 5 is a graph of the energy of light that is transmitted versus reflected over a range of incident angles to a surface having a refractive index of approximately 1.5.

FIG. 5 is a graph of the energy of light that is transmitted versus reflected over a range of incident angles to a surface having a refractive index of approximately 1.5. As shown in FIG. 5, the slopes of the transmitted energy (shown in FIG. 5 with a solid line) and reflected energy (shown in FIG. 5 with a dotted line) lines are relatively small at low incident angles (e.g., at angles closer to perpendicular to the plane of the surface). As such, small differences in the angle of the surface may be difficult to detect (low contrast) in the polarization pattern when the angle of incidence is low (e.g., close to perpendicular to the surface, in other words, close to the surface normal). On the other hand, the slope of the reflected energy increases from flat, as the angle of incidence increases, and the slope of the transmitted energy decreases from flat (to have a larger absolute value) as the angle of incidence increases. In the example shown in FIG. 5 with an index of refraction of 1.5, the slopes of both lines are substantially steeper beginning at an incident angle of around 60°, and their slopes are very steep at an incident angle of around 80°. The particular shapes of the curves may change for different materials in accordance with the refractive index of the material. Therefore, capturing images of surfaces under inspection at incident angles corresponding to steeper portions of the curves (e.g., angles close to parallel to the surface, such as around 80° in the case of a refractive index of 1.5, as shown in FIG. 5) can improve the contrast and detectability of variations in the surface shapes in the polarization raw frames 18 and may improve the detectability of such features in tensors in polarization representation spaces, because small changes in incident angle (due to the small changes in the surface normal) can cause large changes in the captured polarization raw frames.

The use of polarization cameras to detect the presence and shape of optically challenging objects and surfaces is described in more detail, for example, in PCT Patent Application No. US/2020/048604, filed on Aug. 28, 2020 and in PCT Patent Application No. US/2020/051243, filed on Sep. 17, 2020, the entire disclosures of which are incorporated by reference herein. Such computer vision systems may be trained to perform computer vision tasks on polarization data based on training data generated in accordance with embodiments of the present disclosure. In some embodiments, these computer vision systems use machine learning models such as deep neural networks (e.g., convolutional neural networks) to perform the computer vision tasks, where the deep learning models are configured to take, as input, polarization raw frames and/or features in polarization representation spaces.

Simulating the physics of polarization for different materials is a complex task requiring an understanding of the material properties, the spectral profile and polarization parameters of the illumination used, and the angle at which the reflected light is observed by the observer. To truly simulate the physics of light polarization and its impact on the illumination of objects would not only be a complex task but would also be an intensely compute intensive task, such as by applying a complex forward model that typically produces highly inaccurate (unrealistic) images. Accordingly, various comparative 3-D computer graphics systems typically do not accurately model the physics of light polarization and its impact on the illumination of objects, and therefore are not capable of synthesizing or rendering images of virtual environments in a manner that realistically represents how a corresponding real environment would appear if imaged with a camera with a polarizing filter in its optical path (e.g., a polarization camera). As such, comparative techniques for generating synthetic data for training computer vision systems that operate on standard imaging modalities (such as visible light images without polarizing filters) are generally incapable of generating training data for training computer vision systems that operate on other imaging modalities (e.g., polarization cameras, thermal cameras, and the like).

As discussed above, aspects of embodiments of the present disclosure relate to generating or synthesizing data for training machine learning models to take, as input, data captured using imaging modalities other than images captured by a standard camera (e.g., a camera configured to capture the intensity of visible light without the use of filters such as polarizing filters), which will be referred to herein as multimodal images or plenoptic images. The term "multimodal" refers to the plenoptic theory of light, where each dimension of the plenoptic domain (e.g., wavelength, polarization, angle, etc.) is an example of a modality of light. Accordingly, multimodal or plenoptic imaging includes, but is not limited to, the concurrent use of multiple imaging modalities. For example, the term "multimodal" may be used herein to refer to a single imaging modality, where that single imaging modality is a modality different from the intensity of visible light without the use of filters such as polarizing filters. Polarization raw frames captured by one or more polarization cameras and/or tensors in polarization representation spaces are one example of a class of inputs in a multimodal or plenoptic imaging modality (e.g., using multimodal imaging or plenoptic imaging).

Generally, various aspects of embodiments of the present disclosure relate to four techniques may be used separately or in combination as part of a pipeline for generating synthetic training data in accordance with multimodal or plenoptic imaging modalities such as a polarized imaging modality. These techniques include: domain randomization, texture mapping, normal mapping, and style transfer, and will be discussed in more detail below.

Figure 6:
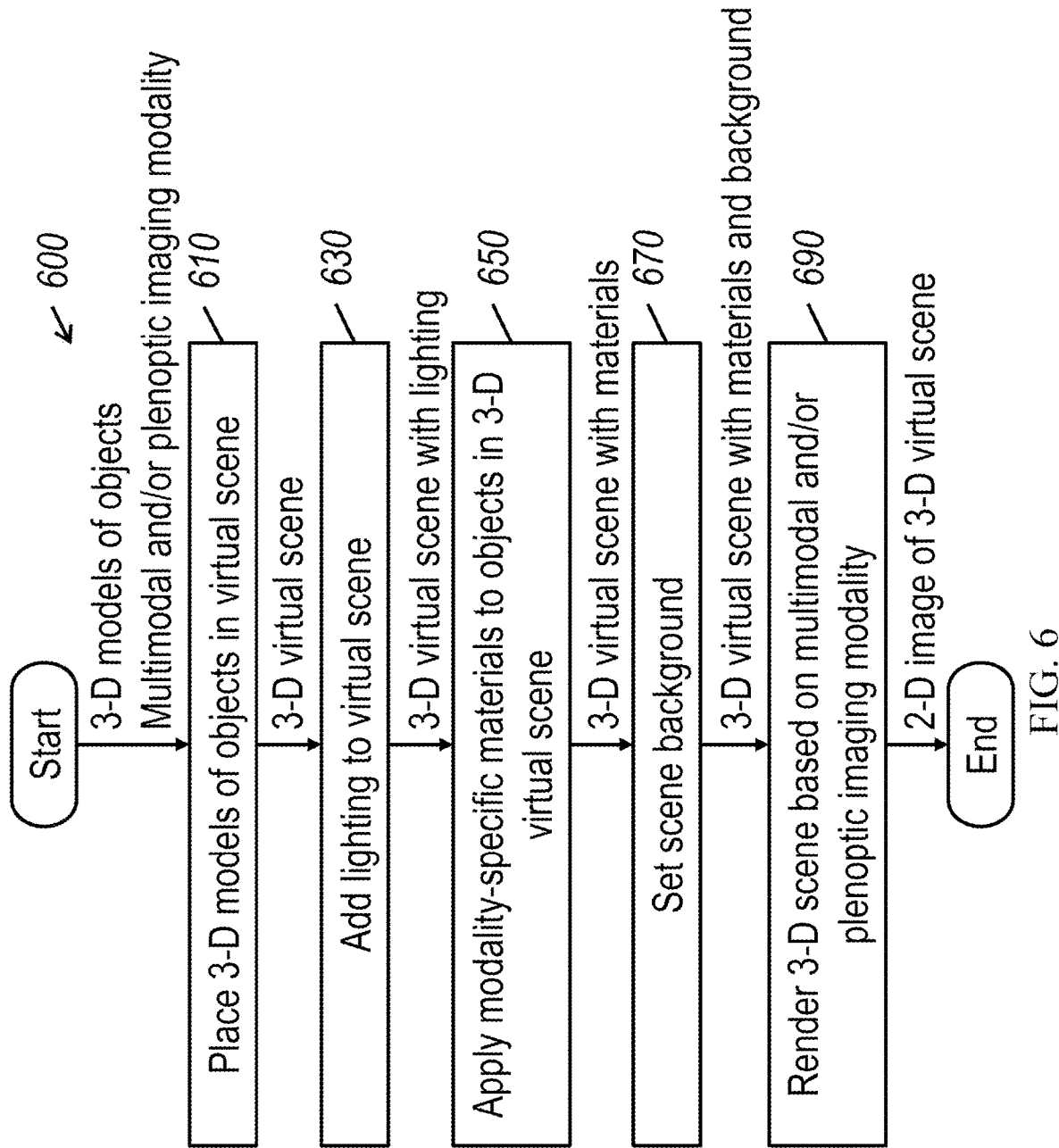
FIG. 6 is a flowchart depicting a pipeline for generating synthetic mages according to one embodiment of the present disclosure.

FIG. 6 is a flowchart depicting a pipeline for generating synthetic mages according to one embodiment of the present disclosure. In some embodiments of the present disclosure, the operations of FIG. 6 are performed by the synthetic data generator 40, for example, in special-purpose program instructions stored in a memory of the synthetic data generator 40 that, when executed by the processor of the synthetic data generator 40, cause the synthetic data generator 40 to perform the special-purpose operations described herein for generating synthetic images based on the physical simulation of optical phenomena. For the sake of convenience, aspects of embodiments of the present disclosure will be described in the context of applying polarization imaging in a manufacturing context to perform computer vision tasks on optically challenging manufacturing components and tools, such as objects having transparent, shiny metal, and/or dark matte surfaces.

In operation 610, the synthetic data generator 40 places 3-D models of objects in a virtual scene. In the context of generating synthetic images of scenes in a manufacturing environment, 3-D models of objects may be readily available from computer aided design (CAD) models of components and partially or fully assembled manufactured products. These CAD models may have previously been produced in the product design phase and may be obtained from, for example, the vendor of the component (e.g., from the vendor who supplied the components to the manufacturer), publicly available information (e.g., data sheets), or from internal product designers employed by the manufacturer. In some circumstances the CAD models may be manually generated based on specifications of a component.

In some embodiments of the present disclosure, the 3-D models of objects are placed in a virtual scene in a manner resembling the arrangement of those objects as they would be expected to be encountered for the particular computer vision task that the machine learning model will be trained to perform.

In the above example of computer vision in a manufacturing context, one task is to perform instance segmentation on a bin of components, where the components may be homogeneous (e.g., all the components in the bin are the same, such as a bin of springs or screws) or heterogeneous (e.g., a mix of different types of components, such as screws of different sizes or screws mixed with matching nuts). The objects may be randomly arranged within the bin, where the components may be oriented in many different directions in the bin, and where, in a bin of heterogeneous components, the different types of components are mixed together, as opposed to being separated in different parts of the bin. A computer vision system may be trained to compute a segmentation map of the bin, to identify the location and orientation of individual components within the bin (and, in the case of a bin of heterogenous components, the types of the objects). This segmentation map can then be used by an actuator system, such that a robotic arm, to pick components out of the bin and add the picked components to a partially assembled product.

Accordingly, in some embodiments of the present disclosure, the synthetic data generator 40 generates a scene of components in a bin by placing a 3-D model of a virtual bin in a scene, and dropping 3-D models of components into the virtual bin, as simulated using a physics simulation engine, such as a physics engine incorporated into a 3-D computer graphics rendering system. For example, the Blender® 3-D rendering software includes a physics system that simulates various physical real-world phenomena such as the movement, collision, and potential deformation of rigid bodies, cloth, soft bodies, fluids, and the like, as affected by gravity or other forces. Accordingly, a rigid body simulation may be used for simulating the dropping of rigid components (e.g., screws, bolts, relatively stiff springs) into a rigid virtual bin, and a soft body simulation may be used for elastic or deformable components (e.g., string, wire, plastic sheeting, etc.) into a rigid virtual bin.

In more detail, a variety of difference scenes representing different potential states of the bin may be generated, such as by dropping various numbers of instances of the 3-D models of the components into a virtual bin. For example, if a typical bin has a maximum capacity of 1,000 screws, various scenes can be generated by dropping 1,000 screws, 900 screws, 500 screws, 100 screws, and 10 screws into a virtual bin to generate different scenes representing different potential fullness states of the virtual bin. In addition, multiple scenes may be generated for any given number of screws (or the number of screws may be randomized between the generation of different scenes), where the arrangement of components within the bin is also randomized, such as by dropping components into the bin, one at a time, from different random locations above the bin.

Accordingly, in operation 610, the synthetic data generator 40 generates a scene containing an arrangement of representative objects.

In operation 630, the synthetic data generator 40 adds lighting to the virtual scene generated in operation 610. In particular, the synthetic data generator 40 adds one or more light sources to the virtual scene, where the light sources illuminate part or all of the surfaces of the objects in the bin. In some embodiments, the position of the one or more light sources is randomized, and multiple scenes are generated with light sources in different locations (e.g., different angles and distances) relative to the bin of parts in order to improve the robustness of the training. In some embodiments of the present disclosure, the virtual lighting includes virtual light sources that are representative of the light sources that would be found in environments in which the computer vision system is trained to operate. Examples of potential representative light sources include different color temperatures corresponding to, for example, incandescent lights, fluorescent lights, light emitting diode (LED) bulbs, natural light from a simulated window in the environment, and other forms of lighting technology, where the shape of the virtual lights (e.g., the direction of the rays emitted by the lights) may be in a range from direct light to diffuse light. In some embodiments of the present disclosure, the character of the light (e.g., color temperature and shape) is also randomized to generate different scenes with different types of lighting.

In operation 650, the synthetic data generator 40 applies modality-specific materials to the objects in the 3-D virtual scene. For example, in the case of generating synthesized polarization imaging data, polarization-specific materials are applied to the objects in the virtual scene, whereas in the case of generating synthesized thermal imaging data, thermal imaging-specific materials may be applied to the objects in the virtual scene. For the sake of illustration, polarization-specific materials will be described in detail herein, but embodiments of the present disclosure are not limited thereto and may also be applied to generating and applying materials specific to multimodal imaging modalities and/or plenoptic imaging modalities.

Some aspects of embodiments of the present disclosure relate to domain randomization, in which the material appearance of objects in a scene are randomized beyond the typical appearance of the objects. For example, in some embodiments, a large number of materials with random colors (e.g., thousands of different materials of different, randomly selected colors) are applied to the different objects in the virtual scene. In a real-world environment, the objects in a scene generally have well-defined colors (e.g., rubber washers generally all look matte black and screws may be particular shades of shiny black, matte black, gold, or shiny metal). However, real-world objects can often have different appearances due to changes in lighting conditions, such as the color temperature of lights, reflections, specular highlights, and the like. Accordingly, applying randomization to the colors of the materials applied to the objects when generating training data expands the domain of the training data to also encompass unrealistic colors, thereby increasing diversity in the training data for training a more robust machine learning model that is capable of making accurate predictions (e.g., more accurate instance segmentation maps) in a wider variety of real-world conditions.

Some aspects of embodiments of the present disclosure relate to performing texture mapping to generate models of materials that are dependent on one or more parameters (parameterized materials) in accordance with the imaging modality. For example, as discussed above, the appearance of a given surface in a scene, as imaged by a polarization camera system, may change based on the properties of the material of the surface, the spectral profile and polarization parameters of the illumination source or illumination sources (light sources) in the scene, the incident angle of light onto the surface, and the viewpoint angle of the observer (e.g., the polarization camera system). As such, simulating the physics of polarization for different materials is a complex and computationally-intensive task.

As such, some aspects of embodiments of the present disclosure relate to emulating the physics of various imaging modalities based on empirical data, such as real-world images captured of real-world materials. In more detail, an imaging system implementing the particular imaging modality of interest (e.g., a polarization camera system) is used to collect sample images from an object made of the particular material of interest. In some embodiments, the collected sample images are used to compute an empirical model of the material, such as its surface light-field function (e.g., a bi-directional reflectance density function or BRDF).

Figure 7:
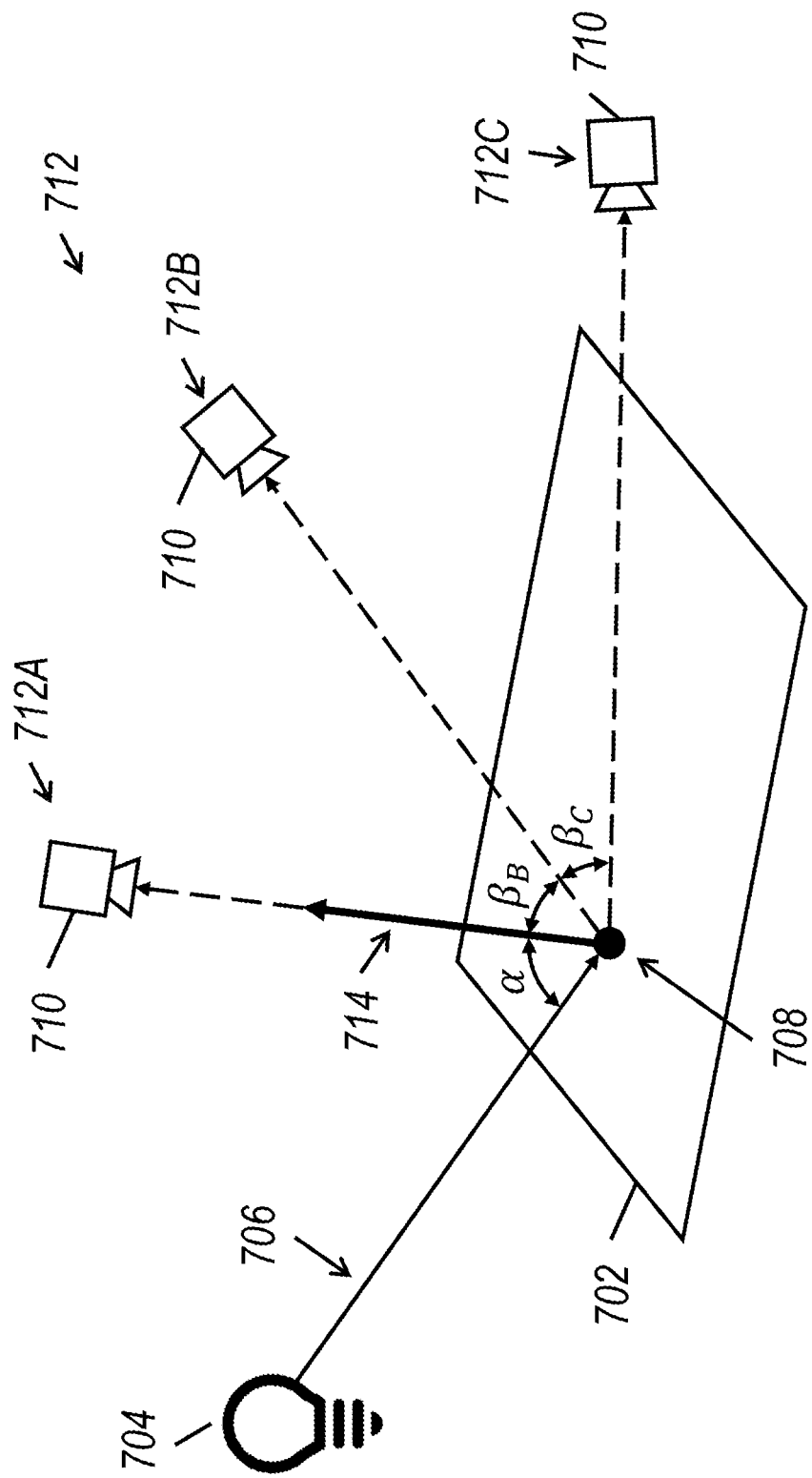
FIG. 7 is a schematic diagram of the sampling a real material from multiple angles using a polarization camera system according to one embodiment of the present disclosure.
Figure 8:
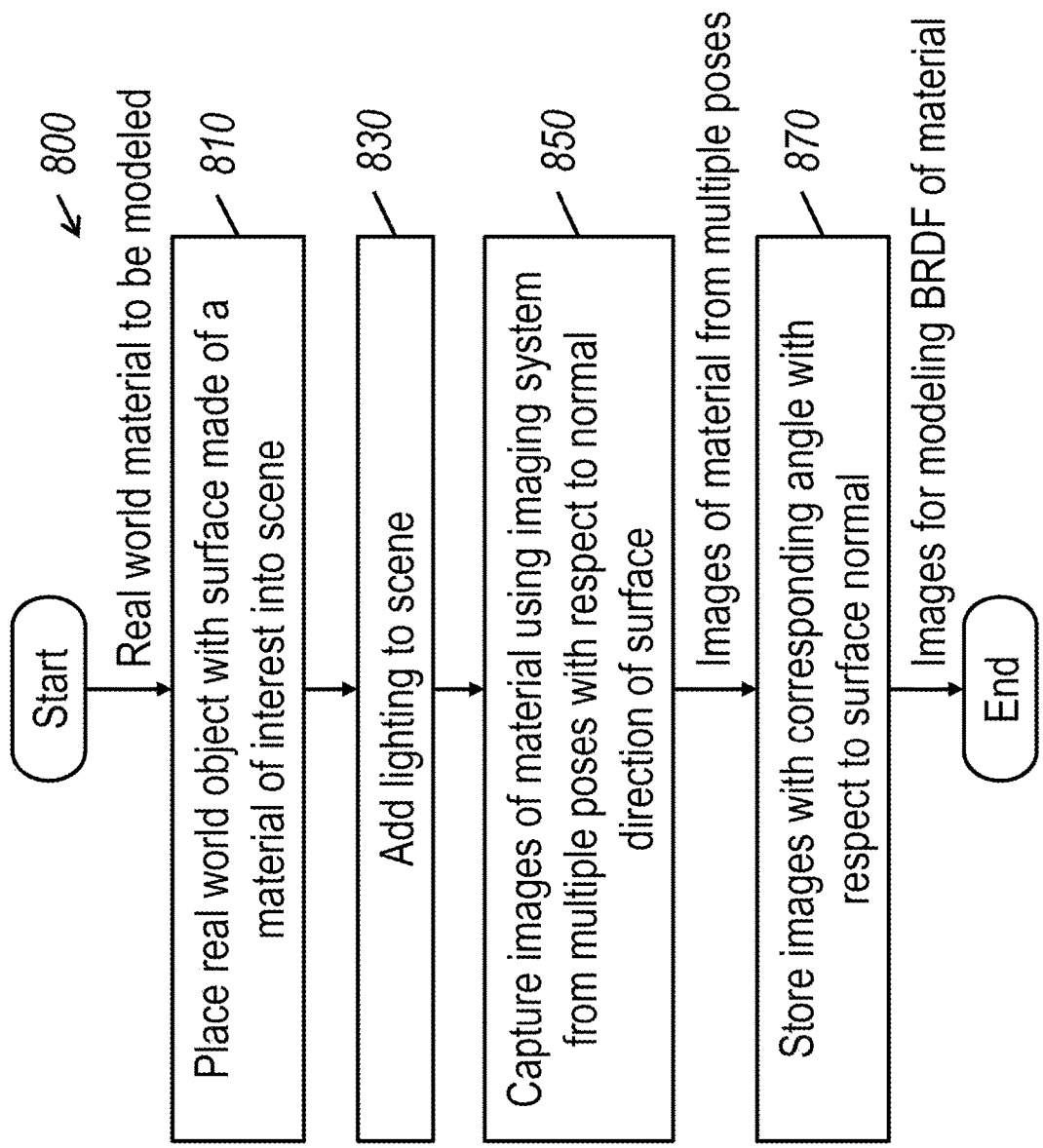
FIG. 8 is a flowchart depicting a method for capturing images of a material from different perspectives using a particular imaging modality to be modeled according to one embodiment of the present disclosure.

FIG. 7 is a schematic diagram of the sampling a real material from multiple angles using a polarization camera system according to one embodiment of the present disclosure. FIG. 8 is a flowchart depicting a method 800 for capturing images of a material from different perspectives using a particular imaging modality to be modeled according to one embodiment of the present disclosure. As shown in FIG. 7, a surface 702 of a physical object (e.g., a washer, a screw, or the like) is made of a material of interest (e.g., respectively, black rubber, chrome plated stainless steel, or the like). In operation 810, this material is placed into a physical scene (e.g., on a laboratory benchtop). In operation 830, a physical illumination source 704, such as an LED lamp or a fluorescent lamp is placed in the scene and arranged to illuminate at least a portion of the surface 702. For example, as shown in FIG. 7, ray 706 emitted from the physical illumination source 704 is incident on a particular point 708 of the surface 702 at an incident angle $\alpha$ at a particular point 708 on the surface 702 with respect to the normal direction 714 of the surface 702 at that particular point 708.

In operation 850, an imaging system is used to capture images of the surface 702 of the object from multiple poses with respect to the normal direction of the surface. In the embodiment shown in FIG. 7, a polarization camera system 710 is used as the imaging system to capture images of the surface 702, including the portions illuminated by the physical illumination source 704 (e.g., including the particular point 708). The polarization camera system 710 captures images the surface 702 from different poses 712, such as by moving the polarization camera system 710 from one pose to the next, and capturing polarization raw frames from each pose. In the embodiment shown in FIG. 7, the polarization camera system 710 images the surface 702 at a fronto-parallel observer angle $\beta$ of 0° in first pose 712A (e.g., a fronto-parallel view from directly above or aligned with the surface normal 714 at the point 708), at an intermediate observer angle $\beta$ such as an angle of 45° with respect to the surface normal 714 in second pose 712B, and at a shallow observer angle $\beta$ (e.g., slightly less than 90°, such as 89°) with respect to the surface normal 714 in third pose 712C.

As discussed above, a polarization camera system 710 is generally configured to capture polarization raw frames with polarization filters at different angles (e.g., with a polarization mosaic having four different angles of polarization in the optical path of a single lens and sensor system, with an array of four cameras, each of the cameras having a linear polarization filter at a different angle, with a polarizing filter set at a different angle for different frames captured at different times from the same pose, or the like).

In operation 870, the images captured by the imaging system are stored in with the relative poses of the camera with respect to the normal direction of the surface (e.g., the observer angle $\beta$). For example, the observer angle may be stored in the metadata associated with the images and/or the images may be indexed, in part, based on the observer angle $\beta$. In some embodiments, the images may be indexed by parameters which include: observer angle $\beta$ (or angle of camera position with respect to surface normal), material type, and illumination type.

Accordingly, in the arrangement shown in FIG. 7 and using, for example, the method of FIG. 8, the polarization camera system 710 captures multiple images (e.g., four images at linear polarization angles of 0°, 45°, 90°, and 135°) of the material in given illumination conditions (e.g., where the spectral profile of the physical illumination source 704 is known) at different angles of reflection (e.g., at different poses 712).

Each of these perspectives or poses 712 gives a different polarization signal due to the nature of the physics of polarization. Accordingly, by capturing images of the surface 702 from different observer angles, a model of the BRDF of the material can be estimated based on interpolating between the images captured with the physical illumination source 704 at one or more closest corresponding incident angles $\alpha$ by the camera system at the one or more poses 712 having closest corresponding observer angles $\beta$.

While the embodiment of FIG. 7 merely depicts three poses 712 for convenience, embodiments of the present disclosure are not limited thereto and the material may be sampled at higher rates, such as with 5° spacing between adjacent poses, or smaller spacings. For example, in some embodiments, the polarization camera system 712 is configured to operate as a video camera system, where polarization raw frames are captured at a high rate, such as 30 frames per second, 60 frames per second, 120 frames per second, or 240 frames per second, thereby resulting in a high density of images captured at a large number of angles with respect to the surface normal.

Similarly, in some embodiments, the pose of the physical illumination source 704 with respect to the surface 702 is modified, such that rays of light emitted from the physical illumination source 704 are incident on the surface 702 at different angles $\alpha$, where multiple images of the surface are similarly captured by the polarization camera system 710 from different poses 712.

The sampling rates of the different angles (e.g., the incident angle $\alpha$ and the observer or polarization camera system angle $\beta$) can be chosen such that intermediate perspectives can be interpolated (e.g., bilinearly interpolated) without significant loss of realism. In various embodiments of the present disclosure, the spacing of the intervals may depend on physical characteristics of the imaging modality, where some imaging modalities exhibit more angle sensitivity than others, and therefore high accuracy may be possible with fewer poses (spaced more widely apart) for modalities that are less angle-sensitive, whereas modalities having higher angle-sensitivity may use larger numbers of poses (spaced more closely together). For example, in some embodiments, when capturing polarization raw frames for a polarization imaging modality, the poses 712 of the polarization camera system 710 are set at interval angles of approximately five degrees (5°) apart, and the images of the surface 702 may also be captured with the physical illumination source 704 at various positions, similarly spaced at angles of approximately five degrees (5°) apart.

In some circumstances, the appearance of a material under the imaging modality of the empirical model is also dependent on the type of illumination source, such as incandescent lights, fluorescent lights, light emitting diode (LED) bulbs, sunlight, and therefore parameters of the illumination source or illumination sources used to light the real-world scene are included as parameters of the empirical model. In some embodiments, different empirical models are trained for different illumination sources (e.g., one model of a material under natural lighting or sunlight and another model of the material under fluorescent lighting).

Referring back to FIG. 6, in some embodiments, in operation 670 the synthetic data generator 40 sets a virtual background for the scene. In some embodiments, the virtual background is an image captured using the same imaging modality as the modality being simulated by the synthetic data generator 40. For example, in some embodiments, when generating synthetic polarization images, the virtual background is a real image captured using a polarization camera, and when generating synthetic thermal images, the virtual background is a real image captured using a thermal camera. In some embodiments, the virtual background is an image of an environment similar to the environments in which the trained machine learning model is intended to operate (e.g., a manufacturing facility or factory in the case of computer vision systems for manufacturing robots). In some embodiments, the virtual background is randomized, thereby increasing the diversity of the synthetic training data set.

In operation 690, the synthetic data generator 40 renders the 3-D scene based on the specified imaging modality (e.g., polarization, thermal, etc.) using one or more of the empirically derived, modality-specific models of materials. Some aspects of embodiments of the present disclosure relate to rendering images based on an empirical model of a material according to one embodiment of the present disclosure. The empirical model of the material may be developed as discussed above, based on samples collected from images captured of real-world objects made of the material of interest.

Generally, a 3-D computer graphics rendering engine generates 2-D renderings of virtual scenes by computing the color of each pixel in the output image in accordance with the color of a surface of the virtual scene that is depicted by that pixel. For example, in a ray tracing rendering engine, a virtual ray of light is emitted from the virtual camera into the virtual scene (in reverse of the typical path of light in the real world), where the virtual ray of light interacts with the surfaces of 3-D models of objects in the virtual scene. These 3-D models are typically represented using geometric shapes such as meshes of points that define flat surfaces (e.g., triangles), where these surfaces may be assigned materials that describe how the virtual ray of light interacts with the surface, such as reflection, refraction, scattering, dispersion, and other optical effects, as well as a texture that represents the color of the surface (e.g., the texture may be a solid color or may be, for example, a bitmap image that is applied to the surface). The path of each virtual ray of light is followed (or "traced") through the virtual scene until it reaches a light source in the virtual scene (e.g., a virtual light fixture) and the accumulated modifications of the textures encountered along the path from the camera to the light source are combined with the characteristics of the light source (e.g., color temperature of the light source) to compute the color of the pixel. This general process may be modified as understood by those skilled in the art, such as performing anti-aliasing (or smoothing) by tracing multiple rays through different parts of each pixel and computing the color of the pixel based on a combination (e.g., average) of the different colors computed by tracing the different rays interacting with the scene.

Figure 9:
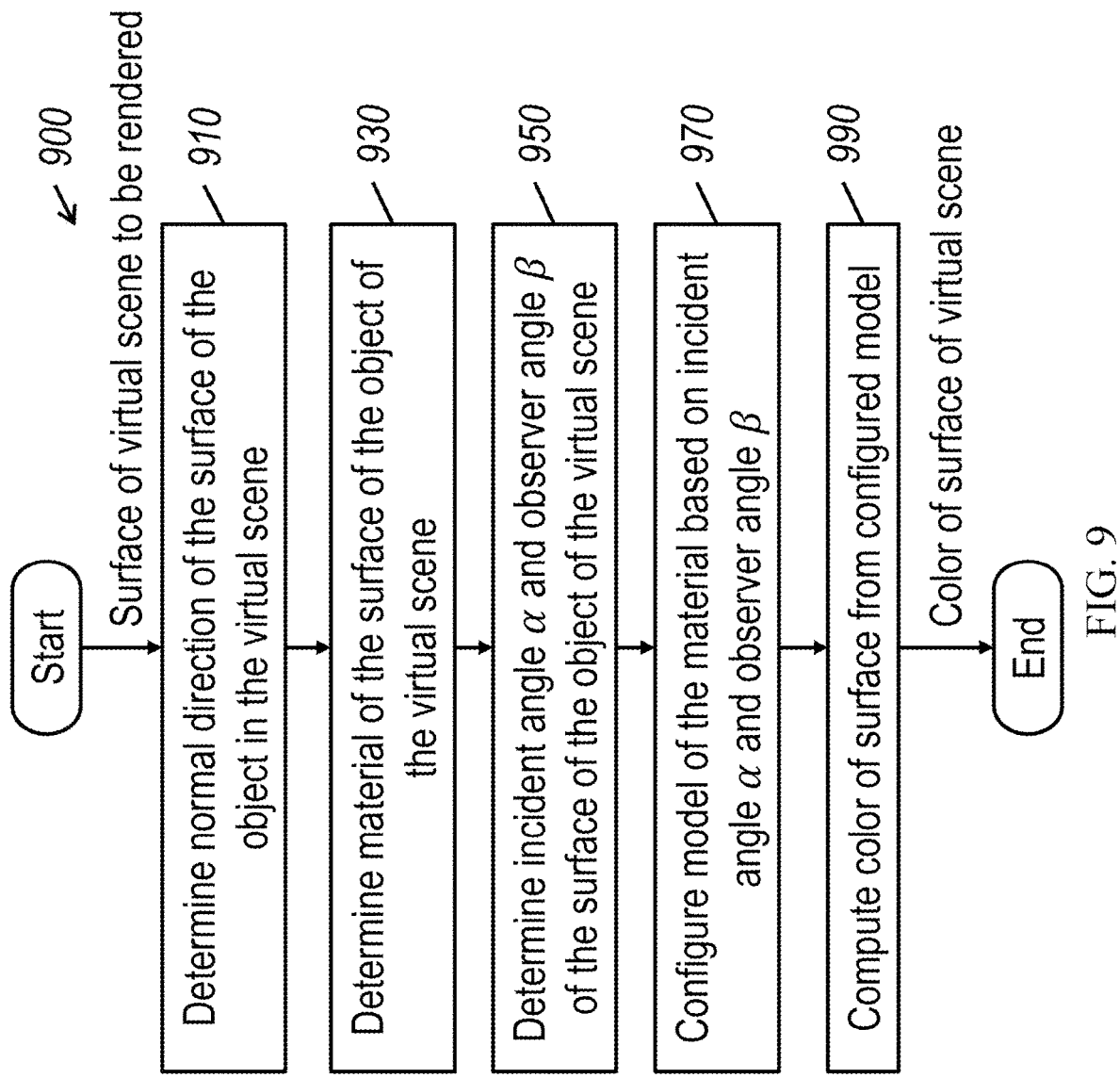
FIG. 9 is a flowchart depicting a method for rendering a portion of a virtual object based on the empirical model of a material according to one embodiment of the present disclosure.

FIG. 9 is a flowchart depicting a method 900 for rendering a portion of a virtual object based on the empirical model of a material according to one embodiment of the present disclosure. In particular, FIG. 9 describes one embodiment relating to computing a color when tracing of one ray through one pixel of a virtual scene as the ray interacts with a surface having a material modeled according to one embodiment of the present disclosure. However, a person having ordinary skill in the art before the effective filing date of the present application would understand how the technique described herein may be applied as a part of a larger rendering process, where multiple colors are computed for a given pixel of an output image and combined or where a scanline rendering process is used instead of ray tracing.

In more detail, the embodiment of FIG. 9 depicts a method for rendering a surface of an object in a virtual scene based on a view from a virtual camera in the virtual scene, where the surface has a material modeled in accordance with embodiments of the present disclosure. Given that the objects are being rendered synthetically, and the synthetic data generator 40 has access to the ground truth geometry of each object being rendered, the per-pixel normal, material type, and illumination type are all known parameters that appropriately modulate the graphical rendering of the material. During the rendering process, camera rays are traced from the optical center of the virtual camera to each 3-D point on the object that is visible from the camera. Each 3-D point (e.g., having X-Y-Z coordinates) on the object is mapped to a 2-D coordinate (e.g., having U-V coordinates) on the surface of the object. Each U-V coordinate on the surface of the object has its own surface light-field function (e.g., a bi-directional reflectance function or BRDF) represented as a model that is generated based on the images of real materials, as described above, for example, with respect to FIGS. 7 and 8.

In operation 910, the synthetic data generator 40 (e.g., running a 3-D computer graphics rendering engine) determines a normal direction of the given surface (e.g., with respect to a global coordinate system). In operation 930, the synthetic data generator 40 determines the material of the surface of the object as assigned to the surface as part of the design of the virtual scene.

In operation 950, the synthetic data generator 40 determines an observer angle $\beta$ of the surface, e.g., based on a direction from which the ray arrived at the surface (e.g., if the surface is the first surface reached by the ray from the camera, then the angle from the virtual camera to the surface, otherwise the angle from which the ray arrived at the surface from another surface in the virtual scene). In some embodiments, in operation 950, the incident angle $\alpha$ is also determined, based on the angle at which the ray leaves the surface (e.g., in a direction toward a virtual light source in the scene, due to the reversal of ray directions during ray tracing). In some circumstances, the incident angle $\alpha$ depends on characteristics of the material determined in operation 930, such as whether the material is transparent, reflective, refractive, diffuse (e.g., matte), or combinations thereof.

In operations 970 and 990, the synthetic data generator 40 configures a model of the material based on the observer angle $\beta$ (and, if applicable, the incident angle $\alpha$ and other conditions, such as the spectral profile or polarization parameters of illumination sources in the scene) and computes a color of the pixel based, in part, on the configured model of the material. The model of the material may be retrieved from a collection or data bank of models of different standard materials (e.g., models materials have been empirically generated based on types of materials expected to be depicted in virtual scenes generated by the synthetic data generator 40 for generating training data for a particular application or usage scenario, such as materials of components used in manufacturing a particular electronic device in the case of computer vision for supporting robotics in manufacturing the electronic device), where the models are generated based on images of real materials captured as described above in accordance with embodiments of the present disclosure. For example, in operation 930, the synthetic data generator 40 may determine that the surface of the object in the virtual scene is made of black rubber, in which case a model of a material generated from captured images of a real surface made of black rubber is loaded and configured in operation 970.

In some circumstances, the virtual scene includes objects having surfaces made of materials that are not represented in the data bank or collection of models of materials. Accordingly, some aspects of embodiments of the present disclosure relate to simulating the appearance of materials that do not have exact or similar matches in the data bank of models of materials by interpolating between the predictions made by different real models. In some embodiments, the existing materials are represented in an embedding space based on a set of parameters characterizing the material. More formally, interpretable material embeddings M, such that $F(M_{glass}, \theta_{out}, \phi_{out}, x, y)$ would give the polarized surface light field for glass with observer angle β represented by $(\theta_{out}, \phi_{out})$, and at a location (x, y) on the surface (mapped to (u, v) coordinate space on the 3-D surface), and a similar embedding may be performed for another material such as rubber F $(M_{rubber}, \theta_{out}, \phi_{out}, x, y)$. This embedding of the materials in embedding space can then be parameterized in an interpretable way using, for example, beta variational autoencoders (VAEs) and then interpolated to generate new materials that are not based directly on empirically collected samples, but, instead, are interpolations between multiple different models that were separately constructed based on their own empirically collected samples. The generation of additional materials in this way further extends the domain randomization of synthetic training data generated in accordance with embodiments of the present disclosure and improves the robustness of deep learning models trained based on this synthetic data.

Various embodiments of the present disclosure relate to different ways the model of the material may be implemented.

In various embodiments of the present disclosure, the model representing the surface-light field function or BRDF of the material is represented using, for example, a deep learning based BRDF function (e.g., based on a deep neural network such as a convolutional neural network), a mathematically modeled BRDF function (e.g., a set of one or more closed-form equations or one or more open-form equations that can be solved numerically), or a data-driven BRDF function that uses linear interpolation.

In operation 970, the synthetic data generator 40 configures a model of the material identified in operation 950 based on the current parameters, such as the incident angle α and the observer angle β. In the case of a data-driven BRDF function using linear interpolation, in operation 970, the synthetic data generator 40 retrieves images of the material identified in operation 950 that are closest in parameter space to the parameters of the current ray. In some embodiments, the materials are indexed (e.g., stored in a database or other data structure) and accessible in accordance with the material type, the illumination type, the incident angle of the light, and the angle of the camera with respect to the surface normal of the material (e.g., the observer angle). However, embodiments of the present disclosure are not limited to the parameters listed above, and other parameters may be used, depending on the characteristics of the imaging modality. For example, for some materials, the incident angle and/or the illumination type may have no effect on the appearance of the material, and therefore these parameters may be omitted and need not be determined as part of method 900.

Accordingly, in the case of a data-driven BRDF function with linear interpolation, in operation 970, the synthetic data generator 40 retrieves one or more images that are closest to the given parameters of the current ray associated with the current pixel being rendered. For example, the observer angle may be at 53° from the surface normal of the surface of the object, and samples of the real-world material may include images captured at observer angles spaced 5° apart, in this example, images captured at 50° and at 55° with respect to the surface normal of the real-world object made of the material of interest. Accordingly, the images of the real-world material that were captured at 50° and 55° would be retrieved (in circumstances where additional parameters are used, these parameters, such as incident angle and illumination type, are further identify particular images to be retrieved).

Continuing the example of a data-driven BRDF function with linear interpolation, operation 990, the synthetic data generator 40 computes a color of the surface for the pixel based on the closest images. In circumstances where there is only one matching image (e.g., if observer angle in the virtual scene matches an observer angle of one of the sampled images), then the sampled image is used directly for computing the color of the surface. In circumstances where there are multiple matching images, the synthetic data generator 40 interpolates the colors of the multiple images. For example, in some embodiments, linear interpolation is used to interpolate between the multiple images. More specifically, if the observer angle is between four different sample images that have different observer angles in the azimuthal angle with respect to the surface normal and polar angle with respect to an incident angle of the illumination source, then bilinear interpolation may be used to interpolate between the four images along the azimuthal and polar directions. As another example, if the appearance of the material is further dependent on incident angle, then further interpolation may be performed based on images captured at different incident angles (along with interpolating between images captured at different observer angles for each of the different incident angles). Accordingly, in operation 990, a color of the surface of the scene is computed for the current pixel based on combining one or more images captured of real-world materials.

In some embodiments of the present disclosure where the model is a deep learning network, a surface light field function of the material is implemented with a model includes training a deep neural network to predict the value of a bi-directional reflectance function directly from a set of parameters. In more detail, the images captured of a real material from a plurality of different poses, as discussed above, for example, with respect to FIGS. 7 and 8, are used to generate training data relating parameters such as observer angle β, incident angle α, spectral properties of the illumination source, and the like, to the observed appearance of a portion of the material (e.g., at the center of the image). As such, in some embodiments, a deep neural network is trained (e.g., applying backpropagation) to estimate a BRDF function based on training data collected from images collected of real materials. In these embodiments, a model is configured in operation 970 by, if there are multiple deep neural networks, selecting a deep neural network from a plurality of deep neural networks associated with the model (e.g., selected based on matching parameters of the virtual scene with parameters of the data used to train the deep neural network, such as parameters of an illumination source) and supplying parameters to the input of the selected deep neural network (or only deep neural network, if there is only one deep neural network associated with the model), such as the observer angle $\beta$, the incident angle $\alpha$, and the like. In operation 990, the synthesized data generator 40 computes the color of the surface of the virtual object from the configured model by forward propagating through the deep neural network to compute a color at the output, where the computed color is the color of the surface of the virtual scene, as predicted by the deep neural network of the configured model.

In some embodiments of the present disclosure where the model is a deep learning network, a surface light field function of the material is implemented with a model includes one or more conditional generative adversarial networks (see, e.g., Goodfellow, Ian, et al. "Generative adversarial nets." *Advances in Neural Information Processing Systems*. 2014.). Each conditional generative adversarial network may be trained to generate images of a material based on a random input and one or more conditions, where the conditions include the current parameters of the viewing of a surface (e.g., observer angle incident angle $\alpha$ of each illumination source, polarization states of each illumination source, and material properties of the surface). According to some embodiments, a discriminator is trained in an adversarial manner to determine, based on an input image and a set of conditions associated with the image, whether the input image was a real image captured under the given conditions or generated by the conditional generator conditioned based on the set of conditions. By alternatingly retraining the generator to generate images that can "fool" the discriminator and training the discriminator to discriminate between generated images and real images, the generator is trained to generate realistic images of materials captured under various capture conditions (e.g., at different observer angles), thereby enabling the trained generator to represent the surface light-field function of the material. In some embodiments of the present disclosure, different generative adversarial networks are trained for different conditions for the same material, such as for different types of illumination sources, different polarization states of the illumination sources, and the like. In these embodiments, a model is configured in operation 970 by, if there are multiple conditional generative adversarial networks (GANs) associated with the model, selecting a conditional GAN from a plurality of conditional GANs associated with the model (e.g., selected based on matching parameters of the virtual scene with parameters of the data used to train the deep neural network, such as parameters of an illumination source) and supplying the parameters of the virtual scene as the conditions of the conditional GAN, such as the observer angle $\beta$ the incident angle $\alpha$, and the like. In operation 990, the synthesized data generator 40 computes the color of the surface of the virtual object from the configured model by forward propagating through the conditional GAN to compute a color at the output (e.g., a synthesized image of the surface of the object based on the current parameters), where the computed color is the color of the surface of the virtual scene, as generated by the conditional GAN of the configured model.

In some embodiments of the present disclosure, the surface light field function is modeled using a closed-form mathematically derived bidirectional reflectance distribution function (BRDF) configured by the empirically collected samples (e.g., pictures or photographs) of the real material, as captured from different angles, such as in accordance with the method described with respect to FIG. 8. Examples of techniques for configuring a BRDF based on collected pictures or photographs of a material from different angles or poses are described, e.g., in Ramamoorthi, Ravi, and Pat Hanrahan. "A Signal-Processing Framework for Inverse Rendering." *Proceedings of the 28th Annual Conference on Computer Graphics and Interactive Techniques*. 2001. and Ramamoorthi, Ravi. *A Signal-Processing Framework for Forward and Inverse Rendering*. Stanford University, 2002, 52-79. Accordingly, in some embodiments, a closed-form mathematically derived BRDF is configured using empirically collected samples of a real material and included as a component of a material model for modeling multimodal and/or plenoptic characteristics of a material for the computer rendering of multimodal and/or plenoptic images of virtual scenes.

In some embodiments, virtual objects made of multiple materials that are either bi-modal or multimodal would have a similar set of images for each type of material used in the virtual object in question. The appearances of the different materials are then combined in the final rendering of the image (e.g., additively combined in accordance with weights associated with each material in the virtual model). In some embodiments, this same approach of combining multiple materials is applied to multi-layered materials such as transparent coatings on shiny materials, and the like. In some embodiments, multi-layered materials are modeled by separately sampling (e.g., capturing images of) the multi-layered material.

The end effect of the rendering process using an empirical model of materials according to embodiments of the present disclosure is that the final rendering has an emulated polarization signal that is close to the real polarization signal in a real environment. The accuracy of the empirical model in rendering the materials depicted in the virtual environment depends on how closely the conditions of the virtual environment match the conditions under which samples were captured of the real-world material (e.g., how closely the spectral profile of the illumination source in the virtual scene matched the real-world illumination source, how closely the observer angles in the virtual scene matched the observer angles used when performing sampling, and the like).

As noted above, while aspects of embodiments of the present disclosure are described herein in the context of simulating or emulating the appearance of polarization, embodiments of the present disclosure are not limited thereto. The appearance of materials under multimodal imaging modalities and/or plenoptic imaging modalities, such as thermal, thermal with polarization, and the like, can also be captured in accordance with embodiments of the present disclosure. For example, the behavior of materials in a thermal imaging modality (e.g., infrared imaging) can similarly be modeled by capturing images of a material from multiple poses using a thermal camera in an arrangement similar to that shown in FIG. 7 and a method as described in FIG. 8. Based on these captured images, an appearance of a material under thermal imaging can then be simulated in a 3-D rendering engine by retrieving corresponding images and interpolating images, as necessary, in a manner similar to that shown in FIG. 9.

Accordingly, some aspects of embodiments of the present disclosure relate to systems and methods for generating synthetic image data of virtual scenes as they would appear under various imaging modalities such as polarization imaging and thermal imaging, by rendering images of the virtual scenes using empirical models of materials in the virtual scene. In some embodiments, these empirical models may include images captured of real-world objects using one or more imaging modalities such as polarization imaging and thermal imaging. These synthetic image data can then be used to train machine learning models to operate on image data captured by imaging systems using these imaging modalities.

Some aspects of embodiments of the present disclosure relate to generating synthetic data relating to image features that would typically be generated from imaging data. As a specific example, some aspects of embodiments of the present disclosure relate to generating synthetic features or tensors in polarization representation spaces (e.g., in degree of linear polarization or DOLP $\rho$ and angle of linear polarization or AOLP $\phi$). As discussed above, shape from polarization (SfP) provides a relationship between the DOLP $\rho$ and the AOLP $\phi$ and the refractive index (n), azimuth angle ($\theta_a$) and zenith angle ($\theta_z$) of the surface normal of an object.

Accordingly, some aspects of embodiments relate to generating a synthetic degree of linear polarization or DOLP $\rho$ and angle of linear polarization or AOLP $\phi$ for surfaces of a virtual scene that are visible to the virtual camera based on the refractive index n, azimuth angle ($\theta_a$) and zenith angle ($\theta_z$) of the surface of the virtual scene, all of which are known parameters of the virtual 3-D scene.

Figure 10:
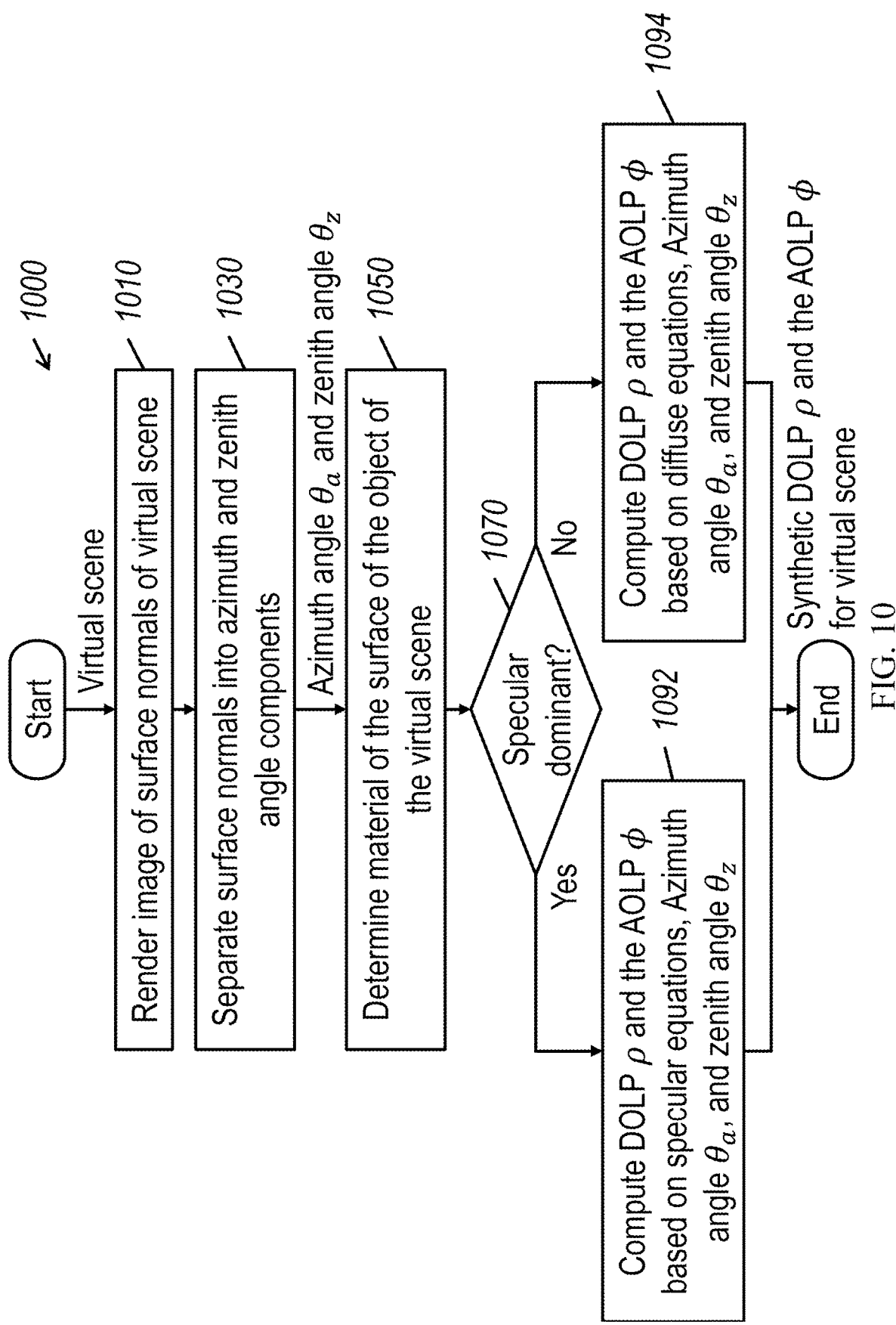
FIG. 10 is a flowchart depicting a method for computing synthetic features or tensors in polarization representation spaces for a virtual scene according to one embodiment of the present disclosure.

FIG. 10 is a flowchart depicting a method 1000 for computing synthetic features or tensors in polarization representation spaces for a virtual scene according to one embodiment of the present disclosure. In operation 1010, the synthetic data generator 40 renders a normal image (e.g., an image where every pixel corresponds to the direction of the surface normal of the virtual scene at that pixel). The normal vector at each component includes an azimuth angle $\theta_a$ component and a zenith angle $\theta_z$ component. In operation 1030, the synthetic data generator 40 separates the normal vector at each point of the normal image into two components: the azimuth angle $\theta_a$ and the zenith angle $\theta_z$ at that pixel. As noted above, these components can be used to compute an estimate of the DOLP $\rho$ and AOLP $\phi$ by using the shape from polarization equations (2) and (3) for the diffuse case and equations (4) and (5) for the specular case. To simulate realistic polarization error, in some embodiments of the present disclosure, the synthetic data generator 40 applies a semi-global perturbation to the normal map before applying the polarization equations (e.g., equations (2), (3), (4), and (5)). This perturbation changes the magnitude of the normals while preserving the gradient of the normals. This simulates errors caused by the material properties of the object and their interactions with polarization. In operation 1050, for a given pixel, the synthetic data generator 40 determines the material of the surface of the object based on the parameters of the objects in the virtual scene (e.g., the material associated with the surface at each pixel of the normal map), and the material is used in conjunction with the geometry of the scene, in accordance with 3-D rendering techniques, to determine whether the given pixel is specular dominant. If so, then the synthetic data generator 40 computes the DOLP $\rho$ and AOLP $\phi$ based on the specular equations (4) and (5) in operation 1092. If not, then the synthetic data generator 40 computes the DOLP $\rho$ and AOLP $\phi$ based on the diffuse equations (2) and (3) in operation 1094.

In some embodiments, it is assumed that all of the surfaces are diffuse, and therefore operations 1050 and 1070 can be omitted and the synthetic DOLP $\rho$ and AOLP are computed based on the shape from polarization equations (2) and (3) for the diffuse case.

In some embodiments, the synthesized DOLP $\rho$ and AOLP $\phi$ data are rendered into color images by applying a colormap such as the "viridis" colormap or the "Jet" colormap (see, e.g., Liu, Yang, and Jeffrey Heer. "Somewhere over the rainbow: An empirical assessment of quantitative colormaps." *Proceedings of the* 2018 *CHI Conference on Human Factors in Computing Systems.* 2018.). These color mapped versions of the synthesized tensors in polarization space may be more easily supplied as input for retraining a pre-trained machine learning model such as convolutional neural network. In some embodiments, when synthesizing DOLP $\rho$ and AOLP $\phi$ data, random colormaps are applied to the various synthesized data such that the synthesized training data set includes color images representing DOLP $\rho$ and AOLP $\phi$ data in a variety of different colormaps, such that, at inference time, the network will be able to perform predictions without regard to the particular colormap used to encode the real DOLP $\rho$ and AOLP data. In other embodiments of the present disclosure, the same colormap is applied to all of the synthetic DOLP $\rho$ and AOLP $\phi$ data (or a first colormap is used for DOLP $\rho$ and a second, different colormap is used for AOLP $\phi$), and at inference time, colormaps are applied to the extracted tensors in polarization representation space to match the synthetic training data (e.g., the same first colormap is used for encoding the DOLP $\rho$ extracted from the captured real polarization raw frames and the same second colormap is used for encoding AOLP $\phi$ extracted from the captured real polarization raw frames).

Accordingly, some aspects of embodiments of the present disclosure relate to synthesizing features in representation spaces specific to particular imaging modalities, such by synthesizing DOLP $\rho$ and AOLP $\phi$ in polarization representation spaces for a polarization imaging modality.

Figure 11:
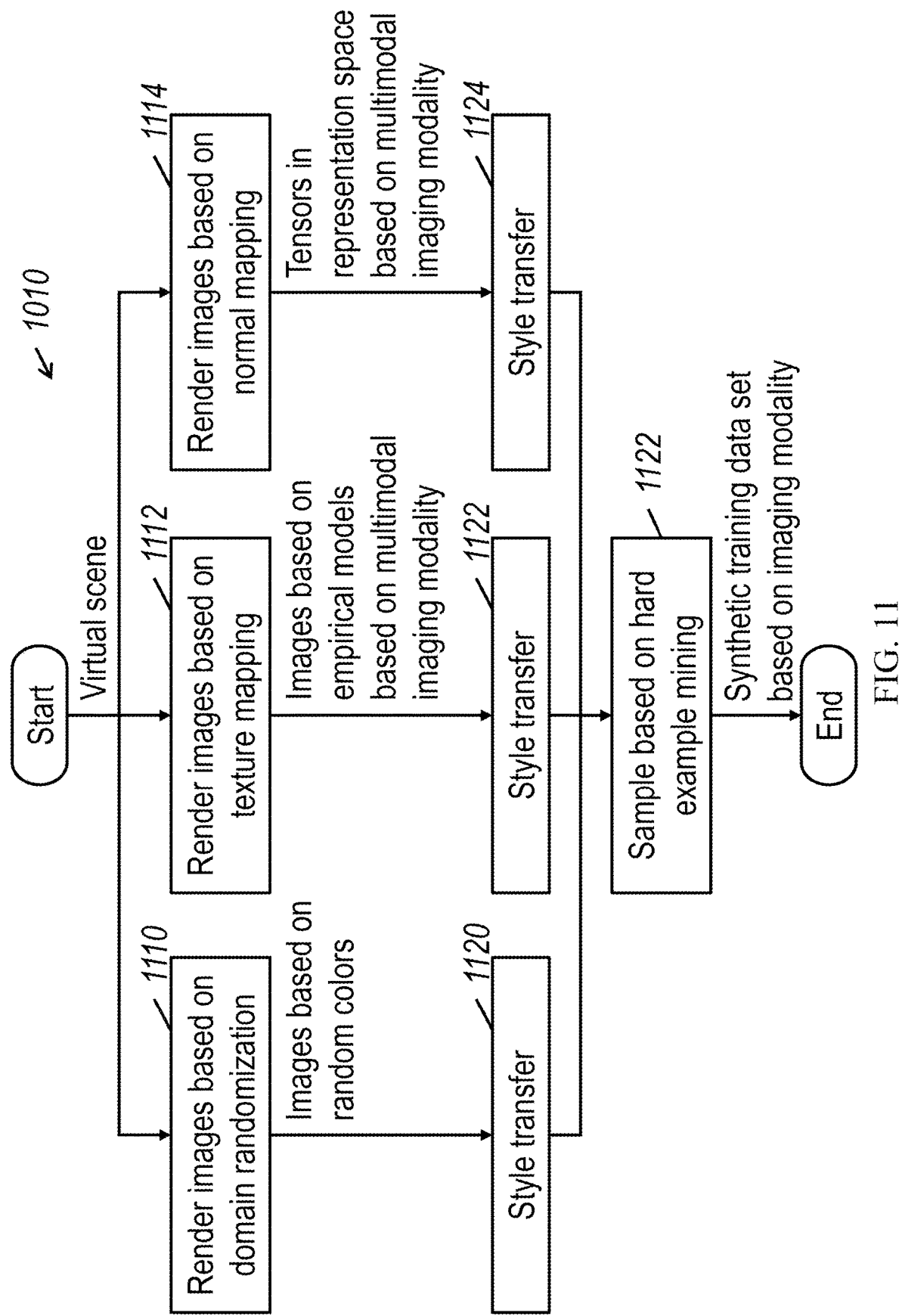
FIG. 11 is a flowchart depicting a method for generating a training data set according to one embodiment of the present disclosure.

Some aspects of embodiments of the present disclosure relate to combinations of the above techniques for generating synthetic images for training machine learning models. FIG. 11 is a flowchart depicting a method for generating a training data set according to one embodiment of the present disclosure. One or more virtual scenes representative of the target domain may be generated as discussed above (e.g., for generating images of bins of components, by selecting one or more 3-D models of components and dropping instances of the 3-D models into a container). For example, some aspects of embodiments of the present disclosure relate to forming a training data set based on: (1) images generated purely by domain randomization in operation 1110, (2) images generated purely through texture mapping (e.g., generated in accordance with embodiments of FIG. 9) in operation 1112, and (3) images generated purely through normal mapping (e.g., generated in accordance with embodiments of FIG. 10) in operation 1114.

In addition, the training data set may include images generated using models of materials generated by interpolating between different empirically generated models, as parameterized in embedding space, as discussed above.

In some embodiments of the present disclosure, the images generated in accordance with (1) domain randomization, (2) texture mapping, and (3) normal mapping are further processed by applying style transfer or other filter to the generated image in operations 1120, 1122, and 1124, respectively, before adding the image to the training data set. Applying style transfer causes images that appear somewhat different, as generated using the three techniques described above, to have a more consistent appearance. In some embodiments, the style transfer process transforms the synthesized input images to appear more similar to an image captured based on the imaging modality of interest (e.g., causing images generated using (1) domain randomization and feature maps generated using (3) normal mapping to appear more like polarization raw frames) or by causing the synthesized input images to appear more artificial, such as by applying an unrealistic painterly style to the input images (e.g., causing images generated using (1) domain randomization, (2) renderings using texture mapping, and feature maps generated using (3) normal mapping to appear like a painting made with a paintbrush on canvas).

In some embodiments, a neural style transfer network is trained and used to perform the style transfer in operation 1122 on the images selected for the training data set, such as SytleGAN (see, e.g., Karras, Tero, et al. "Analyzing and improving the image quality of stylegan." *Proceedings of the IEEE/CVF Conference on Computer Vision and Pattern Recognition.* 2020.) for complex global style transfers; patched based networks (see, e.g., Chen, Tian Qi, and Mark Schmidt. "Fast patch-based style transfer of arbitrary style." arXiv preprint arXiv:1612.04337 (2016).) for local style transfers; and networks using domain adaptation (see, e.g., Dundar, Aysegul, et al. "Domain stylization: A strong, simple baseline for synthetic to real image domain adaptation." arXiv preprint arXiv:1807.09384 (2018).). As a result, all of the images in the training data set may have a similar style or appearance regardless of the method by which the images were obtained (e.g., whether through (1) domain randomization, (2) texture mapping, (3) normal mapping, or other sources such as real images of objects as captured using an imaging system implementing the modality of interest, such as polarization imaging or thermal imaging), as transformed by a style transfer operation.

In some embodiments of the present disclosure, the images for the training data set are sampled from the synthesized data sets (1), (2), and (3) based on hard example mining (see, e.g., Smirnov, Evgeny, et al. "Hard example mining with auxiliary embeddings." *Proceedings of the IEEE Conference on Computer Vision and Pattern Recognition Workshops.* 2018.) Using hard example mining to sample the synthesized data sets can improve the efficiency of the training process by reducing the size of the training set to remove substantially redundant images that would not have much impact on the training process while keeping the "hard examples" that have more of an impact on the resulting trained model.

As briefly mentioned above, when generating training data for supervised learning, the synthetic data generator 40 also automatically generates labels (e.g., desired outputs) for the synthesized images. For example, when generating training data for training a machine learning model to perform an image classification task, the generated label for a given image may include the classes of the objects depicted in the image. These classification label may be generated by identifying each unique type of object that is visible in the virtual scene. As another example, when generating training data for training a machine learning model to perform an instance segmentation task, the generated label may include a segmentation map where each instance of each object is uniquely identified (e.g., with a different instance identifier) along with its class (e.g., where objects of the same type have the same class identifier). For example, a segmentation map may be generated by tracing rays from the camera into the virtual scene, where each ray may intersect with some first surface of the virtual scene. Each pixel of the segmentation map is labeled accordingly based on the instance identifier and class identifier of the object containing the surface that was struck by the ray emitted from the camera through the pixel.

As discussed above, and referring to FIG. 1 the resulting training data set of synthesized data 42 generated by the synthetic data generator 40 is then used as training data 5 by a model training system 7 to train a model 30, such as a pre-trained model or a model initialized with random parameters, to produce a trained model 32. Continuing the example presented above in the case of generating training data in accordance with a polarization imaging modality, the training data set 5 may be used to train the model 30 to operate on polarization input features such as polarization raw frames (e.g., the images generated through texture mapping) and tensors in polarization representation spaces (e.g., images generated through normal mapping).

Accordingly, the training data 5 including the synthesized data 42 is used to train or retrain a machine learning model 30 to perform a computer vision task based on a particular imaging modality. For example, synthetic data in accordance with a polarization imaging modality may be used to retrain a convolutional neural network that may have been pre-trained to perform instance segmentation based on standard color images to perform instance segmentation based on polarization input features.

In deployment, a trained model 32 trained based on training data generated in accordance with embodiments of the present disclosure is then configured to take input similar to the training data such as polarization raw frames and/or tensors in polarization representation spaces (where these input images are further modified by the same style transfer, if any, that was applied when generating the training data) to generate predicted outputs such as segmentation maps.

While some embodiments of the present disclosure are described herein with respect to a polarization imaging modality, embodiments of the present disclosure are not limited thereto and include with multimodal imaging modalities and/or plenoptic imaging modalities such as thermal imaging, thermal imaging with polarization (e.g., with a polarizing filter), and ultraviolet imaging. In these embodiments using different modalities, real-world image samples captured from real-world materials using imaging systems implementing those modalities are used to generate models of materials as they would appear under those imaging modalities, and the surface light field functions of the materials with respect to those modalities are modeled as described above (e.g., using a deep neural network, a generative network, linear interpolation, explicit mathematical model, or the like) and used to render images in accordance with those modalities using a 3-D rendering engine. The rendered images in the modality may then be used to train or retrain one or more machine learning models, such as convolutional neural networks, to perform computer vision tasks based on input images captured using those modalities.

As such, aspects of embodiments of the present disclosure relate to systems and methods for generating simulated or synthetic data representative of image data captured by imaging systems using a variety of different imaging modalities such as polarization, thermal, ultraviolet, and combinations thereof. The simulated or synthetic data can be used to as a training data set and/or to augment a training data set for training a machine learning model to perform tasks, such as computer vision tasks, on data captured using an imaging modality corresponding to the imaging modality of the simulated or synthetic data.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

In some embodiments of the present disclosure, the order in which operations are performed may differ from those as depicted in the figures and as described herein. For example, For example, while FIG. 6 depicts one example of a method for generating synthetic images, embodiments of the present disclosure are not limited thereto. For example, some of the operations shown in FIG. 6 may be performed in a different order, or may be performed concurrently. As specific examples, in various embodiments of the present disclosure, the operations of placing 3-D models of objects in a virtual scene 610, adding lighting to the virtual scene 630, applying modality-specific materials to objects in the virtual scene 650, and setting the scene background 670 may be performed in various orders before rendering the 3-D scene based on a specified imaging modality in operation 690. As another example, while FIG. 8 depicts an embodiment in which lighting is placed in a real-world scene after placing a real-world object into a scene, embodiments of the present disclosure are not limited thereto and lighting may be added to a scene before placing real-world objects in the scene.

In some embodiments of the present disclosure, some operations may be omitted or not performed, and in some embodiments, additional operations not described herein may be performed before, after, or between various operations described herein.

What is claimed is:

1. A computer-implemented method comprising:
   obtaining, by a synthetic data generator, a three-dimensional (3-D) model of an object in a 3-D virtual scene;
   adding, by the synthetic data generator, lighting to the 3-D virtual scene, the lighting comprising one or more virtual illumination sources;
   obtaining a model that emulates polarization properties of objects having a particular surface material;
   determining an observer angle of the object in the virtual scene,
   generating, by the synthetic data generator, a degree-of-linear-polarization (DOLP) image and an angle-of-linear-polarization (AOLP) image from the observer angle for the object having the particular surface material, including:
      providing the observer angle as input to the empirical model to generate data representing a respective polarization signal for the particular surface material at each location in the scene corresponding to the object, and
      computing the DOLP image and the AOLP image from the data representing the respective polarization signals at each location in the scene corresponding to the object; and
   training a machine learning model using the generated DOLP image and AOLP image generated by the synthetic data generator.

2. The method of claim 1, wherein the empirical model is generated based on sampled images captured of a surface of the material using an imaging system configured to capture polarization signals, and wherein the sampled images comprise images captured of the surface of the material from a plurality of different poses with respect to a normal direction of the surface of the material.

3. The method of claim 2, wherein the imaging system comprises a polarization camera.

4. The method of claim 2, wherein each of the sampled images is stored in association with the corresponding angle of its pose with respect to the normal direction of the surface of the material.

5. The method of claim 2, wherein the sampled images comprise:
   a first plurality of sampled images captured of the surface of the material illuminated by light having a first spectral profile; and
   a second plurality of sampled images captured of the surface of the material illuminated by light having a second spectral profile different from the first spectral profile.

6. The method of claim 2, wherein the empirical model comprises a surface light field function computed by interpolating between two or more of the sampled images.

7. The method of claim 2, wherein the empirical model comprises a surface light field function implemented by a deep neural network trained on the sampled images.

8. The method of claim 2, wherein the empirical model comprises a surface light field function implemented by a generative adversarial network trained on the sampled images.

9. The method of claim 2, wherein the empirical model comprises a surface light field function implemented by a mathematical model generated based on the sampled images.

10. A system for generating synthetic images of virtual scenes comprising:
    one or more computers; and
    memory storing instructions that, when executed by the one or more computers, cause the one or more computers to perform operations comprising:
       obtaining, by a synthetic data generator, a three-dimensional (3-D) model of an object in a 3-D virtual scene;
       adding, by the synthetic data generator, lighting to the 3-D virtual scene, the lighting comprising one or more virtual illumination sources;
       obtaining a model that emulates polarization properties of objects having a particular surface material;
       determining an observer angle of the object in the virtual scene,
       generating, by the synthetic data generator, a degree-of-linear-polarization (DOLP) image and an angle-of-linear-polarization (AOLP) image from the observer angle for the object having the particular surface material, including:
          providing the observer angle as input to the empirical model to generate data representing a respective polarization signal for the particular surface material at each location in the scene corresponding to the object, and
          computing the DOLP image and the AOLP image from the data representing the respective polarization signals at each location in the scene corresponding to the object; and
       training a machine learning model using the generated DOLP image and AOLP image generated by the synthetic data generator.

11. The system of claim 10, wherein the empirical model is generated based on sampled images captured of a surface of the material using an imaging system configured to capture polarization signals, and
  wherein the sampled images comprise images captured of the surface of the material from a plurality of different poses with respect to a normal direction of the surface of the material.

12. The system of claim 11, wherein the imaging system comprises a polarization camera.

13. The system of claim 11, wherein each of the sampled images is stored in association with the corresponding angle of its pose with respect to the normal direction of the surface of the material.

14. The system of claim 11, wherein the sampled images comprise:
  a first plurality of sampled images captured of the surface of the material illuminated by light having a first spectral profile; and
  a second plurality of sampled images captured of the surface of the material illuminated by light having a second spectral profile different from the first spectral profile.

15. The system of claim 11, wherein the empirical model comprises a surface light field function computed by interpolating between two or more of the sampled images.

16. The system of claim 11, wherein the empirical model comprises a surface light field function implemented by a deep neural network trained on the sampled images.

17. The system of claim 11, wherein the empirical model comprises a surface light field function implemented by a generative adversarial network trained on the sampled images.

18. The system of claim 11, wherein the empirical model comprises a surface light field function implemented by a mathematical model generated based on the sampled images.

19. One or more non-transitory computer storage media encoded with computer program instructions that when executed by one or more computers cause the one or more computers to perform operations comprising:
  obtaining, by a synthetic data generator, a three-dimensional (3-D) model of an object in a 3-D virtual scene;
  adding, by the synthetic data generator, lighting to the 3-D virtual scene, the lighting comprising one or more virtual illumination sources;
  obtaining a model that emulates polarization properties of objects having a particular surface material;
  determining an observer angle of the object in the virtual scene,
  generating, by the synthetic data generator, a degree-of-linear-polarization (DOLP) image and an angle-of-linear-polarization (AOLP) image from the observer angle for the object having the particular surface material, including:
    providing the observer angle as input to the empirical model to generate data representing a respective polarization signal for the particular surface material at each location in the scene corresponding to the object, and
    computing the DOLP image and the AOLP image from the data representing the respective polarization signals at each location in the scene corresponding to the object; and
  training a machine learning model using the generated DOLP image and AOLP image generated by the synthetic data generator.

20. The one or more computer storage media of claim 19, wherein the empirical model is generated based on sampled images captured of a surface of the material using an imaging system configured to capture polarization signals, and
  wherein the sampled images comprise images captured of the surface of the material from a plurality of different poses with respect to a normal direction of the surface of the material.

21. The one or more computer storage media of claim 20, wherein the imaging system comprises a polarization camera.

22. The one or more computer storage media of claim 20, wherein each of the sampled images is stored in association with the corresponding angle of its pose with respect to the normal direction of the surface of the material.

23. The one or more computer storage media of claim 20, wherein the sampled images comprise:
  a first plurality of sampled images captured of the surface of the material illuminated by light having a first spectral profile; and
  a second plurality of sampled images captured of the surface of the material illuminated by light having a second spectral profile different from the first spectral profile.

24. The one or more computer storage media of claim 20, wherein the empirical model comprises a surface light field function computed by interpolating between two or more of the sampled images.

25. The one or more computer storage media of claim 20, wherein the empirical model comprises a surface light field function implemented by a deep neural network trained on the sampled images.

26. The one or more computer storage media of claim 20, wherein the empirical model comprises a surface light field function implemented by a generative adversarial network trained on the sampled images.

27. The one or more computer storage media of claim 20, wherein the empirical model comprises a surface light field function implemented by a mathematical model generated based on the sampled images.

* * * * *